(12) United States Patent
Matsushima

(10) Patent No.: US 11,860,485 B2
(45) Date of Patent: Jan. 2, 2024

(54) LIQUID-CRYSTAL DISPLAY DEVICE AND ELECTRONIC APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/515,854

(22) Filed: Nov. 1, 2021

(65) Prior Publication Data

US 2022/0050339 A1 Feb. 17, 2022

Related U.S. Application Data

(60) Continuation of application No. 16/905,561, filed on Jun. 18, 2020, now Pat. No. 11,163,199, which is a
(Continued)

(30) Foreign Application Priority Data

Dec. 11, 2013 (JP) .................................. 2013-256467

(51) Int. Cl.
*G02F 1/1343* (2006.01)

(52) U.S. Cl.
CPC .. *G02F 1/134309* (2013.01); *G02F 1/134363* (2013.01); *G02F 1/134372* (2021.01); *G02F 2201/123* (2013.01); *G02F 2201/124* (2013.01)

(58) Field of Classification Search
None
See application file for complete search history.

(56) References Cited

U.S. PATENT DOCUMENTS

2002/0033922 A1* 3/2002 Hidehira ........... G02F 1/134363
349/141
2005/0179844 A1* 8/2005 Roosendaal ......... G02F 1/1391
349/139

(Continued)

FOREIGN PATENT DOCUMENTS

CN 1653382 8/2005
CN 1892319 1/2007
(Continued)

OTHER PUBLICATIONS

Japanese Office Action (with English translation) dated Sep. 20, 2016 in corresponding Japanese application No. 2013-256467 (12 pages).

(Continued)

*Primary Examiner* — Ryan Crockett
(74) *Attorney, Agent, or Firm* — K&L Gates LLP

(57) ABSTRACT

According to an aspect, a liquid-crystal display device includes a first substrate, a second substrate, and a liquid-crystal layer. The first substrate includes a first electrode and a second electrode, and one of the first electrode and the second electrode is a pixel electrode provide, the first electrode includes an electrode base portion extending in a first direction and comb tooth portions extending in a second direction and protruding in a comb teeth shape from the electrode base portion with a predetermined distance interposed therebetween, and adjacent comb tooth portions include adjacent comb tooth portions having a relation in which a first long side of one comb tooth portion closest to a boundary between pixels is not parallel to a first long side of the other comb tooth portion.

20 Claims, 29 Drawing Sheets

Related U.S. Application Data continuation of application No. 16/244,594, filed on Jan. 10, 2019, now Pat. No. 10,725,349, which is a division of application No. 15/412,290, filed on Jan. 23, 2017, now Pat. No. 10,216,048, which is a continuation of application No. 14/564,327, filed on Dec. 9, 2014, now Pat. No. 9,581,868.

(56) References Cited

U.S. PATENT DOCUMENTS

| | | | | |
|---|---|---|---|---|
| 2007/0242205 | A1* | 10/2007 | Shimura | G02F 1/134363 349/141 |
| 2008/0007681 | A1* | 1/2008 | Chen | G02F 1/133707 349/129 |
| 2008/0158491 | A1* | 7/2008 | Zhu | G02F 1/134363 349/120 |
| 2008/0198318 | A1* | 8/2008 | Lee | G02F 1/134363 349/187 |
| 2009/0201449 | A1* | 8/2009 | Nishida | G02F 1/134363 349/114 |
| 2009/0322995 | A1* | 12/2009 | Yonemura | G02F 1/134363 349/123 |
| 2010/0149444 | A1 | 6/2010 | Hikmet et al. | |
| 2010/0182558 | A1* | 7/2010 | Lu | G02F 1/134363 349/141 |
| 2011/0013129 | A1* | 1/2011 | Jeong | G02F 1/134336 349/141 |
| 2011/0199550 | A1 | 8/2011 | Fan et al. | |
| 2011/0216280 | A1* | 9/2011 | Itou | G02F 1/133707 349/143 |
| 2012/0044446 | A1* | 2/2012 | Hara | G02F 1/134309 445/24 |
| 2012/0162589 | A1* | 6/2012 | Yoso | G02F 1/134309 349/126 |
| 2012/0249940 | A1* | 10/2012 | Choi | G02F 1/1393 349/123 |
| 2013/0100388 | A1* | 4/2013 | Matsushima | G02F 1/134363 445/24 |
| 2013/0258264 | A1 | 10/2013 | Peng et al. | |
| 2014/0092353 | A1* | 4/2014 | Matsushima | G02F 1/134372 349/110 |
| 2014/0168581 | A1* | 6/2014 | Watanabe | G02F 1/1339 445/25 |
| 2014/0293199 | A1 | 10/2014 | Sakae et al. | |
| 2014/0354931 | A1* | 12/2014 | Kurasawa | G02F 1/133707 349/33 |
| 2015/0323842 | A1* | 11/2015 | Matsushima | G02F 1/136286 349/110 |
| 2016/0080731 | A1 | 3/2016 | Niu et al. | |
| 2017/0293185 | A1 | 10/2017 | Park et al. | |
| 2018/0129103 | A1* | 5/2018 | Matsushima | G02F 1/1337 |

FOREIGN PATENT DOCUMENTS

| | | |
|---|---|---|
| CN | 101479656 | 7/2009 |
| CN | 101675379 | 3/2010 |
| CN | 103076697 | 5/2013 |
| JP | 2005-525595 | 8/2005 |
| JP | 2008-052161 | 3/2008 |
| JP | 2010-128113 | 6/2010 |
| JP | 2010-164600 | 7/2010 |
| JP | 2013-109309 | 6/2013 |
| JP | 5273368 | 8/2013 |
| JP | 2014-071309 | 4/2014 |
| KR | 10-2004-0022287 | 3/2004 |
| KR | 10-2004-0106506 | 12/2004 |
| KR | 10-2006-0077852 | 7/2006 |
| KR | 10-2008-0040304 | 5/2008 |
| KR | 10-2011-0050038 | 5/2011 |
| KR | 10-2013-0045180 | 5/2013 |

OTHER PUBLICATIONS

Korean Office Action (with English translation) dated May 23, 2016 in corresponding Korean application No. 10-2014-0177236 (13 pages).
Chinese Office Action dated Mar. 13, 2017 in corresponding Chinese application No. 201410753577.X (9 pages).
Office Action dated Aug. 17, 2017 in corresponding Korean patent application No. 10-2017-0061781.
Office Action dated Aug. 31, 2017 in corresponding Chinese patent application No. 201410753577.X.
Korean Office Action dated Feb. 12, 2019 in corresponding Korean Application No. 10-2014-0177236.

\* cited by examiner

| L2 [μm] | ANGLE θ [DEGREE] | DETERMINATION |
|---|---|---|
| 15 | 0.00 | ◎ |
| | 0.55 | ◎ |
| 30 | 0.00 | × |
| | 0.22 | × |
| | 0.55 | △ |
| | 0.62 | ◎ |
| | 0.70 | △ |
| | 1.01 | ◎ |
| 62.5 | 0.00 | × |
| | 0.69 | ◎ |

LIQUID-CRYSTAL DISPLAY DEVICE AND ELECTRONIC APPARATUS

CROSS-REFERENCE TO RELATED APPLICATIONS

The present application is a continuation of U.S. application Ser. No. 16/905,561, filed on Jun. 18, 2020, which is a continuation of U.S. patent application Ser. No. 16/244,594, filed on Jan. 10, 2019, issued as U.S. Pat. No. 10,725,349 on Jul. 28, 2020, which application is a division of U.S. patent application Ser. No. 15/412,290, filed on Jan. 23, 2017, issued as U.S. Pat. No. 10,216,048 on Feb. 26, 2019, which application is a continuation of U.S. patent application Ser. No. 14/564,327, filed on Dec. 9, 2014, issued as U.S. Pat. No. 9,581,868 on Feb. 28, 2017, which claims priority to Japanese Application No. 2013-256467, filed Dec. 11, 2013, the disclosures of which are hereby incorporated by reference herein.

BACKGROUND

1. Technical Field

The present invention relates to a liquid-crystal display device provided with liquid crystals and to an electronic apparatus including the liquid-crystal display device provided with liquid crystals.

2. Description of the Related Art

There have been developed systems (modes) for driving liquid crystals, including a liquid-crystal driving system that uses an electric field generated in a longitudinal direction between substrates, that is, a longitudinal electric field. Examples of a liquid-crystal display device that drives liquid crystals using a longitudinal electric field include, but are not limited to, longitudinal-electric-field liquid-crystal display devices provided with a twisted nematic (TN) system, a vertical alignment (VA) system, an electrically controlled birefringence (ECB) system, etc. As disclosed in Japanese Patent Application Laid-open Publication No. 2008-52161 (JP-A-2008-52161), there has also been developed a liquid-crystal driving system that uses an electric field generated in a direction parallel to substrates (lateral direction), that is, a lateral electric field. Examples of a liquid-crystal display device that drives liquid crystals using a lateral electric field include, but are not limited to, lateral-electric-field liquid-crystal display devices provided with a fringe field switching (FFS) system, an in-plane switching (IPS) system, etc.

In the IPS mode, a first electrode and a second electrode are provided on the same layer, and an electric field is generated mainly in a direction parallel to the substrate surface. This configuration makes the electric field unlikely to be generated in an area above the first electrode, thereby making liquid-crystal molecules in the area unlikely to be driven.

In the FFS mode, a pixel electrode and a common electrode overlap in a direction perpendicular to the substrate surface with a dielectric film interposed therebetween. This configuration generates an electric field extending mainly in a direction oblique to the substrate surface or a parabolic electric field (also referred to as a fringe electric field). As a result, liquid-crystal molecules in an area above the pixel electrode are likely to be driven. In other words, the FFS mode can provide a higher aperture ratio than the IPS mode does.

The lateral-electric-field liquid-crystal device generates an electric field between the first electrode and the second electrode in a direction parallel to the substrate, thereby rotating the liquid-crystal molecules in a plane parallel to the substrate surface. The liquid-crystal device uses a change in the light transmittance corresponding to the rotation of the liquid-crystal molecules, thereby performing display. Such lateral-electric-field liquid-crystal display devices are required to achieve a higher response speed of the liquid-crystals.

Japanese Patent Application Laid-open Publication No. 2013-109309 (JP-A-2013-109309) discloses a liquid-crystal display device having a higher response speed of liquid crystals than the liquid-crystal device disclosed in JP-A-2008-52161 does.

The liquid-crystal device disclosed in JP-A-2013-109309 has a higher response speed of liquid crystals. In the liquid-crystal device, however, the rotation direction may possibly be unstable at a boundary portion between pixels, resulting in variation in the orientation of the liquid crystals.

For the foregoing reasons, there is a need for a liquid-crystal display device and an electronic apparatus including the liquid-crystal display device that achieve a higher response speed and higher orientation stability of liquid crystals at a boundary between pixels and have higher in-plane display quality.

SUMMARY

According to an aspect, a liquid-crystal display device includes: a first substrate; a second substrate facing the first substrate; and a liquid-crystal layer between the first substrate and the second substrate. The first substrate includes a first electrode and a second electrode, and one of the first electrode and the second electrode is a pixel electrode provide to each pixel, the first electrode includes an electrode base portion extending in a first direction and a plurality of comb tooth portions extending in a second direction different from the first direction and protruding in a comb teeth shape from the electrode base portion with a predetermined distance interposed therebetween, and adjacent comb tooth portions include adjacent comb tooth portions having a relation in which a first long side of one comb tooth portion closest to a boundary between pixels is not parallel to a first long side of the other comb tooth portion.

According to another aspect, an electronic apparatus includes the liquid-crystal display device.

Additional features and advantages are described herein, and will be apparent from the following Detailed Description and the figures.

DETAILED DESCRIPTION

Figure 1:
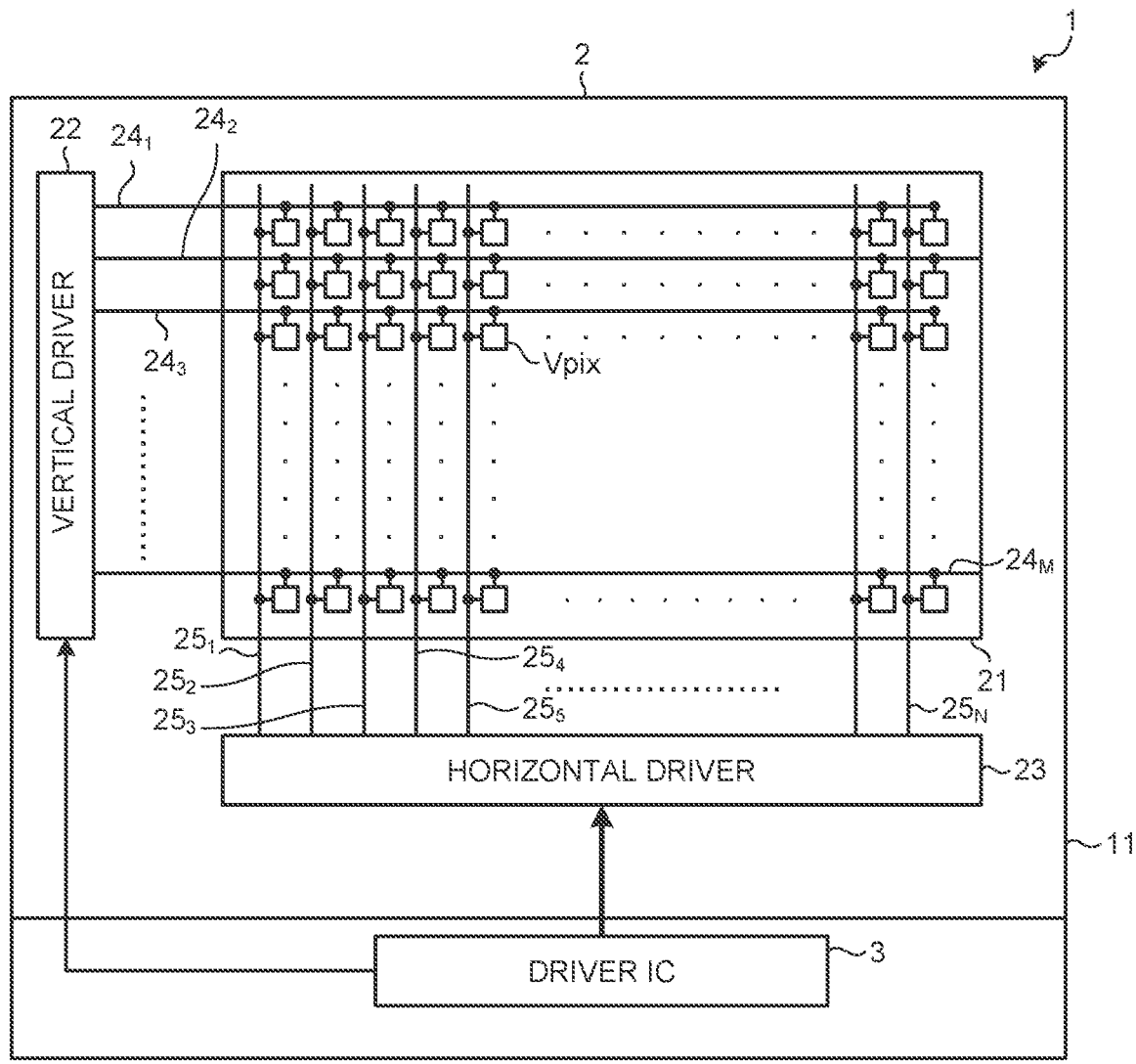
FIG. 1 is a block diagram of an exemplary system configuration of a liquid-crystal display device according to a first embodiment.

Exemplary aspects (embodiments) according to the present invention are described below in detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only. Various changes and modifications made without departing from the spirit of the invention and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

1. EMBODIMENTS

1-1. First Embodiment

FIG. 1 is a block diagram of an exemplary system configuration of a liquid-crystal display device according to a first embodiment. A display device 1 corresponds to a specific example of the "liquid-crystal display device" of the present invention.

The display device 1 is a transmissive liquid-crystal display device and includes a display panel 2 and a driver integrated circuit (IC) 3. The display device 1 is not limited to a transmissive liquid-crystal display device and may be a reflective liquid-crystal display device. Flexible printed circuits (FPCs), which are not illustrated, transmit an external signal to the driver IC 3 or drive electric power for driving the driver IC 3. The display panel 2 includes translucent insulation substrates such as glass substrates 11, a display area 21, a vertical driver (a vertical drive circuit) 22, and a horizontal driver (a horizontal drive circuit) 23. The display area 21 is provided on the surface of the glass substrates 11 and is formed of a number of pixels each including a liquid-crystal cell arranged in a matrix (rows and columns). The glass substrates 11 include a first substrate and a second substrate. In the first substrate, a number of pixel circuits each including an active element (e.g., a transistor) are arranged in a matrix. The second substrate is arranged facing the first substrate with a predetermined gap interposed therebetween. The gap between the first substrate and the second substrate is maintained to a predetermined gap by photo spacers arranged at respective positions on the first substrate. The space between the first substrate and the second substrate is sealed with liquid crystals. The photo spacers may be arranged on the side of the second substrate.

Exemplary System Configuration of the Liquid-Crystal Display Device

The display device 2 includes the display area 21, the driver IC 3 having functions of an interface (I/F) and a timing generator, the vertical driver 22, and the horizontal driver 23 on the glass substrate 11.

The display area 21 has a matrix (row-and-column) structure in which M×N pixels Vpix each including a liquid-crystal layer are arranged. Each pixel Vpix is a unit serving as one pixel on display. In the present specification, a row indicates a pixel row including N pixels Vpix arrayed in a direction. A column indicates a pixel column including M pixels Vpix arrayed in a direction orthogonal to the direction in which the row extends. The values of M and N are determined depending on display resolution in the vertical direction and that in the horizontal direction, respectively. In the display area 21, with respect to the array of M×N pixels Vpix, scanning lines $24_1, 24_2, 24_3, \ldots, 24_M$ are arranged for each row, and signal lines $25_1, 25_2, 25_3, \ldots, 25_N$ are arranged for each column. In the first embodiment, the scanning lines $24_1, 24_2, 24_3, \ldots, 24_M$ may be collectively referred to as a scanning line 24, whereas the signal lines $25_1, 25_2, 25_3, \ldots, 25_N$ may be collectively referred to as a signal line 25. In the first embodiment, a certain scanning line of the scanning lines $24_1, 24_2, 24_3, \ldots, 24_M$ may be referred to as a scanning line $24\alpha+1$ ($0 \leq \alpha \leq M$), whereas a certain signal line of the signal lines $25_1, 25_2, 25_3, \ldots, 25_N$ may be referred to as a signal line $25\beta+1$ ($0 \leq \beta \leq N$).

The display device 1 receives a master clock, a horizontal synchronizing signal, and a vertical synchronizing signal, which are external signals from the outside. These signals are supplied to the driver IC 3. The driver IC 3 converts the level of the master clock, the horizontal synchronizing signal, and the vertical synchronizing signal at voltage amplitude of an external power source into a level at voltage amplitude of an internal power source required for driving the liquid-crystals. Thus, the driver IC 3 generates a master clock, a horizontal synchronizing signal, and a vertical synchronizing signal. The driver IC 3 supplies the generated master clock, the generated vertical synchronizing signal, and the generated horizontal synchronizing signal to the vertical driver 22 and the horizontal driver 23. The driver IC 3 generates a common potential to be supplied to pixels in common, and supplies the common potential to the display area 21. More specifically, the common potential is a potential common to pixels supplied to a common electrode COM of each pixel Vpix, which will be described later.

The vertical driver 22 sequentially samples and latches, in one horizontal scanning period, display data output from the driver IC 3 in synchronization with a vertical clock pulse. The vertical driver 22 sequentially outputs and supplies the latched digital data of one line as a vertical scanning pulse to the scanning lines $24_m, 24_{m+1}, 24_{m+2}, \ldots$ of the display area 21. Thus, the vertical driver 22 sequentially selects pixels Vpix row by row. The vertical driver 22, for example, outputs the digital data to the scanning lines $24_m, 24_{m+1}, 24_{m+2}, \ldots$ from the top of the display area 21, that is, the upper side in the vertical scanning, to the bottom of the display area 21, that is, the lower side in the vertical scanning. Alternatively, the vertical driver 22 may output the digital data to the scanning lines $24_m, 24_{m+1}, 24_{m+2}, \ldots$ from the bottom of the display area 21, that is, the lower side in the vertical scanning, to the top of the display area 21, that is, the upper side in the vertical scanning in order.

The horizontal driver 23 is supplies with 6-bit digital video data Vsig of R (red), G (green), and B (blue), for example. The horizontal driver 23 writes display data to the pixels Vpix of the row selected in the vertical scanning performed by the vertical driver 22 in units of a pixel, a plurality of pixels, or all the pixels via the signal line 25.

In the display device 1, continuous application of a direct current (DC) voltage of the same polarity to the liquid-crystal elements may possibly deteriorate resistivity (substance-specific resistance) and the like of the liquid crystals. To suppress deterioration in the resistivity (substance-specific resistance) and the like of the liquid crystals, the display device 1 employs a driving method for reversing the polarity of video signals at a predetermined period based on the common potential of drive signals.

Some types of methods for driving a liquid-crystal display panel are known, including line inversion, dot inversion, and frame inversion driving methods. The line inversion driving method is a method for reversing the polarity of video signals at a time period of 1H (H represents a horizontal scanning period) corresponding to one line (one pixel row). The dot inversion driving method is a method for alternately reversing the polarity of video signals for pixels vertically and horizontally adjacent to each other. The frame inversion driving method is a method for reversing the polarity of video signals to be written to all the pixels in one frame corresponding to one screen with the same polarity at a time. The display device 1 may employ any one of the driving methods described above.

Figure 2:
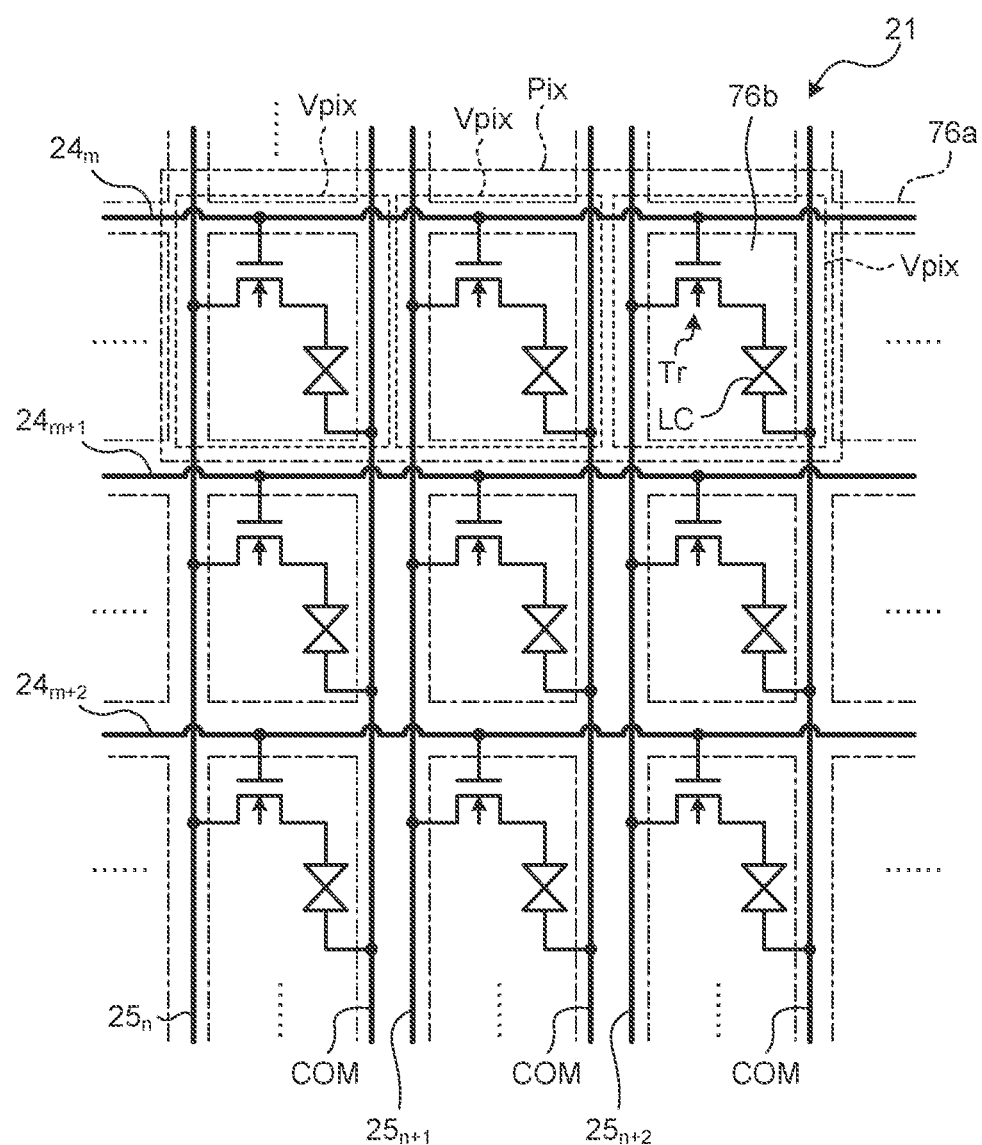
FIG. 2 is a circuit diagram of a drive circuit that drives pixels of the liquid-crystal display device according to the first embodiment.

FIG. 2 is a circuit diagram of a drive circuit that drives the pixels of the display device according to the first embodiment. In the display area 21, wiring of the signal lines $25_n$, $25_{n+1}$, $25_{n+2}$ and the scanning lines $24_m$, $24_{m+1}$, $24_{m+2}$ are formed, for example. The signal lines $25_n$, $25_{n+1}$, $25_{n+2}$ supply pixel signals to thin film transistor (TFT) elements Tr in respective pixels Vpix as display data. The scanning lines $24_m$, $24_{m+1}$, $24_{m+2}$ drive respective TFT elements Tr. The signal lines $25_n$, $25_{n+1}$, $25_{n+2}$ extend on a plane parallel to the surface of the glass substrate 11 and supply the pixel signals for displaying an image on the pixels Vpix. The pixels Vpix each include the TFT element Tr and a liquid-crystal capacitor LC. The TFT element Tr is formed of a TFT, and specifically of an n-channel metal oxide semiconductor (MOS) TFT in this example. One of the source and the drain of the TFT element Tr is coupled to the corresponding one of the signal lines $25_n$, $25_{n+1}$, $25_{n+2}$, the gate thereof is coupled to the corresponding one of the scanning lines $24_m$, $24_{m+1}$, $24_{m+2}$, and the other of the source and the drain thereof is coupled to a first end of the liquid-crystal capacitor LC. The first end of the liquid-crystal capacitor LC is coupled to the other of the source and the drain of the TFT element Tr, whereas a second end thereof is coupled to the corresponding common electrode COM.

The pixel Vpix is coupled to other pixels Vpix belonging to the same row in the display area 21 by the corresponding one of the scanning lines $24_m$, $24_{m+1}$, $24_{m+2}$. The scanning lines $24_m$, $24_{m+1}$, $24_{m+2}$ are coupled to the vertical driver 22 and are supplied with the vertical scanning pulses of scanning signals from the vertical driver 22. The pixel Vpix is further coupled to other pixels Vpix belonging to the same column in the display area 21 by the corresponding one of the signal lines $25_n$, $25_{n+1}$, $25_{n+2}$. The signal lines $25_n$, $25_{n+1}$, $25_{n+2}$ are coupled to the horizontal driver 23 and are supplied with pixel signals from the horizontal driver 23. The pixel Vpix is further coupled to the other pixels Vpix belonging to the same column in the display area 21 by the corresponding common electrode COM. The common electrodes COM are coupled to a drive electrode driver, which is not illustrated, and are supplied with drive signals from the drive electrode driver.

The vertical driver 22 illustrated in FIG. 1 applies vertical scanning pulses to the gate of the TFT element Tr of pixels Vpix via the scanning lines $24_m$, $24_{m+1}$, $24_{m+2}$ illustrated in FIG. 2. Thus, the vertical driver 22 sequentially selects a row (a horizontal line) out of the rows of the pixels Vpix arranged in a matrix in the display area 21 as a target of display drive. The horizontal driver 23 illustrated in FIG. 1 supplies pixel signals to the respective pixels Vpix forming each horizontal line sequentially selected by the vertical driver 22 via the corresponding one of the signal lines $25_n$, $25_{n+1}$, $25_{n+2}$ illustrated in FIG. 2. These pixels Vpix perform display of the horizontal line based on the supplied pixel signals. The drive electrode driver applies drive signals, thereby driving common electrodes COM in each drive electrode block including a predetermined number of common electrodes COM.

As described above, the vertical driver 22 in the display device 1 drives the scanning lines $24_m$, $24_{m+1}$, $24_{m+2}$ so as to sequentially scan the scanning lines $24_m$, $24_{m+1}$, $24_{m+2}$, thereby sequentially selecting a horizontal line. The horizontal driver 23 in the display device 1 supplies the pixel signals to the pixels Vpix belonging to the horizontal line, thereby performing display of the horizontal line. To perform the display operation, the drive electrode driver applies the drive signals to the common electrode COM corresponding to the horizontal line.

The display area 21 includes a color filter, a grid-shaped black matrix 76a and apertures 76b. The black matrix 76a is formed to cover the outer periphery of the pixel Vpix as illustrated in FIG. 2. In other words, the black matrix 76a is arranged at a boundary between the pixels Vpix that are two-dimensionally arranged and thus is formed into a grid shape. The black matrix 76a is made of a material having a high light absorption rate. The aperture 76b serves as an aperture formed by the grid shape of the black matrix 76a and is arranged at a position corresponding to the pixel Vpix.

The aperture 76b includes color areas colored with three colors of R, G, and B, for example. The color areas of the color filter of the three colors of R, G, and B are periodically arrayed in the respective apertures 76b, for example. Thus, a set of the color areas in the three colors of R, G, and B corresponds to each pixel Vpix as illustrated in FIG. 2.

The color filter may be a combination of other colors as long as it is colored with difference colors. Typically, in the color filter, the luminance of the color area of G is higher than that of the color areas of R and B. The display area 21 may be provided with no color filter. In this case, the aperture 76b produces a white color. Alternatively, the color filter may be made of a transmissive resin to produce a white color.

Viewed in a direction orthogonal to the front surface, the scanning line 24 and the signal line 25 in the display area 21 are arranged at an area overlapping with the black matrix 76a of the color filter. In other words, the scanning line 24 and the signal line 25 are hidden behind the black matrix 76a viewed in a direction orthogonal to the front surface. In the display area 21, an area in which the black matrix 76a is not arranged corresponds to the aperture 76b.

In FIG. 2, the scanning lines $24_m$, $24_{m+1}$, $24_{m+2}$ are arranged at regular intervals, and the signal lines $25_n$, $25_{n+1}$, $25_{n+2}$ are also arranged at regular intervals. The pixels Vpix are arranged at the respective areas sectioned by the scanning lines $24_m$, $24_{m+1}$, $24_{m+2}$ and the signal lines $25_n$, $25_{n+1}$, $25_{n+2}$ facing in the same direction. Adjacent scanning lines 24 do not necessarily have a regular interval therebetween, and adjacent signal lines 25 do not necessarily have a regular interval therebetween either.

Figure 3:
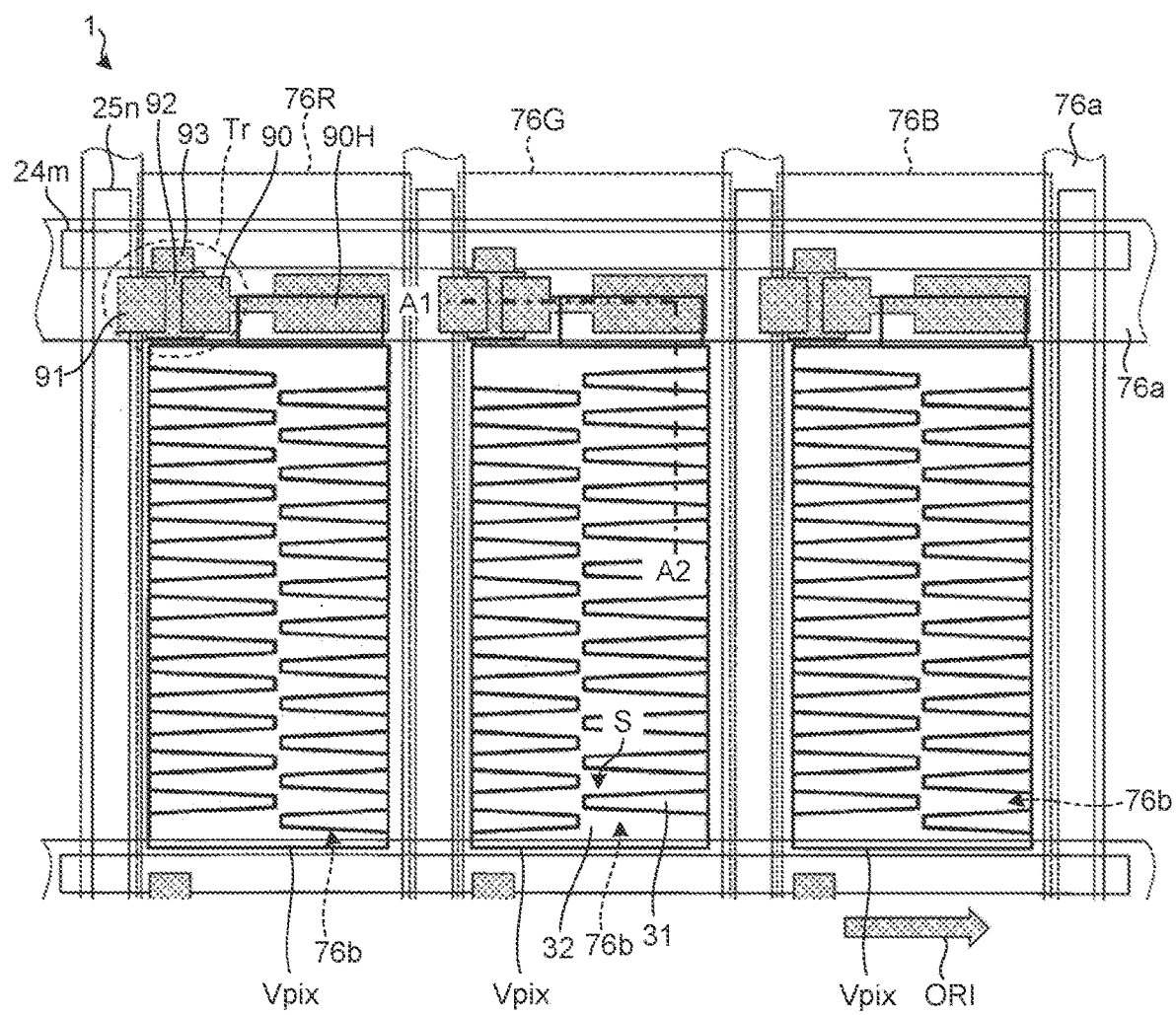
FIG. 3 is a plan view for explaining the pixels of the liquid-crystal display device according to the first embodiment.

FIG. 3 is a plan view for explaining the pixels of the liquid-crystal display device according to the first embodiment. In each pixel Vpix, the aperture 76b is formed on the lower side in the vertical scanning direction (lower side in FIG. 3). The TFT element Tr is arranged on the left on the upper side in the vertical scanning direction (upper side in FIG. 3). A contact 90H is formed on the right on the upper side in the vertical scanning direction (upper side in FIG. 3). The contact 90H is used to couple a pixel electrode to the drain electrode of the TFT element Tr. The drain of the TFT electrode Tr includes a part of a semiconductor layer (an active layer) and a drain electrode 90. Similarly, the source of the TFT electrode Tr includes another part of the semiconductor layer (active layer) and a source electrode 91. For example, color filters 76R, 76G, and 76B are colored with the three colors of R, G, and B, respectively. The color areas of the color filters 76R, 76G, and 76B are arranged in the apertures 76b periodically. Thus, the color areas in the three colors of R, G, and B are formed in the respective pixels Vpix illustrated in FIG. 2.

Figure 4:
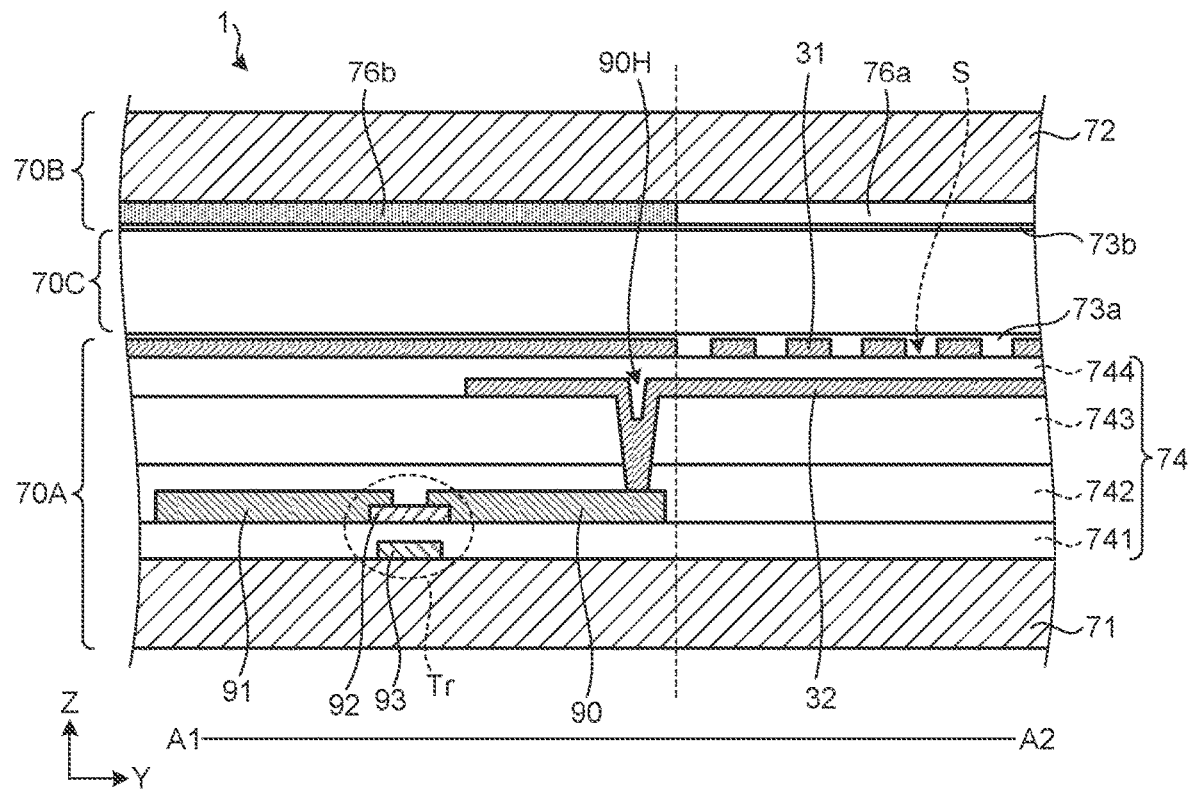
FIG. 4 is a schematic of a section along line A1-A2 in FIG. 3.

FIG. 4 is a schematic of a section along line A1-A2 in FIG. 3. As illustrated in FIG. 4, the display device 1 includes a pixel substrate (the first substrate) 70A, a counter substrate (the second substrate) 70B, and a liquid-crystal layer 70C. The counter substrate 70B is arranged facing a direction perpendicular to the surface of the pixel substrate 70A. The liquid-crystal layer 70C is inserted between the pixel substrate 70A and the counter substrate 70B. The surface of the pixel substrate 70A on the side opposite to the liquid-crystal layer 70C is provided with a lighting device, such as a backlight (not illustrated). Photo spacers (not illustrated) maintain the gap between the pixel substrate 70A and the counter substrate 70B to a predetermined gap. The lighting device may be a front light that outputs light from the counter substrate (second substrate) 70B side to the liquid-crystal layer 70C, for example.

The liquid-crystal layer 70C according to the first embodiment generates an electric field (a lateral electric field) between a first electrode 31 and a second electrode 32 laminated in a direction (a Z-direction) perpendicular to the surface of a TFT substrate 71 of the pixel substrate 70A in a direction parallel to the TFT substrate 71. As a result, the liquid-crystal molecules in the liquid-crystal layer 70C rotate in a plane parallel to the substrate surface. The display device 1 uses a change in the light transmittance corresponding to the rotation of the liquid-crystal molecules, thereby performing display. The second electrode 32 illustrated in FIG. 4 is the pixel electrode, whereas the first electrode 31 is the common electrode COM, for example. As illustrated in FIG. 4, a first orientation film 73a is provided between the liquid-crystal layer 70C and the pixel substrate 70A, whereas a second orientation film 73b is provided between the liquid-crystal layer 70C and the counter substrate 70B.

The counter substrate 70B includes a glass substrate 72 and the light-blocking black matrix 76a formed on one surface of the glass substrate 72. The black matrix 76a faces the liquid-crystal layer 70C in a direction perpendicular to the pixel substrate 70A. The explanation has been made of a case where the black matrix 76a and the color filters 76R, 76G, and 76B are formed on the counter substrate 70B side. Alternatively, the black matrix 76a and the color filters 76R, 76G, and 76B may be formed on the pixel substrate 70A side.

The pixel substrate 70A includes the TFT substrate 71 serving as a circuit substrate. The scanning line $24_m$ illustrated in FIG. 3 is formed on the TFT substrate 71. A gate electrode 93 is electrically coupled to the scanning line $24_m$. While the scanning line $24_m$ and the gate electrode 93 are formed in difference layers in FIGS. 3 and 4, the scanning line $24_m$ and the gate electrode 93 may be integrally formed.

A semiconductor layer 92 containing amorphous silicon (a-Si) and forming the TFT element Tr is formed in an upper layer of the gate electrode 93. The semiconductor layer 92 is coupled to the source electrode 91 forming the TFT element Tr. The source electrode 91 is an electric conductor and is electrically coupled to a part of the semiconductor layer 92. The source electrode 91 is electrically coupled to the signal line $25_n$ illustrated in FIG. 3 (not illustrated in FIG. 4). The semiconductor layer 92 is coupled to the drain electrode 90 forming the TFT element Tr. The drain electrode 90 is electrically coupled to another part of the semiconductor layer 92. While the signal line $25_n$ and the source electrode 91 are formed in difference layers in FIG. 3, the signal line $25_n$ and the source electrode 91 may be integrally formed.

An insulation layer 74 is formed of laminated insulation films, which are an insulation film 741 between the scanning line $24_m$ and the semiconductor layer 92, an insulation film 742 between the semiconductor layer 92 and the signal line $25_n$, an insulation film 743 between the signal line $25_n$ and the second electrode 32, and an insulation film 744 between the second electrode 32 and the first electrode 31, for example. The insulation films 741, 742, 743, and 744 may be made of the same insulation material, or any one thereof may be made of a different insulation material. For example, the insulation film 743 is made of an organic insulation material such as a polyimide resin and the other insulation films (insulation films 741, 742, and 744) are made of an inorganic insulation material such as silicon nitride and silicon oxide.

The contact 90H made of a conductive metal is formed in what is called a contact hole. The contact 90H couples the drain electrode 90 and the second electrode 32. The first electrode 31 serves as the common electrode COM and is supplied with a common potential to be supplied to the pixels in common. The first electrode 31 and the second electrode 32 are translucent electrodes made of a translucent conductive material (a translucent conductive oxide) such as indium tin oxide (ITO).

Figure 5:
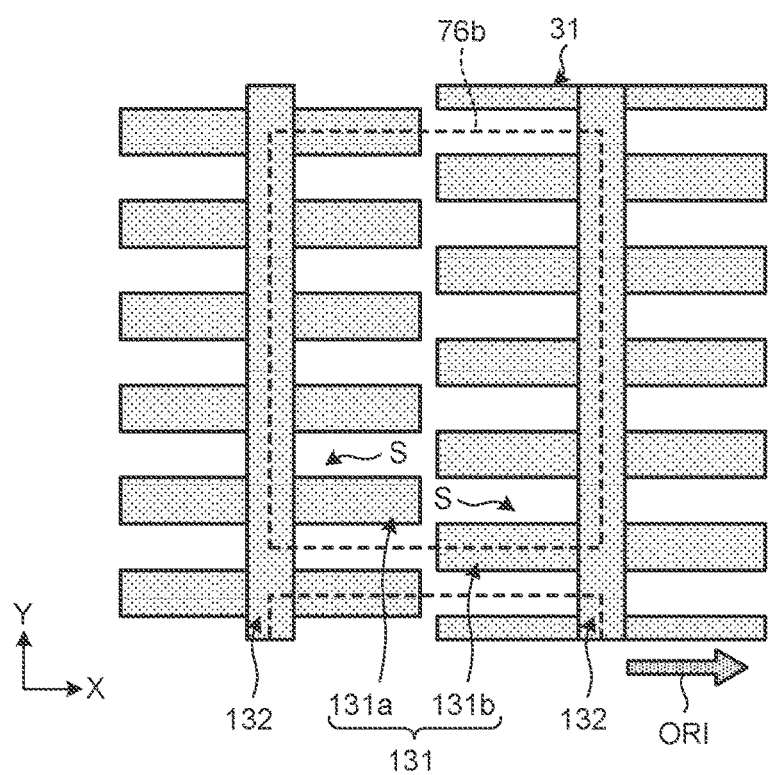
FIG. 5 is a schematic for explaining the relation between the shape of a first electrode and an aperture according to the first embodiment.

FIG. 5 is a schematic for explaining the relation between the shape of the first electrode and the aperture according to the first embodiment. As illustrated in FIG. 5, the first electrode 31 has a comb teeth shape formed by slits S, which are areas with no conductive material provided. The first electrode 31 includes a plurality of comb tooth portions 131 protruding from an electrode base portion 132 extending in the Y-direction. The comb tooth portions 131 include comb tooth portions 131a and comb tooth portions 131b extending in opposite directions from the electrode base portion 132. Adjacent comb tooth portions 131a protrude from the electrode base portion 132 with a predetermined distance interposed therebetween. Similarly, adjacent comb tooth portions 131b protrude from the electrode base portion 132 with a predetermined distance interposed therebetween. From a single electrode base portion 132, the comb tooth portions 131a extend in the X-direction, whereas the comb tooth portions 131b extend in a direction opposite to the X-direction. Similarly to the comb tooth portions 131a or the comb tooth portions 131b, the electrode base portion 132 is made of a translucent conductive material (a translucent conductive oxide) such as ITO.

Orientation Direction

The first orientation film 73a is subjected to orientation processing in an orientation direction ORI (a first orientation direction) illustrated in FIGS. 3 and 5 such that the liquid-crystal molecules have predetermined initial orientation in the X-direction. The second orientation film 73b is subjected to orientation processing in a direction (a second orientation direction) antiparallel to the orientation direction ORI of the first orientation film 73a. The orientation directions of the first orientation film 73a and the second orientation film 73b are antiparallel to each other. As described above, the comb tooth portions 131a extend in the X-direction, and the comb tooth portions 131b extend in the direction opposite to the X-direction. The orientation direction ORI is parallel to the direction in which the comb tooth portions 131a and the comb tooth portions 131b extend. The orientation direction ORI is assumed to be parallel as long as it is sufficiently parallel to maintain the rotation direction of liquid-crystal molecules LCQ illustrated in FIG. 9, which will be described later. More specifically, the orientation direction ORI allows a manufacturing error of 0 degrees to 0.5 degrees. To provide predetermined orientation to the liquid-crystal molecules, the following orientation films may be used: an orientation film formed by performing rubbing on an organic film such as a polyimide; or an optical orientation film that can be provided with a specific liquid-crystal orientation capability by irradiating the film with light such as ultraviolet rays.

Shaded Position

Figure 6:
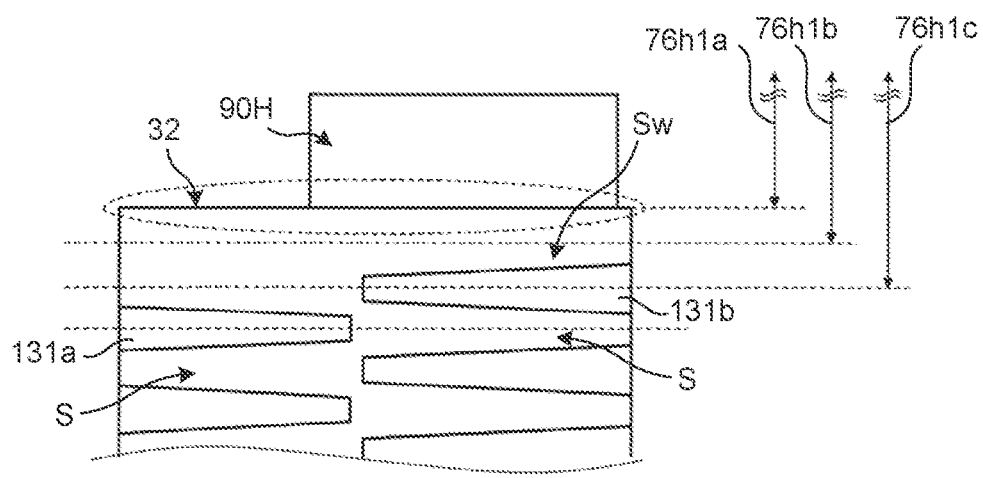
FIG. 6 is a schematic for explaining the relation between the shape of the first electrode and a shaded position according to the first embodiment.

FIG. 6 is a schematic for explaining the relation between the shape of the first electrode and a shaded position according to the first embodiment. The black matrix 76a simply needs to shade the pixel Vpix to the position of a width 76h1a illustrated in FIG. 6, thereby hiding the contact 90H. An electric field applied to the endmost slit Sw between the comb tooth portion 131b closest to the edge of the aperture 76b and the contact 90H has different distribution from that of an electric field applied to the slit S between adjacent comb tooth portions 131a or between adjacent comb tooth portions 131b. If the black matrix 76a shades the pixel Vpix to the position of a width 76h1b illustrated in FIG. 6 to hide the contact 90H and more than half of the endmost slit Sw, the rate of change in the transmittance of the endmost slit Sw can be made closer to that of the slit S. Alternatively, if the black matrix 76a shades the pixel Vpix to the position of a width 76h1c illustrated in FIG. 6 to hide the contact 90H and the endmost slit Sw, it is not necessary to consider the difference between the rates of change in the transmittance of the endmost slit Sw and the slit S. This structure can make the luminance in the aperture 76b uniform.

Figure 7:
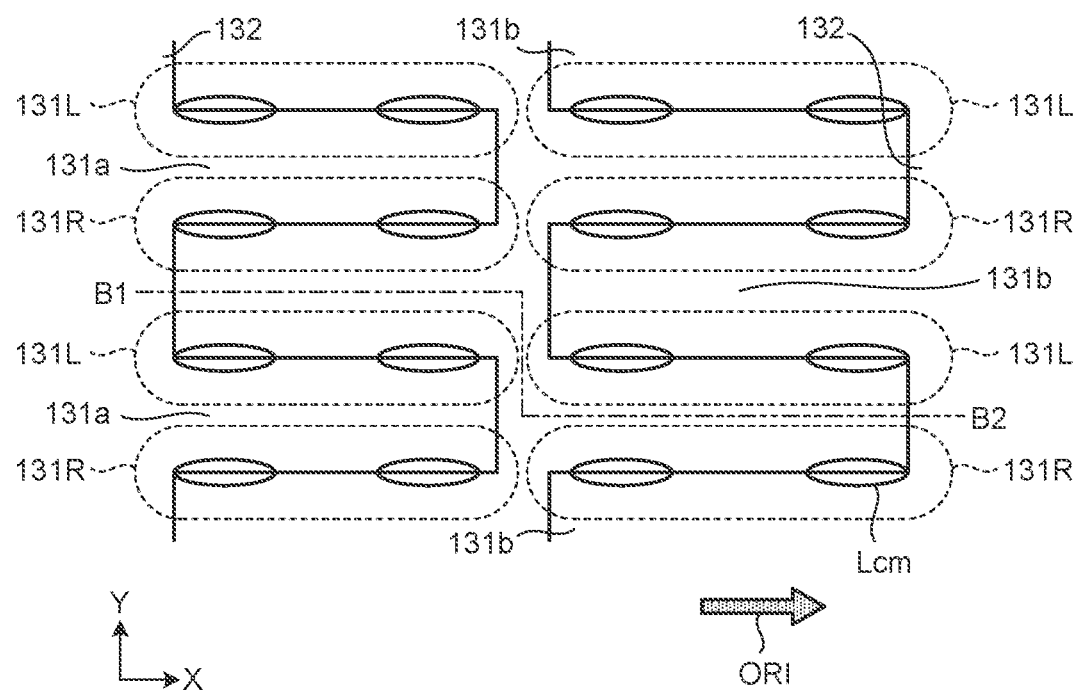
FIG. 7 is a schematic for explaining orientation of liquid crystals in a state where no voltage to generate an electric field between the first electrode and a second electrode is applied in the liquid-crystal display device according to the first embodiment.
Figure 8:
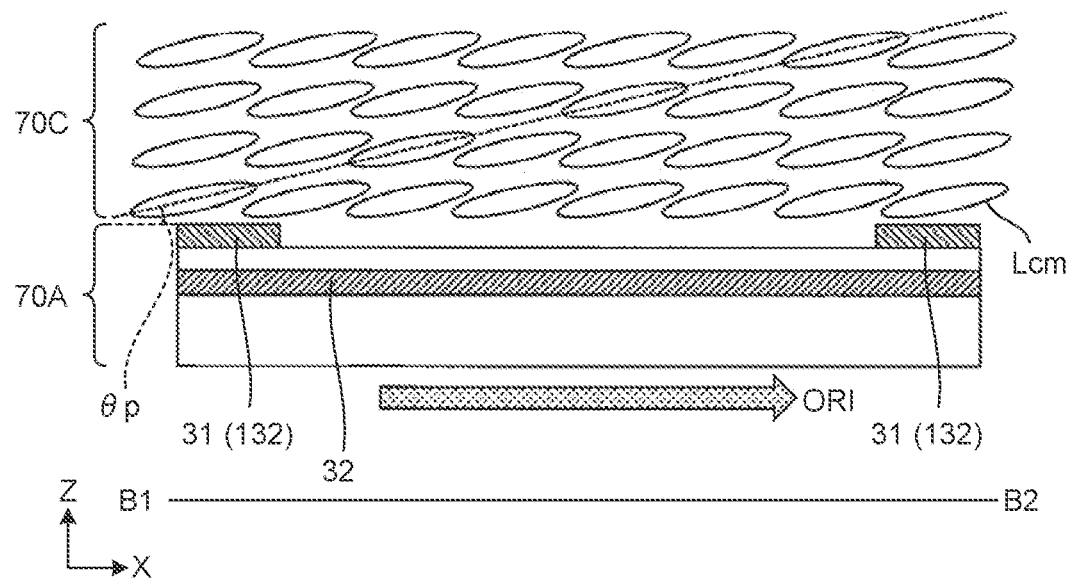
FIG. 8 is a schematic of a section along line B1-B2 in FIG. 7.
Figure 9:
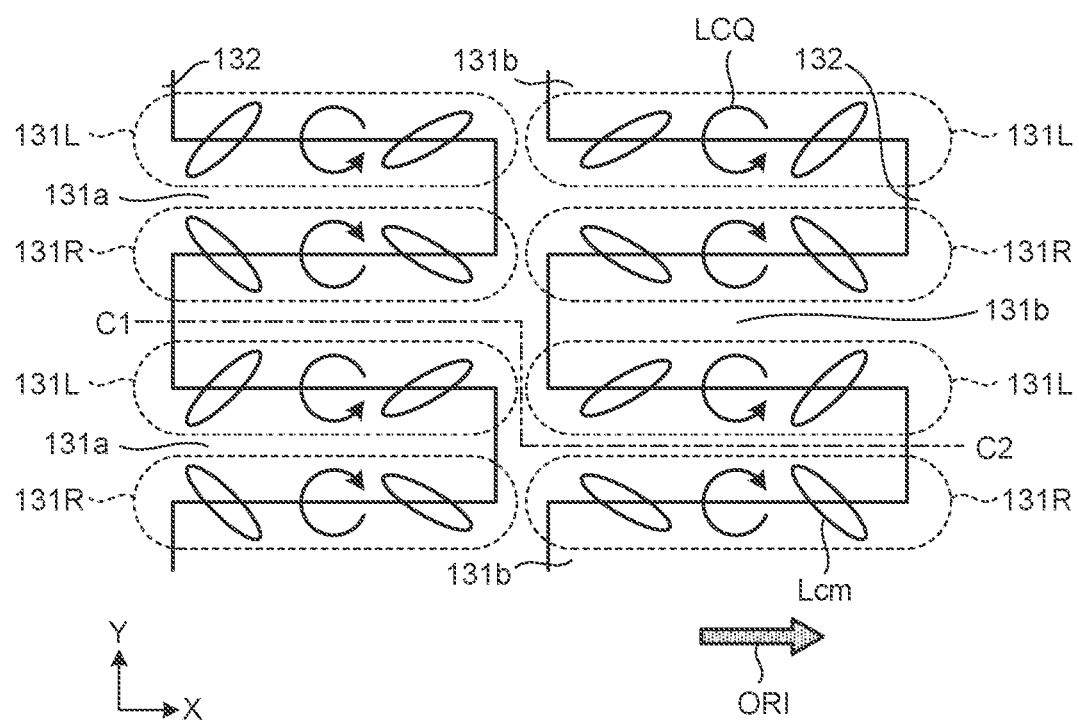
FIG. 9 is a schematic for explaining orientation of the liquid crystals in a state where voltage to generate an electric field between the first electrode and the second electrode is applied in the liquid-crystal display device according to the first embodiment.
Figure 10:
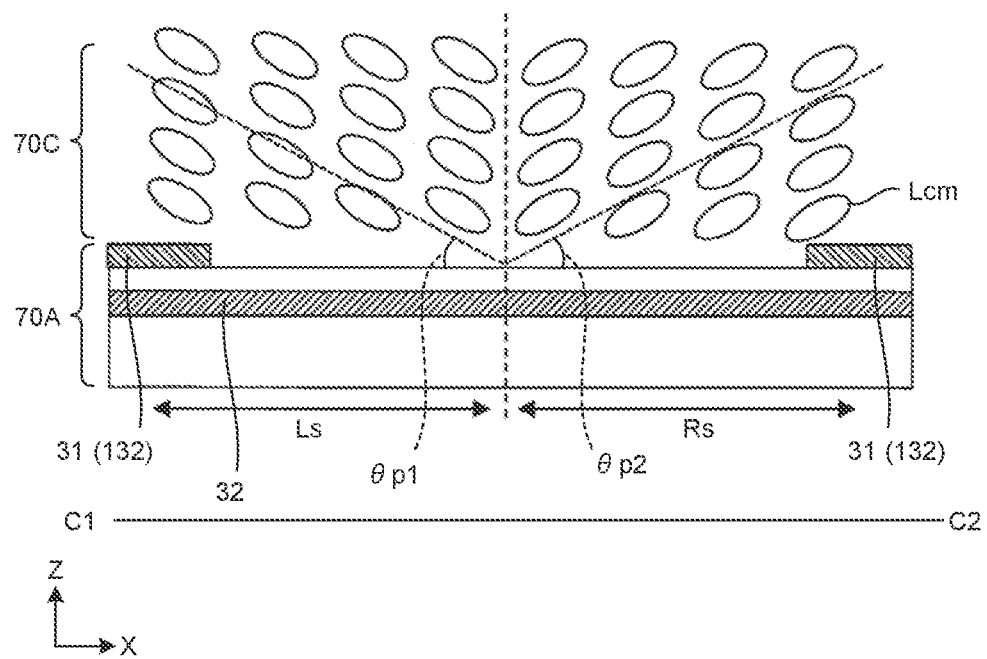
FIG. 10 is a schematic of a section along line C1-C2 in FIG. 9.
Figure 11:
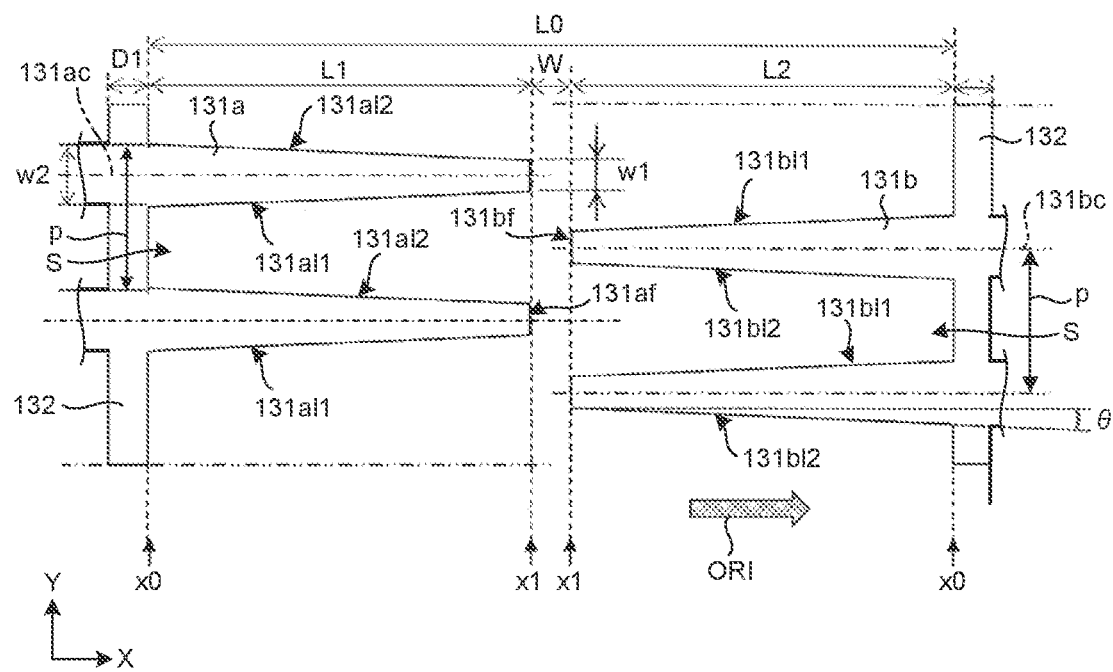
FIG. 11 is a schematic for explaining in detail the shape of the first electrode in a pixel according to the first embodiment.

FIG. 7 is a schematic for explaining orientation of the liquid crystals in a state where no voltage to generate an electric field between the first electrode and the second electrode is applied in the liquid-crystal display device according to the first embodiment. FIG. 8 is a schematic of a section along line B1-B2 in FIG. 7. FIG. 9 is a schematic for explaining orientation of the liquid crystals in a state where a voltage to generate an electric field between the first electrode and the second electrode is applied in the liquid-crystal display device according to the first embodiment. FIG. 10 is a schematic of a section along line C1-C2 in FIG. 9. FIG. 11 is a schematic for explaining in detail the shape of the first electrode in a pixel according to the first embodiment.

As described above, the first orientation film 73a is subjected to orientation processing in the orientation direction ORI illustrated in FIGS. 3 and 5 such that the liquid-crystal molecules have predetermined initial orientation in the X-direction. In a case where no voltage to generate an electric field between the first electrode 31 and the second electrode 32 is applied, the long-axis direction of liquid-crystal molecules Lcm in the liquid-crystal layer 70C tends to be aligned parallel to the direction in which the comb tooth portions 131a and the comb tooth portions 131b extend as illustrated in FIG. 7. As a result, the liquid-crystal molecules Lcm are initially oriented parallel to the direction in which the comb tooth portions 131a and the comb tooth portions 131b extend at neighboring areas of a right long side 131R and a left long side 131L of the comb tooth portions 131a and the comb tooth portions 131b facing in the width direction of the slit S. The liquid-crystal molecules Lcm illustrated in FIG. 8 are initially oriented along the orientation direction ORI and upward in the orientation direction ORI so as to have a pretilt angle θp with respect to the surface of the TFT substrate 71.

When a voltage to generate an electric field between the first electrode 31 and the second electrode 32 is applied, the liquid crystals Lcm rotate in a liquid-crystal rotation direction LCQ as illustrated in FIG. 9. In other words, the liquid-crystal rotation direction LCQ is a direction of twist or rotation of the liquid-crystals in the X-Y plane. The liquid-crystal molecules Lcm positioned at the neighboring area of the right long side 131R and those at the neighboring area of the left long side 131L are affected by electric fields in opposite directions and thus are likely to rotate in opposite directions.

As described above, in a case where a voltage is applied to the first electrode 31 and the second electrode 32, in the liquid-crystal layer 70C of the display device 1 according to the first embodiment, the liquid-crystal molecules Lcm rotate in the neighboring area of the right long side 131R and in the neighboring area of the left long side 131L in opposite directions. The right long side 131R is one of the sides of adjacent comb tooth portions 131a (131b) facing in the width direction of the slit S, whereas the left long side 131L is the other of the sides. The liquid-crystal molecules Lcm respond to a change in the electric field between the first electrode 31 and the second electrode 32 at higher speed in the display device 1 according to the first embodiment than in the FFS-mode display device disclosed in JP-A-2008-52161. As a result, the display device 1 according to the first embodiment achieves a higher response speed.

The response speed is a speed at which the transmittance of the liquid-crystals is shifted between predetermined levels when a voltage is applied to the first electrode 31 and the second electrode 32. In other words, the response speed is specified by a time required to shift the transmittance from a state where no voltage is applied (e.g., transmittance=0) to a state where a voltage is applied (transmittance=1) or a time required to shift the transmittance from the state where a voltage is applied to the state where no voltage is applied.

When a voltage to generate an electric field between the first electrode 31 and the second electrode 32 is applied, the long-axis direction of the liquid-crystal molecules Lcm rotates in a plane (X-Y plane) parallel to the surface of the pixel substrate 70A (TFT substrate 71) and changes also in the Z-direction as illustrated in FIG. 10. The first electrode 31 and the second electrode 32 are arranged facing each other in a direction perpendicular to the surface of the pixel substrate 70A (TFT substrate 71). Therefore, the electric field generated between the first electrode 31 and the second electrode 32 serves as a fringe electric field passing through the slits S. The fringe electric field causes the long axis of the liquid-crystal molecules Lcm to rotate in the liquid-crystal rotation directions LCQ (clockwise and counterclockwise) in the X-Y plane illustrated in FIG. 9 and to rise in the direction (Z-direction) perpendicular to the surface of the pixel substrate 70A (TFT substrate 71). The liquid-crystal rotation directions LCQ may possibly be mixed at the center area of the slits S.

As illustrated in FIG. 10, the long-axis direction of the liquid-crystal molecules Lcm has an angle θp2 larger than the pretilt angle θp in a slit area Rs between the comb tooth portions 131*b*. The long-axis direction of the liquid-crystal molecules Lcm has an angle θp1 opposite to the pretilt angle θp in a slit area Ls between the comb tooth portions 131*a*. The long-axis direction of the liquid-crystal molecules Lcm in the slit area Ls is less likely to rise and has lower responsiveness than the long-axis direction of the liquid-crystal molecules Lcm in the slit area Rs does.

By specifying the shape of the first electrode 31 more finely as illustrated in FIG. 11, it is possible to improve the responsiveness of the display device 1 according to the first embodiment. As illustrated in FIG. 11, L0 represents a total slit length between the electrode base portions 132 in the X-direction, for example. L1 represents a comb tooth protrusion length of the comb tooth portions 131*a* in the X-direction. The comb tooth protrusion length L1 corresponds to a length from a position x1 of a tip 131*af* of the comb tooth portions 131*a* to a protrusion start position x0 in the electrode base portion 132. Similarly, L2 represents a comb tooth protrusion length of the comb tooth portions 131*b* in the X-direction. The comb tooth protrusion length L2 corresponds to a length from a position x1 of a tip 131*bf* of the comb tooth portions 131*b* to a protrusion start position x0 in the electrode base portion 132. The width of the tip 131*af* of the comb tooth portions 131*a* and the tip 131*bf* of the comb tooth portions 131*b* in the Y-direction is w1. It is preferable that the total slit length L0 is 10 µm to 60 µm, for example. It is more preferable that the total slit length L0 is smaller than 40 µm, specifically to 20 µm, for example. In the display device 1 according to the first embodiment, a decrease in the total slit length L0 improves the orientation stability of the liquid crystals, whereas an increase in the total slit length L0 increases the luminance.

As described above, the long-axis direction of the liquid-crystal molecules Lcm in the slit area Ls in FIG. 10 may possibly be less likely to rise and have lower responsiveness than the long-axis direction of the liquid-crystal molecules Lcm in the slit area Rs does. To make the slit area Ls smaller than the slit area Rs, the comb tooth protrusion length L1 illustrated in FIG. 11 is made smaller than the comb tooth protrusion length L2 of the comb tooth portions 131*b* positioned on the upstream of the comb tooth portions 131*a* in the orientation direction ORI. Thus, the display device 1 according to the first embodiment can increase the response speed.

The width w1 of the tip 131*af* of the comb tooth portions 131*a* and the tip 131*bf* of the comb tooth portions 131*b* in the Y-direction is may be 2 µm to 5 µm, for example. Setting the width w1 smaller can increase the response speed.

An array pitch (a slit pitch) p between adjacent comb tooth portions 131*a* is equal to an array pitch between adjacent comb tooth portions 131*b*. The tip 131*af* of the comb tooth portions 131*a* and the tip 131*bf* of the comb tooth portions 131*b* are arranged alternately in the Y-direction. With this structure, the right long side 131R of the comb tooth portions 131*a* and the right long side 131R of the comb tooth portions 131*b* are aligned in the X-direction as illustrated in FIG. 9. With this structure, the left long side 131L of the comb tooth portions 131*a* and the left long side 131L of the comb tooth portions 131*b* are also aligned in the X-direction as illustrated in FIG. 9. As a result, the liquid-crystal rotation directions LCQ in which the liquid-crystal molecules Lcm rotate are the same direction viewed in the X-direction, thereby stabilizing the rotation behavior of the liquid-crystal molecules Lcm. Because a decrease in the array pitch p increases the response speed, it is preferable that the array pitch p is smaller than 9 µm.

The gap between the tip 131*af* of the comb tooth portions 131*a* and the tip 131*bf* of the comb tooth portions 131*b* illustrated in FIG. 11 corresponds to a width W in the X-direction of a communicating aperture extending in a longitudinal slit. It is preferable that the width W is a smaller value. The width W of the communicating aperture in the X-direction may be 7 µm or smaller, for example, and more preferably be 4 µm or smaller. The width W of the communicating aperture in the X-direction may be 0 or smaller. In a case where W=0 is satisfied, for example, the tip 131*af* of the comb tooth portions 131*a* and the tip 131*bf* of the comb tooth portions 131*b* are aligned in the Y-direction. In this case, the tips are arranged with gaps interposed therebetween in the Y-direction, whereby a plurality of slits S communicate with one another. In a case where W<0 is satisfied, the tip 131*af* of the comb tooth portions 131*a* and the tip 131*bf* of the comb tooth portions 131*b* enter into respective slits S adjacent thereto in the X-direction. In other words, the comb tooth portions 131*a* and the comb tooth portion 131*b* are alternately engaged.

The width of the comb tooth portions 131*a* in the Y-direction at the protrusion start position x0 in the electrode base portion 132 is represented by w2 and is larger than the width w1 of the tip 131*af* of the comb tooth portions 131*a* in the Y-direction. Thus, the comb tooth portions 131*a* have a trapezoidal shape. A long side 131*a*/1 and a long side 131*a*/2 of the comb tooth portions 131*a* are oblique to a reference direction of a vertical line 131*ac* passing through the center of the comb tooth portions 131*a* (X-direction in which the comb tooth portions 131*a* extend) by an angle θ. Setting the angle θ larger than 0.5 degrees can facilitate alignment of the liquid-crystal rotation directions LCQ in which the liquid-crystal molecules Lcm rotate, thereby stabilizing the behavior of the liquid-crystal molecules Lcm.

Similarly, the width of the comb tooth portions 131*b* in the Y-direction at the protrusion start position x0 in the electrode base portion 132 is represented by w2 and is larger than the width w1 of the tip 131*bf* of the comb tooth portions 131*b* in the Y-direction. Thus, the comb tooth portions 131*b* have a trapezoidal shape. A long side 131*b*/1 and a long side 131*b*/2 of the comb tooth portions 131*b* are oblique to a reference direction of a vertical line 131*bc* passing through the center of the comb tooth portions 131*b* (X-direction in which the comb tooth portions 131*b* extend) by an angle θ. Setting the angle θ larger than 0.5 degrees can facilitate alignment of the liquid-crystal rotation directions LCQ in which the liquid-crystal molecules Lcm rotate, thereby stabilizing the behavior of rotation of the liquid-crystal molecules Lcm. Because the liquid-crystal rotation directions are aligned in lines adjacent to each other in the X-direction and aligned on the X-direction line in the display device 1 according to the first embodiment, high orientation stability can be achieved.

In a case where the comb tooth protrusion length L1 of the comb tooth portions 131*a* or the comb tooth protrusion length L2 of the comb tooth portions 131*b* is long, it is necessary to increase the angle θ. As the angle θ increases, the difference between the width w1 and the width w2 increases. Therefore, the array pitch p is limited. In a case where the angle θ is 0.5 degrees to 1.0 degree, for example, it is preferable that the comb tooth protrusion length L1 of the comb tooth portions 131*a* or the comb tooth protrusion length L2 of the comb tooth portions 131*b* is 45 µm or smaller.

Because the electrode base portion 132 does not contribute to transmission of light, it is preferable that a width D1 of the electrode base portion 132 in the X-direction (direction orthogonal to the extending direction of the electrode base portion 132) is a smaller value. It is preferable that the width D1 is larger than 0 µm and equal to or smaller than 4 µm. Setting the width D1 larger than 0 µm can increase the conductivity, whereas setting the width D1 equal to or smaller than 4 µm can suppress reduction in the transmittance. In a case where the width D1 is larger than 0 µm and equal to or smaller than 4 µm and where the comb tooth protrusion length L1 of the comb tooth portions 131a or the comb tooth protrusion length L2 of the comb tooth portions 131b is 45 µm or smaller, the display area 21 can serve as a high-definition screen of 160 pixels per inch (ppi) or higher. Assuming the width w1 is 0.5 µm, for example, it is preferable that the width w2 is 1 µm or larger to ensure the quality throughout the comb tooth protrusion length L1 of the comb tooth portions 131a or the comb tooth protrusion length L2 of the comb tooth portions 131b.

As described above, the smaller the array pitch p is, the faster the response speed is. A decrease in the array pitch p, however, increases the width of the comb tooth portions 131a and the comb tooth portions 131b in the Y-direction, for example, resulting in an increase in the area that does not contribute to transmission of light. To improve the transmittance, it is effective to increase the comb tooth protrusion length L1 of the comb tooth portions 131a or the comb tooth protrusion length L2 of the comb tooth portions 131b. However, this structure may possibly make the liquid-crystal rotation directions LCQ in which the liquid-crystal molecules Lcm rotate unlikely to align, resulting in instability in the behavior of the liquid-crystal molecules Lcm. To address this, the comb tooth portions 131a or the comb tooth portions 131b preferably have oblique sides at a larger angle θ. If the angle θ of all the comb tooth portions 131a or the comb tooth portions 131b in the pixel Vpix is increased and the array pitch p is small, the area of the slits S may not possibly be secured.

Figure 12:
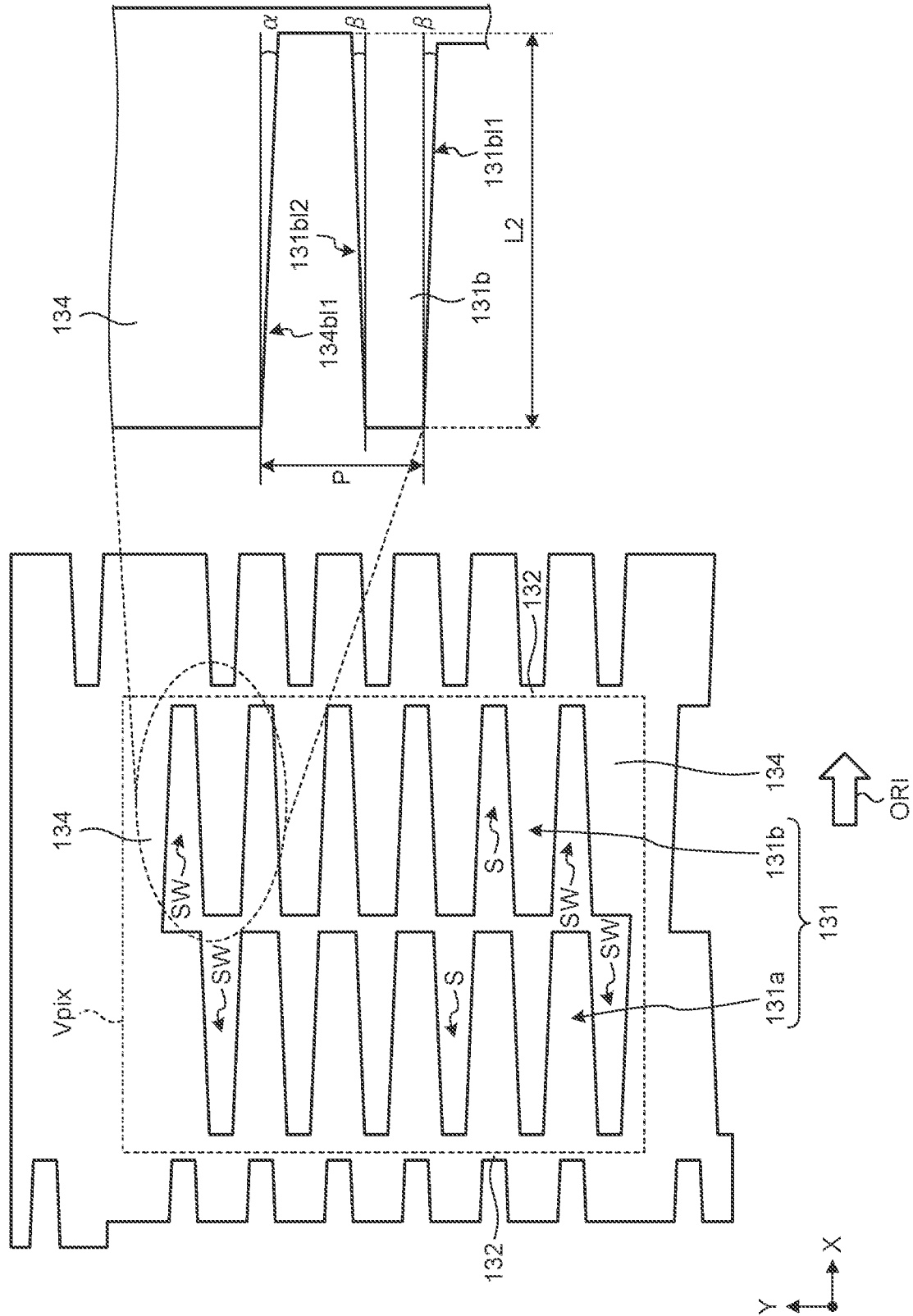
FIG. 12 is a schematic for explaining the shape of the first electrode in a pixel and the shape of the first electrode between pixels according to the first embodiment.

FIG. 12 is a schematic for explaining the shape of the first electrode in a pixel and the shape of the first electrode between pixels according to the first embodiment. As described above, an area around a comb tooth portion 134 closest to a boundary between pixels Vpix is hidden by the black matrix 76a. An electric field applied to the endmost slit Sw has different distribution from that of an electric field applied to the slit S between adjacent comb tooth portions 131a or between adjacent comb tooth portions 131b. The difference may possibly result in instability in the orientation of the liquid-crystals around the comb tooth portion 134. According to an analysis on the orientation stability in the pixel Vpix, it was found that instability in the orientation around the comb tooth portion 134 closest to the boundary between the pixels Vpix affects the orientation in the comb tooth portion 131a or the comb tooth portion 131b adjacent to the comb tooth portion 134 in the pixel Vpix. To address this, the first electrode 31 according to the first embodiment is configured to improve the orientation stability of the liquid crystals near the comb tooth portion 134, thereby reducing the influence on the comb tooth portion 131a or the comb tooth portion 131b in the pixel Vpix.

A long side (a first long side) 134b/1 of the comb tooth portion 134 is oblique to the reference direction by an angle α. One long side (a first long side) 131b/1 out of the long sides of the comb tooth portions 131b is a long side on the same side as that of the long side 134b/1. The angle α is larger than an angle β formed by the long side 131b/1 of the comb tooth portions 131b with respect to the reference direction. As a result, the long side 134b/1 of the comb tooth portion 134 is not parallel to the long side 131b/1 of the comb tooth portions 131b. Similarly, the first long side of the comb tooth portion 134 closest to the boundary between the pixels Vpix has a larger angle with respect to the reference direction than the first long side of the comb tooth portions 131a in the pixel does.

An angle formed by the other long side (a second long side) 131b/2 of the comb tooth portions 131b with respect to the reference direction is preferably equal to the angle β. This structure can make the stability of the liquid-crystals uniform between both of the long side 131b/1 and the long side 131b/2 of the comb tooth portions 131b.

As described above, the liquid-crystal display device 1 according to the first embodiment includes the pixel substrate 70A serving as the first substrate and the counter substrate 70B serving as the second substrate, which face each other, and the liquid-crystal layer 70C interposed therebetween. The pixel substrate 70A includes the first electrode 31 and the second electrode 32. One of the first electrode 31 and the second electrode 32 is a pixel electrode sectioned by each pixel Vpix. The first electrode 31 includes the electrode base portion 132 and the comb tooth portions 131a, 131b, and 134. The electrode base portion 132 extends in a first direction. The comb tooth portions 131a, 131b, and 134 each extend in a second direction different from the first direction and protrude in a comb teeth shape from the electrode base portion 132 with a predetermined distance interposed between the teeth. Adjacent comb tooth portions have the relation in which the first long side 134b/1 of the comb tooth portion 134 closest to the boundary between the pixels Vpix is not parallel to the first long side 131b/1 of the comb tooth portions 131 in the pixel Vpix. The angle α formed by the long side 134b/1 of the comb tooth portions 134 with respect to the reference direction is larger than the angle β formed by the long side 131b/1 of the comb tooth portions 131b with respect to the reference direction. This structure improves the orientation stability of the liquid crystals near the comb tooth portion 134. As a result, it is possible to suppress an influence of the liquid-crystal orientation around the comb tooth portion 134 closest to the boundary between the pixels Vpix on the liquid-crystal orientation of the comb tooth portion 131a or the comb tooth portion 131b adjacent to the comb tooth portion 134 in the pixel Vpix and to improve in-plane display quality. Setting the angle β smaller than the angle α facilitates securing the area of the slits S. Setting the angle β smaller than the angle α can narrow the array pitch p. This structure can increase the response speed of the liquid crystals in the pixel Vpix. The orientation direction ORI (first orientation direction) may be used as the reference direction, for example.

The angle β formed by the long side 131b/1 of all the comb tooth portions 131b may vary in the pixel Vpix. The angle β formed by the long side 131b/1 of the comb tooth portions 131b in the pixel Vpix with respect to the reference direction may be larger in order of proximity to the comb tooth portion 134 closest to the boundary between the pixels Vpix. This structure can improve the orientation stability of the liquid crystals at the boundary between the pixels Vpix.

In the comb tooth portions 131a or the comb tooth portions 131b according to the first embodiment, it is preferable that the width w2 in the Y-direction at the protrusion start position x0 in the electrode base portion 132 is smaller than a value obtained by multiplying the array pitch p of adjacent comb tooth portions 131a or adjacent comb tooth portions 131b by 0.5 as illustrated in FIG. 11. This structure can suppress reduction in the maximum transmittance of light passing through the pixel Vpix even in a case where the width w2 in the Y-direction varies depending on the conditions of manufacturing the comb tooth portions 131a or the comb tooth portions 131b. This structure can suppress reduction in the maximum transmittance of light passing through the pixel Vpix also in a case where the array pitch p varies depending on the conditions of manufacturing the comb tooth portions 131a or the comb tooth portions 131b.

In the comb tooth portions 131a or the comb tooth portions 131b according to the first embodiment, the width w2 in the Y-direction at the protrusion start position x0 in the electrode base portion 132 is smaller than a value obtained by multiplying the array pitch p of adjacent comb tooth portions 131a or adjacent comb tooth portions 131b by 0.45. This structure can reduce variation in the transmittance depending on a voltage applied to the comb tooth portions 131a or the comb tooth portions 131b. As a result, it is possible to decrease reduction in the maximum transmittance of light passing through the pixel Vpix even in a case where the width w2 in the Y-direction varies with respect to the comb tooth portions 131a or the comb tooth portions 131b to which the same voltage is applied.

Figure 46:
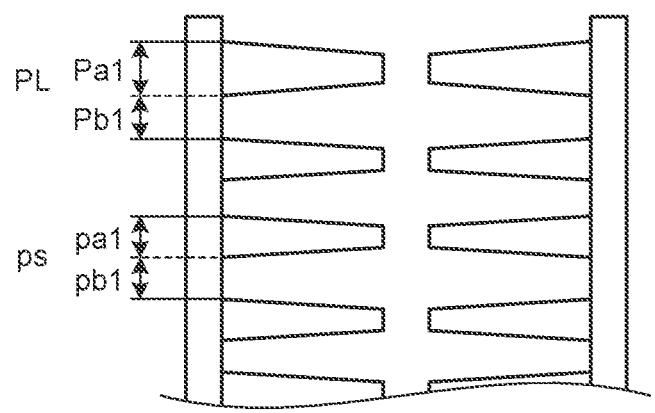
FIG. 46 is a schematic for explaining a case where an array pitch of a first comb tooth portion closest to a boundary between pixels is different from an array pitch of a second comb tooth portion in a pixel according to the present embodiment.
Figure 47:
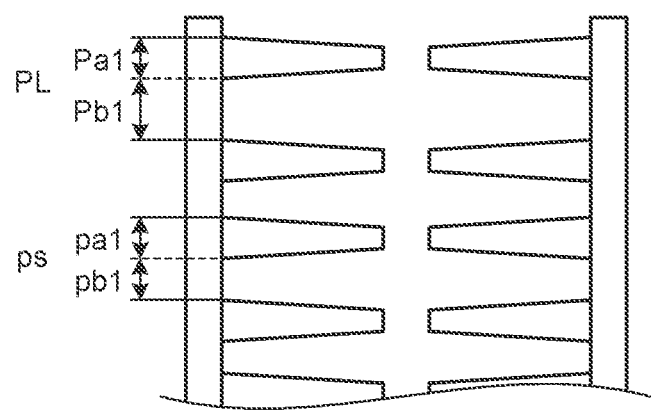
FIG. 47 is a schematic for explaining a case where an array pitch of a first comb tooth portion closest to a boundary between pixels is different from an array pitch of a second comb tooth portion in a pixel according to the present embodiment.

In terms of the array pitch p, an array pitch PL of the comb tooth portion 134 closest to the boundary between the pixels Vpix may be different from an array pitch ps of a comb tooth portion in the pixel Vpix as illustrated in FIGS. 46 and 47, which will be described later. In other words, in the liquid-crystal display device 1 according to the first embodiment, the array pitch ps of the comb tooth portions 131a or the comb tooth portions 131b in the pixel Vpix may be larger than the array pitch PL corresponding to the area around the comb tooth portion 134.

Manufacturing Method

The method for manufacturing the display device 1 according to the first embodiment includes the following process, for example. A manufacturing apparatus performs a first substrate preparation process to prepare a glass substrate, which is a translucent substrate, as the TFT substrate 71 of the pixel substrate (first substrate) 70A.

Subsequently, the manufacturing apparatus forms the scanning line $24_m$ and the gate electrode 93 on the TFT substrate 71. The manufacturing apparatus then forms the insulation film 741 between the scanning line $24_m$ and the gate electrode 93, and the semiconductor layer 92 to be formed, on the TFT substrate 71. The manufacturing apparatus then forms the layer of the source electrode 91, the drain electrode 90, and the semiconductor layer 92, for example. The manufacturing apparatus then forms the insulation film 742 between the semiconductor layer 92 and the signal line $25_n$ to be formed. The manufacturing apparatus then forms the signal line $25_n$ and couples the signal line $25_n$ to the source electrode 91. The manufacturing apparatus then forms the insulation film 743 between the signal line $25_n$ and the second electrode 32 to be formed.

Subsequently, the manufacturing apparatus forms the second electrode 32 serving as a pixel electrode by sputtering or etching, for example. The manufacturing apparatus then couples the drain electrode 90 and the second electrode 32 via the conductive contact 90H. The thickness of the second electrode 32 is 10 nm to 100 nm, for example. The manufacturing apparatus then forms the insulation film 744 on the second electrode 32 by plasma-enhanced chemical vapor deposition (CVD), for example.

Subsequently, the manufacturing apparatus forms the first electrode 31 by sputtering or etching, for example. The manufacturing apparatus then couples the first electrode 31 to the common electrode COM. The thickness of the first electrode 31 is 10 nm to 100 nm, for example. The first electrode 31 is formed into a comb teeth shape with the slits S. The manufacturing apparatus then forms the first orientation film 73a by performing processing in the orientation direction ORI on a polymeric material such as a polyimide on the first electrode 31. Thus, the manufacturing apparatus performs the manufacturing process of the first substrate.

The manufacturing apparatus performs a second substrate preparation process to prepare a glass substrate, which is a translucent substrate, as the glass substrate 72 of the counter substrate (second substrate) 70B.

The manufacturing apparatus forms the layer of the color filters 76R, 76G, and 76B and the black matrix 76a on the glass substrate 72 and then forms an overcoat layer and the like on the layer. The manufacturing apparatus then forms the second orientation film 73b by performing processing antiparallel (in an opposite direction) to the orientation direction ORI on a polymeric material such as a polyimide on the overcoat layer. Thus, the manufacturing apparatus performs the manufacturing process of the second substrate.

The manufacturing apparatus causes the pixel substrate 70A and the counter substrate 70B to face each other. The manufacturing apparatus injects liquid crystals between the substrates and seals the liquid crystal section with the frame edge, thereby forming the liquid-crystal layer 70C. The back surface of the pixel substrate 70A is provided with a polarizing plate and a backlight, whereas the front surface thereof is provided with a polarizing plate and the like. The driver IC 3 is coupled to an electrode terminal on the frame edge. Thus, the display device 1 is manufactured.

While the first embodiment uses a-Si as the semiconductor layer 92 forming the TFT element Tr, it is not limited thereto. The embodiment may use polycrystalline silicon (poly-Si) as the semiconductor layer 92. The embodiment may use another semiconductor material (e.g., germanium (Ge)) instead of silicon or a material obtained by adding another material to silicon (e.g., silicon germanium (SiGe)). The embodiment may use an oxide semiconductor material as the semiconductor layer 92. Examples of the oxide semiconductor material include, but are not limited to, an oxide semiconductor material including indium (In), etc.

In the first embodiment, the TFT element Tr is a bottom gate TFT in which the gate electrode 93 is provided below the semiconductor layer 92. The first embodiment may use a top gate TFT in which the gate electrode 93 is provided above the semiconductor layer 92 if possible. In the case of using a top gate TFT as the TFT element Tr, the manufacturing apparatus manufactures: the semiconductor layer 92, the scanning line $24_m$ and the gate electrode 93, and the signal line $25_n$ in this order; or the semiconductor layer 92, the signal line $25_n$, and the scanning line $24_m$ and the gate electrode 93 in this order, instead of the manufacturing process described above.

First Modification of the First Embodiment

Figure 13:
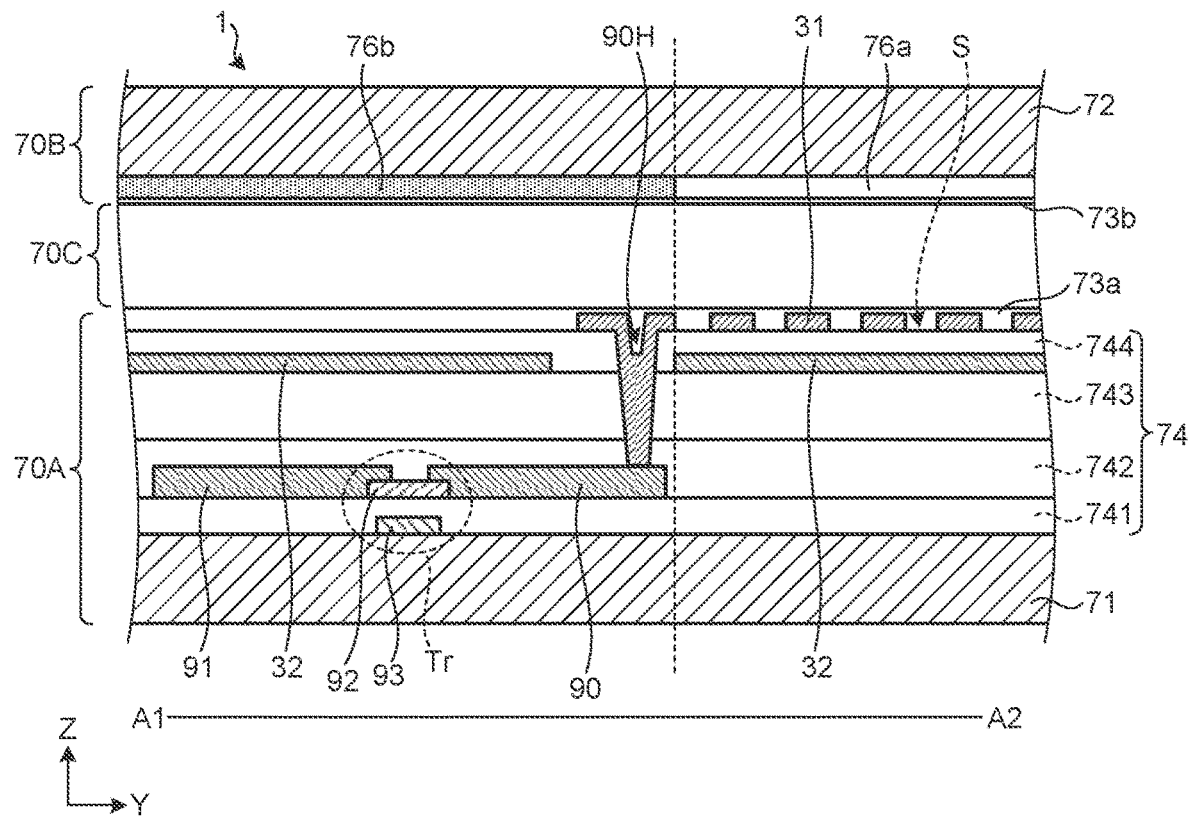
FIG. 13 is a schematic of a modification of the section along line A1-A2 in FIG. 3.

A display device 1 according to a first modification of the first embodiment will be described. FIG. 13 is a schematic of a modification of the section along line A1-A2 in FIG. 3. Components identical to those described in the first embodiment are denoted by like reference numerals, and overlapping explanation thereof will be omitted.

The display device 1 according to the first modification of the first embodiment generates an electric field (a lateral electric field) between the first electrode 31 and the second electrode 32 laminated in a direction (Z-direction) perpendicular to the surface of the TFT substrate 71 of the pixel substrate 70A in a direction parallel to the TFT substrate 71. As a result, liquid-crystal molecules in the liquid-crystal layer 70C rotate in a plane parallel to the substrate surface. The display device 1 uses a change in the light transmittance corresponding to the rotation of the liquid-crystal molecules, thereby performing display. The second electrode 32 illustrated in FIG. 13 is the common electrode COM, whereas the first electrode 31 is the pixel electrode, for example. The first electrode 31 is coupled to the drain electrode 90 via the conductive contact 90H, for example. The first electrode 31 is sectioned by each area of the pixel Vpix and has an independent pattern electrically insulated from the first electrode 31 in an area of the pixel Vpix adjacent thereto.

Second Modification of the First Embodiment

Figure 14:
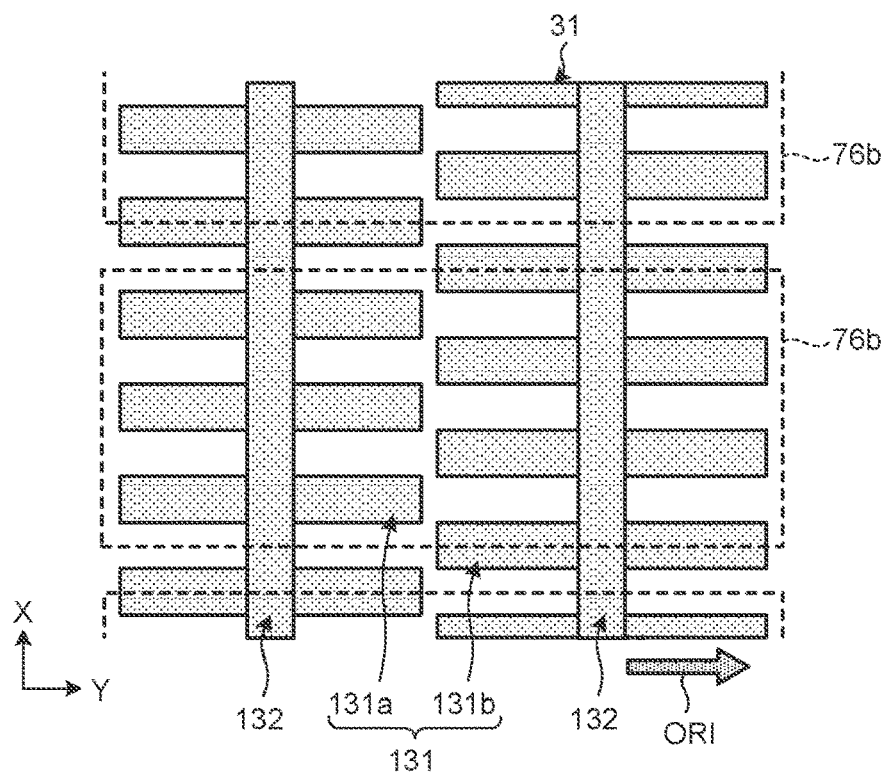
FIG. 14 is a schematic for explaining a modification of the relation between the shape of the first electrode and the aperture according to the first embodiment.

A display device 1 according to a second modification of the first embodiment will be described. FIG. 14 is a schematic for explaining a modification of the relation between the shape of the first electrode and the aperture according to the first embodiment. Components identical to those described in the first embodiment are denoted by like reference numerals, and overlapping explanation thereof will be omitted.

The first electrode 31 includes the comb tooth portions 131 protruding from the electrode base portion 132 extending in the X-direction. The comb tooth portions 131 include the comb tooth portions 131a and the comb tooth portions 131b extending in opposite directions from the electrode base portion 132. Adjacent comb tooth portions 131a protrude from the electrode base portion 132 with a predetermined distance interposed therebetween. Similarly, adjacent comb tooth portions 131b protrude from the electrode base portion 132 with a predetermined distance interposed therebetween. From a single electrode base portion 132, the comb tooth portions 131a extend in the Y-direction, whereas the comb tooth portions 131b extend in a direction opposite to the extending direction of the comb tooth portions 131a in the Y-direction.

The first orientation film 73a is subjected to orientation processing in the orientation direction ORI illustrated in FIG. 14 such that the liquid-crystal molecules have predetermined initial orientation in the Y-direction. The second orientation film 73b is subjected to orientation processing antiparallel to the orientation direction ORI of the first orientation film 73a. The orientation directions of the first orientation film 73a and the second orientation film 73b are antiparallel to each other.

1-2. Second Embodiment

Figure 15:
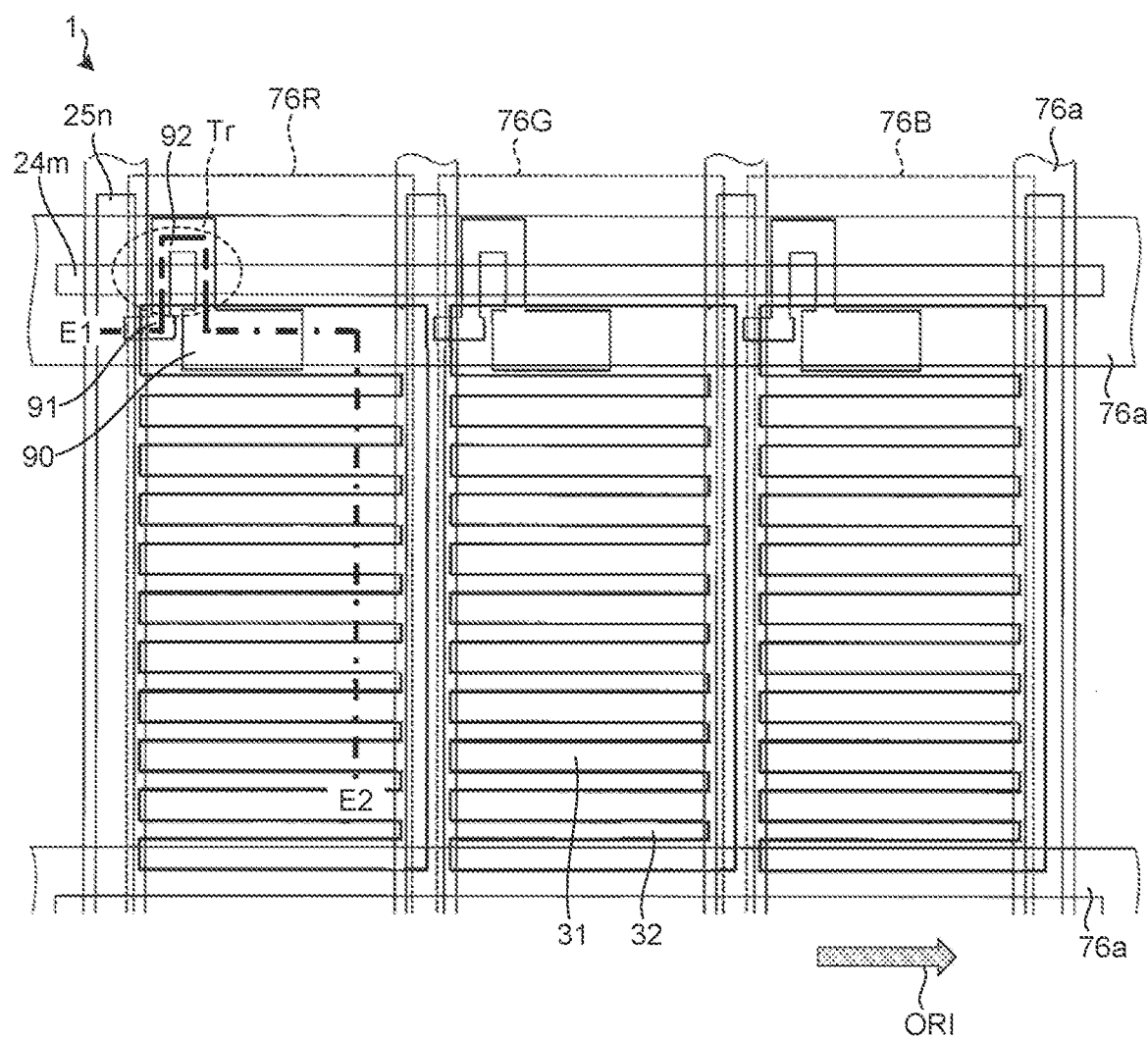
FIG. 15 is a plan view for explaining pixels of a liquid-crystal display device according to a second embodiment.
Figure 16:
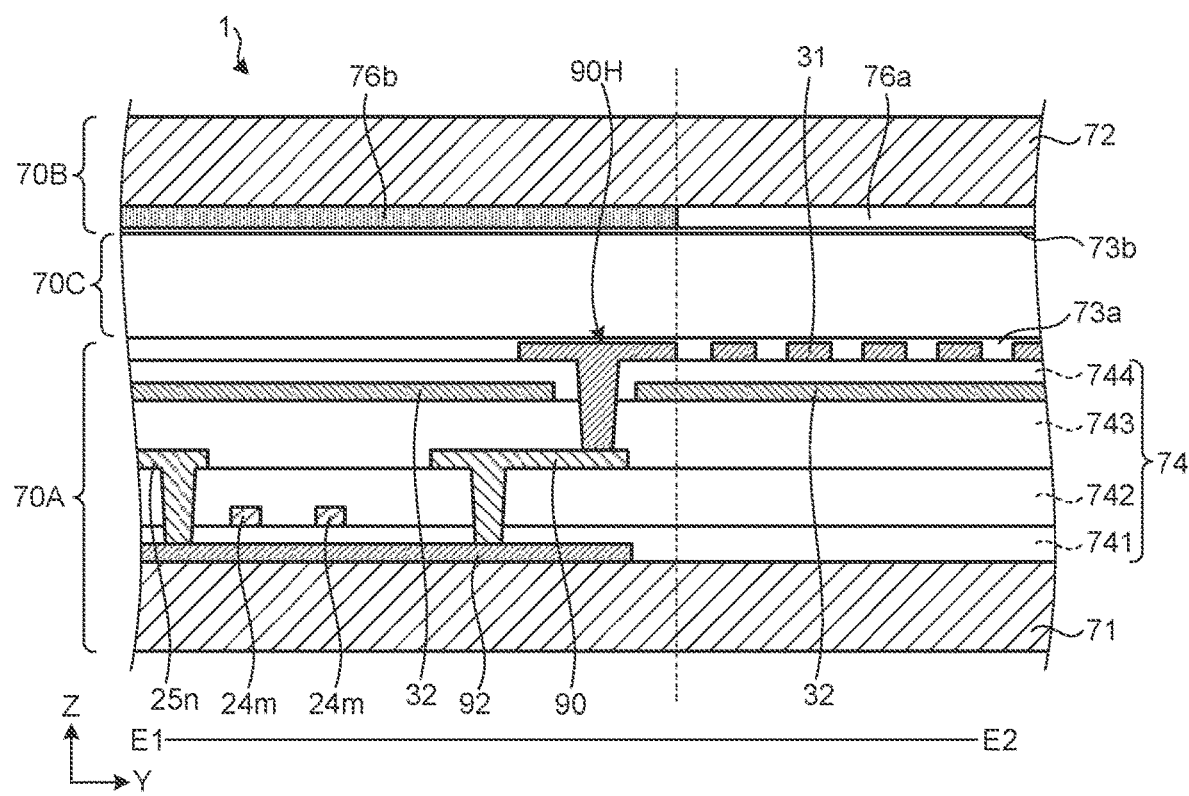
FIG. 16 is a schematic of a section along line E1-E2 in FIG. 15.
Figure 17:
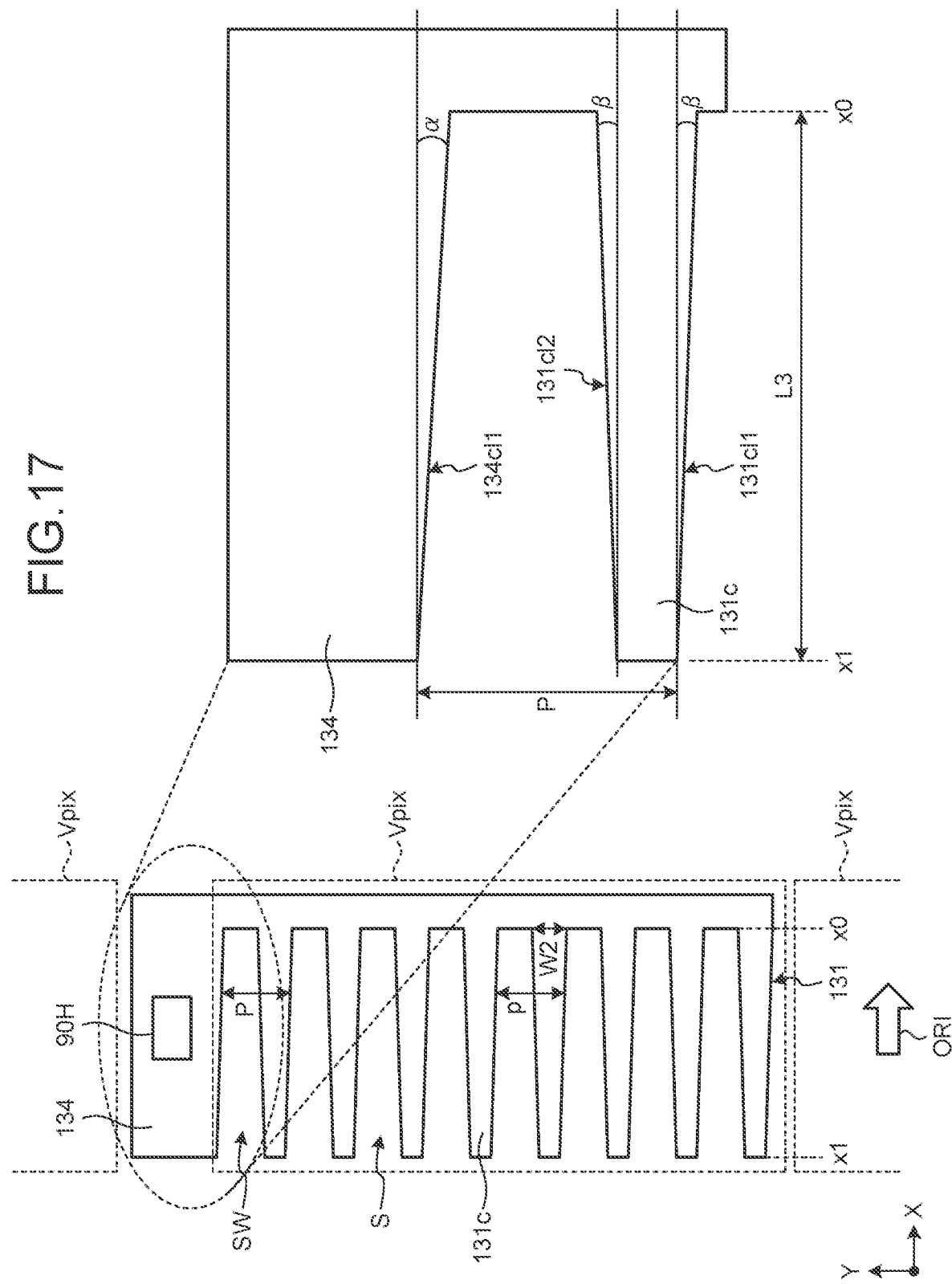
FIG. 17 is a schematic for explaining the shape of a first electrode in a pixel and the shape of the first electrode between pixels according to the second embodiment.

A display device 1 according to a second embodiment will be described. FIG. 15 is a plan view for explaining pixels of the liquid-crystal display device according to the second embodiment. FIG. 16 is a schematic of a section along line E1-E2 in FIG. 15. FIG. 17 is a schematic for explaining the shape of a first electrode in a pixel and the shape of the first electrode between pixels according to the second embodiment. Components identical to those described in the first embodiment are denoted by like reference numerals, and overlapping explanation thereof will be omitted.

As illustrated in FIG. 15, the semiconductor layer 92 is poly-Si forming the TFT element Tr. The semiconductor layer 92 is a double-gate transistor forming a channel with two areas.

As illustrated in FIGS. 15 and 16, the display device 1 according to the second embodiment generates an electric field (a lateral electric field) between the first electrode 31 and the second electrode 32 laminated in a direction (Z-direction) perpendicular to the surface of the TFT substrate 71 of the pixel substrate 70A in a direction parallel to the TFT substrate 71. As a result, liquid-crystal molecules in the liquid-crystal layer 70C rotate in a plane parallel to the substrate surface. The display device 1 uses a change in the light transmittance corresponding to the rotation of the liquid-crystal molecules, thereby performing display. The second electrode 32 illustrated in FIG. 16 is the common electrode COM, whereas the first electrode 31 is the pixel electrode, for example. The first electrode 31 is coupled to the conductive drain electrode 90, for example. The first electrode 31 is sectioned by each area of the pixel Vpix and has an independent pattern electrically insulated from the first electrode 31 in an area of the pixel Vpix adjacent thereto.

As illustrated in FIG. 17, the first electrode 31 has a comb teeth shape formed by slits S, which are areas with no conductive material provided. The first electrode 31 includes the comb tooth portions 131 protruding from the electrode base portion 132 extending in the Y-direction. Unlike the first embodiment, the comb tooth portions 131 include comb tooth portions 131c extending in one direction from the electrode base portion 132. Adjacent comb tooth portions 131c protrude from the electrode base portion 132 with a predetermined distance interposed therebetween. From a single electrode base portion 132, the comb tooth portions 131c may extend in a direction opposite to the extending direction of the comb tooth portions 131c illustrated in FIG. 22 in the X-direction. From a single electrode base portion 132, the comb tooth portions 131c may extend in the X-direction.

The first orientation film 73a is subjected to orientation processing in the orientation direction ORI illustrated in FIGS. 3 and 5 such that the liquid-crystal molecules have predetermined initial orientation in the X-direction. The second orientation film 73b is subjected to orientation processing antiparallel to the orientation direction ORI of the first orientation film 73a. The orientation directions of the first orientation film 73a and the second orientation film 73b are antiparallel to each other.

Similarly to the display device 1 according to the first embodiment, in a case where a voltage is applied to the first electrode 31 and the second electrode 32, the liquid-crystal layer 70C of the display device 1 according to the second embodiment rotates the liquid-crystal molecules in the neighboring area of the right long side 131R and those in the neighboring area of the left long side 131L in opposite directions. The right long side 131R is one of the sides of adjacent comb tooth portions 131c facing in the width direction of the slit S, whereas the left long side 131L is the other of the sides. Thus, the liquid-crystal molecules respond to a change in the electric field between the first electrode 31 and the second electrode 32 at higher speed in the display device 1 according to the second embodiment than in the FFS-mode display device disclosed in JP-A-2008-52161. As a result, the display device 1 according to the second embodiment achieves a higher response speed.

Similarly to the comb tooth protrusion length L2 of the comb tooth portions 131b, in a case where a comb tooth protrusion length L3 of the comb tooth portions 131c is long, it is necessary to increase the angle θ. As the angle θ increases, the difference between the width w1 and the width w2 increases. Therefore, the array pitch p is limited. In a case where the angle θ is 0.5 degrees to 1.0 degree, for example, it is preferable that the comb tooth protrusion length L3 of the comb tooth portions 131c is 45 μm or smaller.

Because the electrode base portion 132 does not contribute to transmission of light, it is preferable that the width D1 of the electrode base portion 132 in the X-direction (direction orthogonal to the extending direction of the electrode base portion 132) is a smaller value. It is preferable that the width D1 is larger than 0 μm and equal to or smaller than 4 μm. Setting the width D1 larger than 0 μm can improve the conductivity, whereas setting the width D1 equal to or smaller than 4 μm can suppress reduction in the transmittance. In a case where the width D1 is larger than 0 μm and equal to or smaller than 4 μm and where the comb tooth protrusion length L3 of the comb tooth portions 131c is 45 μm or smaller, the display area 21 can serve as a high-definition screen of 160 ppi or higher. Assuming the width w1 is 0.5 μm, for example, it is preferable that the width w2 is 1 μm or larger to ensure the quality throughout the comb tooth protrusion length of the comb tooth portions 131c.

As described above, the smaller the array pitch p is, the faster the response speed is. A decrease in the array pitch p, however, increases the width of the comb tooth portions 131c in the Y-direction, for example, resulting in an increase in the area that does not contribute to transmission of light. To improve the transmittance, it is effective to increase the comb tooth protrusion length L3 of the comb tooth portions 131c. However, this structure may possibly make the liquid-crystal rotation directions LCQ in which the liquid-crystal molecules Lcm rotate unlikely to align, resulting in instability in the behavior of the liquid-crystal molecules Lcm. To address this, the comb tooth portions 131c preferably have oblique sides at a larger angle β. If the angle β of all the comb tooth portions 131c in the pixel Vpix is increased and the array pitch p is small, the area of the slits S may not possibly be secured.

As illustrated in FIG. 17, an electric field applied to the endmost slit Sw has different distribution from that of an electric field applied to the slit S between adjacent comb tooth portions 131c, which may possibly result in instability in the orientation. According to an analysis on the orientation stability in the pixel Vpix, it was found that instability in the orientation around the comb tooth portion 134 closest to the boundary between the pixels Vpix affects the orientation in the comb tooth portion 131c adjacent to the comb tooth portion 134 in the pixel Vpix. To address this, the first electrode according to the second embodiment is configured to improve the orientation stability of the liquid crystals near the comb tooth portion 134, thereby reducing the influence on the comb tooth portion 131c in the pixel Vpix.

A long side (a first long side) 134c/1 of the comb tooth portion 134 is oblique to the reference direction by an angle α. The angle α is larger than the angle β formed by a long side (a first long side) 131c/1 of the comb tooth portions 131c with respect to the reference direction. As a result, the long side 134c/1 of the comb tooth portion 134 is not parallel to the long side 131c/1 of the comb tooth portions 131c. It is also preferable that the angle of a long side (a second long side) 131c/2 of the comb tooth portions 131c is equal to the angle β. By making an array pitch p of the comb tooth portions 131c in the pixel Vpix larger than an array pitch P of the area around the comb tooth portion 134, it is possible to stabilize the orientation. Because the angle β is smaller than the angle α, the area of the slits S can be secured, and the array pitch p can fall within a predetermined range. This structure can increase the response speed of the liquid crystals in the pixel Vpix as a whole.

In the liquid-crystal display device 1 according to the second embodiment, the first electrode 31 includes the electrode base portion 132 and the comb tooth portions 131c and 134. The electrode base portion 132 extends in a first direction. The comb tooth portions 131c and 134 each extend in a second direction different from the first direction and protrude in a comb teeth shape from the electrode base portion 132 with a predetermined distance interposed between the teeth. The first long side 134c/1 of the comb tooth portion 134 closest to the boundary between the pixels Vpix is not parallel to the first long side 131c/1 of the comb tooth portions 131c in the pixel Vpix. The angle α is larger than the angle β formed by the long side 131c/1 of the comb tooth portions 131b with respect to the reference direction. This structure improves the orientation stability of the liquid crystals near the comb tooth portion 134. As a result, it is possible to suppress an influence of the liquid-crystal orientation around the comb tooth portion 134 closest to the boundary between the pixels Vpix on the liquid-crystal orientation of the comb tooth portion 131c adjacent to the comb tooth portion 134 in the pixel Vpix and to improve in-plane display quality. Setting the angle β smaller than the angle α facilitates securing the area of the slits S with a smaller array pitch p. This structure can increase the response speed of the liquid crystals in the pixel Vpix.

In the comb tooth portions 131c according to the second embodiment, the width w2 in the Y-direction at the protrusion start position x0 in the electrode base portion 132 is smaller than a value obtained by multiplying the array pitch p of adjacent comb tooth portions 131c by 0.5 as illustrated in FIG. 17. This structure can suppress reduction in the maximum transmittance of light passing through the pixel Vpix even in a case where the width w2 in the Y-direction varies depending on the conditions of manufacturing the comb tooth portions 131c. This structure can suppress reduction in the maximum transmittance of light passing through the pixel Vpix also in a case where the array pitch p varies depending on the conditions of manufacturing the comb tooth portions 131c.

In the comb tooth portions 131c according to the second embodiment, the width w2 in the Y-direction at the protrusion start position x0 in the electrode base portion 132 is smaller than a value obtained by multiplying the array pitch p of adjacent comb tooth portions 131c by 0.45. This structure can reduce variation in the transmittance depending on a voltage applied to the comb tooth portions 131c. As a result, it is possible to decrease reduction in the maximum transmittance of light passing through the pixel Vpix even in a case where the width w2 in the Y-direction varies with respect to the comb tooth portions 131c to which the same voltage is applied.

In terms of the array pitch p, an array pitch PL of the comb tooth portion 134c closest to the boundary between the pixels Vpix may be different from an array pitch ps of the comb tooth portion 131c in the pixel Vpix as illustrated in FIGS. 46 and 47, which will be described later. In other words, the liquid-crystal display device 1 according to the second embodiment may be the array pitch ps of the comb tooth portions 131c in the pixel Vpix larger than the array pitch PL corresponding to the area around the comb tooth portion 134c.

First Modification of the Second Embodiment

Figure 18:
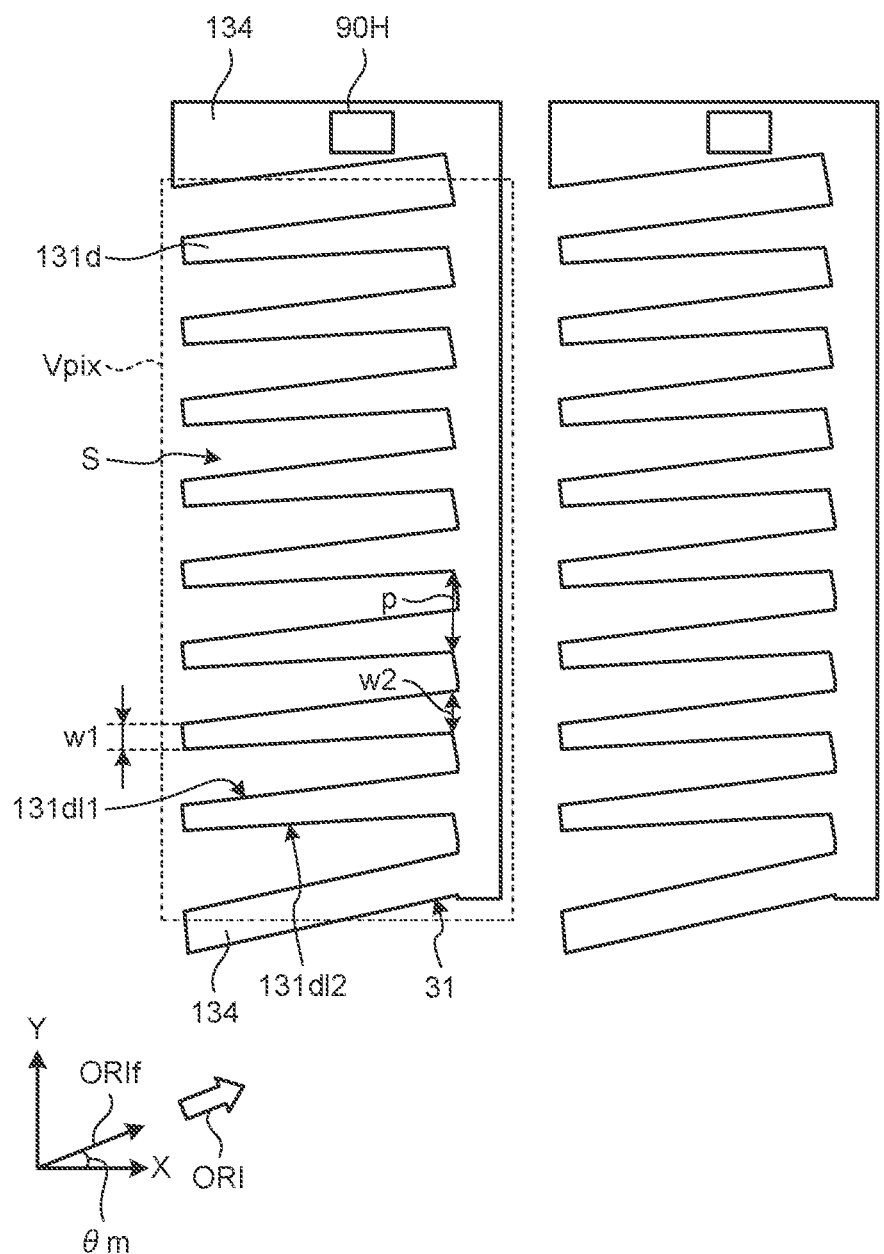
FIG. 18 is a schematic for explaining the relation between the shape of the first electrode and an aperture according to a first modification of the second embodiment.

A display device 1 according to a first modification of the second embodiment will be described. FIG. 18 is a schematic for explaining the relation between the shape of the first electrode and the aperture according to the first modification of the second embodiment. Components identical to those described in the first and the second embodiments are denoted by like reference numerals, and overlapping explanation thereof will be omitted.

The display device 1 according to the first modification of the second embodiment generates an electric field (a lateral electric field) between the first electrode 31 and the second electrode 32 laminated in a direction (Z-direction) perpendicular to the surface of the TFT substrate 71 of the pixel substrate 70A in a direction parallel to the TFT substrate 71. As a result, liquid-crystal molecules in the liquid-crystal layer 70C rotate in a plane parallel to the substrate surface. The display device 1 uses a change in the light transmittance corresponding to the rotation of the liquid-crystal molecules, thereby performing display. The first electrode 31 illustrated in FIG. 18 is the pixel electrode, whereas the second electrode 32 is the common electrode COM, for example. The first electrode 31 is coupled to the drain electrode 90 via the conductive contact 90H, for example. The first electrode 31 includes a plurality of comb tooth portions 131$d$ protruding from an electrode base portion 132 extending in the Y-direction. Adjacent comb tooth portions 131$d$ protrude from the electrode base portion 132 with a predetermined distance interposed therebetween. From a single electrode base portion 132, the comb tooth portions 131$d$ extend in a direction ORIf. The direction ORIf in which the comb tooth portions 131$d$ extend has an angle θm with respect to the X-direction (or the Y-direction).

In the display device 1 according to the first modification of the second embodiment, one of the first electrode 31 and the second electrode 32 serves as a pixel electrode sectioned by each pixel Vpix. The pixel electrodes are arrayed in a matrix in the X-direction and the Y-direction. The direction ORIf in which the comb tooth portions 131$d$ extend is different from the direction in which the pixel electrodes are arrayed in row or column. A user possibly views a display area 21 of the display device 1 according to the first modification of the second embodiment using polarized sunglasses to facilitate viewing an image or protect the eyes. In such a case, this structure can suppress a phenomenon in which the polarized sunglasses block almost all the light and reduce the contrast, thereby making the screen darker and harder to view.

Second Modification of the Second Embodiment

Figure 19:
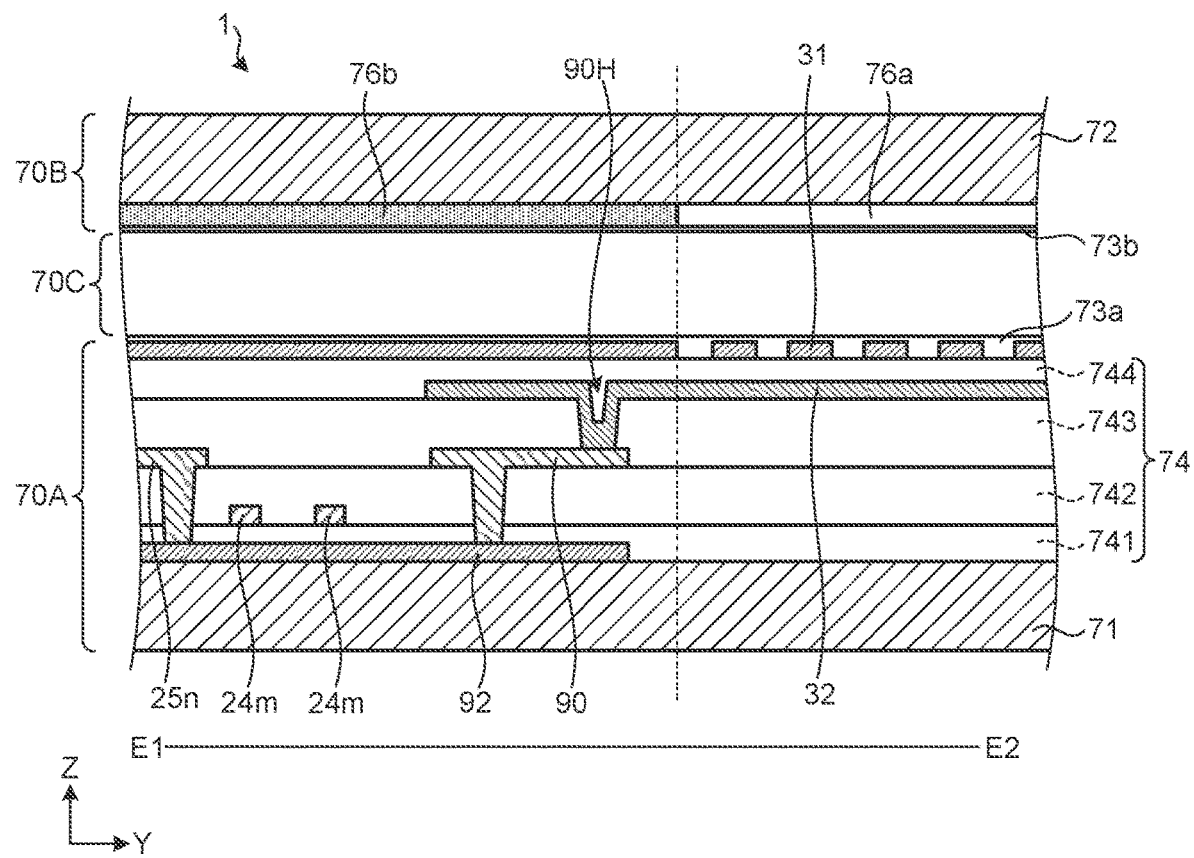
FIG. 19 is a schematic of a modification of the section along line E1-E2 in FIG. 15.

A display device 1 according to a second modification of the second embodiment will be described. FIG. 19 is a schematic of a modification of the section along line E1-E2 in FIG. 15. Components identical to those described in the first and the second embodiments are denoted by like reference numerals, and overlapping explanation thereof will be omitted.

The display device 1 according to the second modification of the second embodiment generates an electric field (a lateral electric field) between the first electrode 31 and the second electrode 32 laminated in a direction (Z-direction) perpendicular to the surface of the TFT substrate 71 of the pixel substrate 70A in a direction parallel to the TFT substrate 71. As a result, liquid-crystal molecules in the liquid-crystal layer 70C rotate in a plane parallel to the substrate surface. The display device 1 uses a change in the light transmittance corresponding to the rotation of the liquid-crystal molecules, thereby performing display. The first electrode 31 illustrated in FIG. 19 is the common electrode COM, whereas the second electrode 32 is the pixel electrode, for example. The first electrode 31 is coupled to the drain electrode 90 via the conductive contact 90H, for example.

Third Modification of the Second Embodiment

Figure 20:
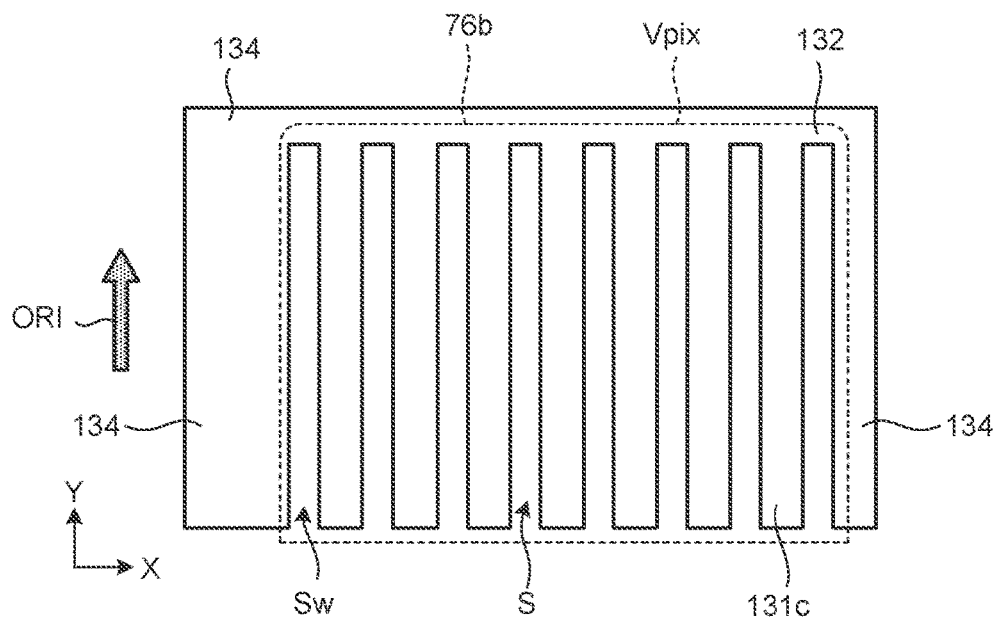
FIG. 20 is a schematic for explaining a modification of the relation between the shape of the first electrode and the aperture according to a third modification of the second embodiment.

A display device 1 according to a third modification of the second embodiment will be described. FIG. 20 is a schematic for explaining a modification of the relation between the shape of the first electrode and the aperture according to the third modification of the second embodiment. Components identical to those described in the first and the second embodiments are denoted by like reference numerals, and overlapping explanation thereof will be omitted.

The first electrode 31 includes the comb tooth portions 131$c$ protruding from the electrode base portion 132 extending in the X-direction. The comb tooth portions 131$c$ extend in a direction opposite to the Y-direction from the electrode base portion 132. Adjacent comb tooth portions 131$c$ protrude from the electrode base portion 132 with a predetermined distance interposed therebetween.

The first orientation film 73$a$ is subjected to orientation processing in the orientation direction ORI illustrated in FIG. 20 such that the liquid-crystal molecules have predetermined initial orientation in the Y-direction. The second orientation film 73$b$ is subjected to orientation processing antiparallel to the orientation direction ORI of the first orientation film 73$a$. The orientation directions of the first orientation film 73$a$ and the second orientation film 73$b$ are antiparallel to each other.

Fourth Modification of the Second Embodiment

Figure 21:
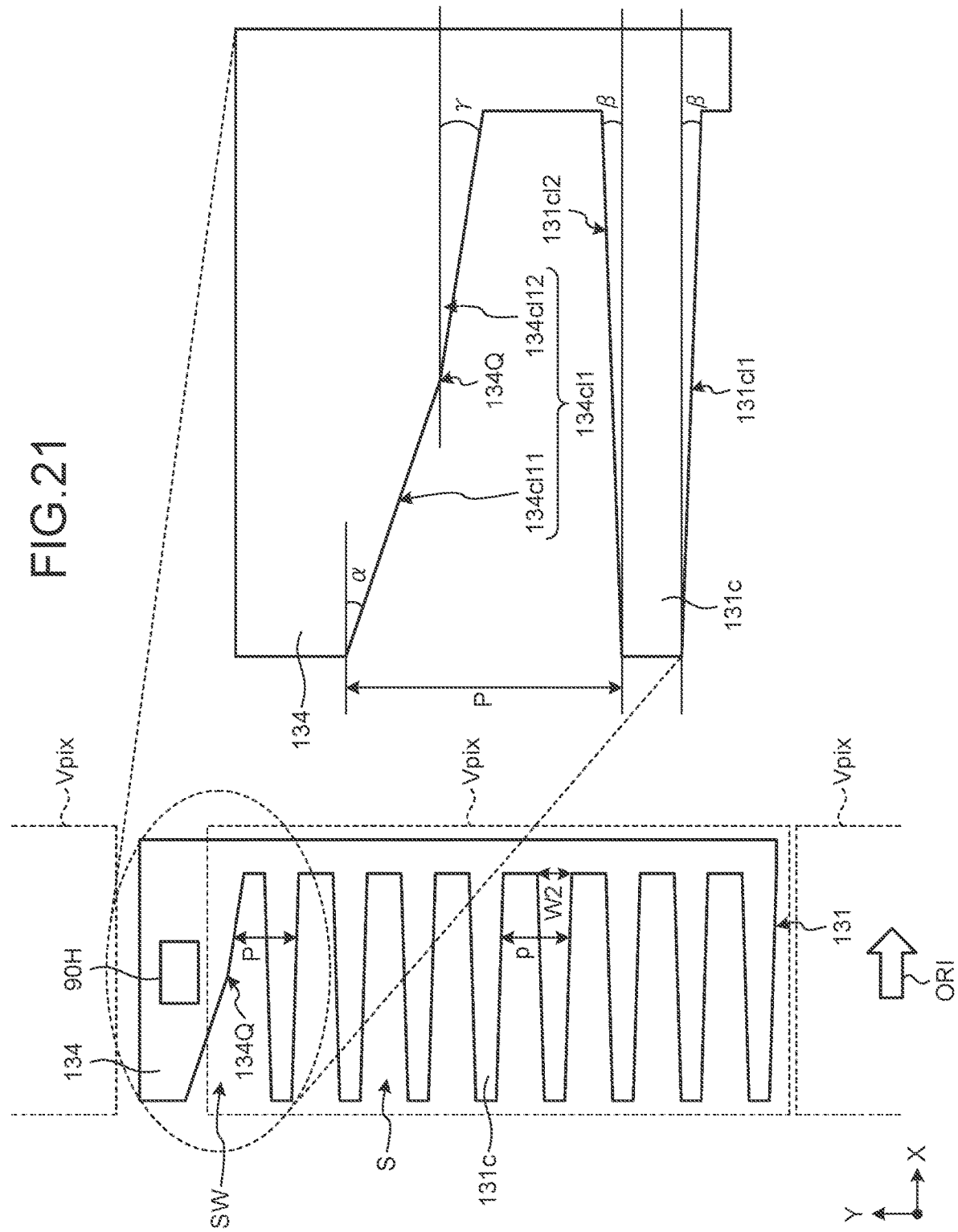
FIG. 21 is a schematic for explaining the shape of the first electrode in a pixel and the shape of the first electrode between pixels according to a fourth modification of the second embodiment.

A display device 1 according to a fourth modification of the second embodiment will be described. FIG. 21 is a schematic for explaining the shape of the first electrode in a pixel and the shape of the first electrode between pixels according to the fourth modification of the second embodiment. Components identical to those described in the first and the second embodiments are denoted by like reference numerals, and overlapping explanation thereof will be omitted.

In the display device 1 according to the fourth modification of the second embodiment, the long side 134$c$l1 of the comb tooth portion 134 has a bend portion 134Q. A long side 134$c$l11 of the comb tooth portion 134 is oblique to the reference direction by an angle α. The angle α is larger than the angle β formed by the long side 131$c$l1 of the comb tooth portions 131$c$ with respect to the reference direction. A long side 134$c$l12 of the comb tooth portion 134 is oblique to the reference direction by an angle γ. The angle γ is larger than the angle β formed by the long side 131$c$l1 of the comb tooth portions 131$c$ with respect to the reference direction. With the bend portion 134Q, the angle α and the angle γ can be made larger than the angle β.

As described above, the long side 134$c$l1 of the comb tooth portion 134 closest to the boundary between the pixels Vpix has the bend portion 134Q that makes at least one of the angle α and the angle γ with respect to the reference direction larger than the angle β. This structure improves the orientation stability of the liquid crystals near the comb tooth portion 134. As a result, it is possible to suppress an influence of the liquid-crystal orientation around the comb tooth portion 134 closest to the boundary between the pixels Vpix on the liquid-crystal orientation of the comb tooth portion 131c adjacent to the comb tooth portion 134 in the pixel Vpix and to improve in-plane display quality.

The following describes evaluation results of a first evaluation example to a sixth evaluation example.

First Evaluation Example

Figure 22:
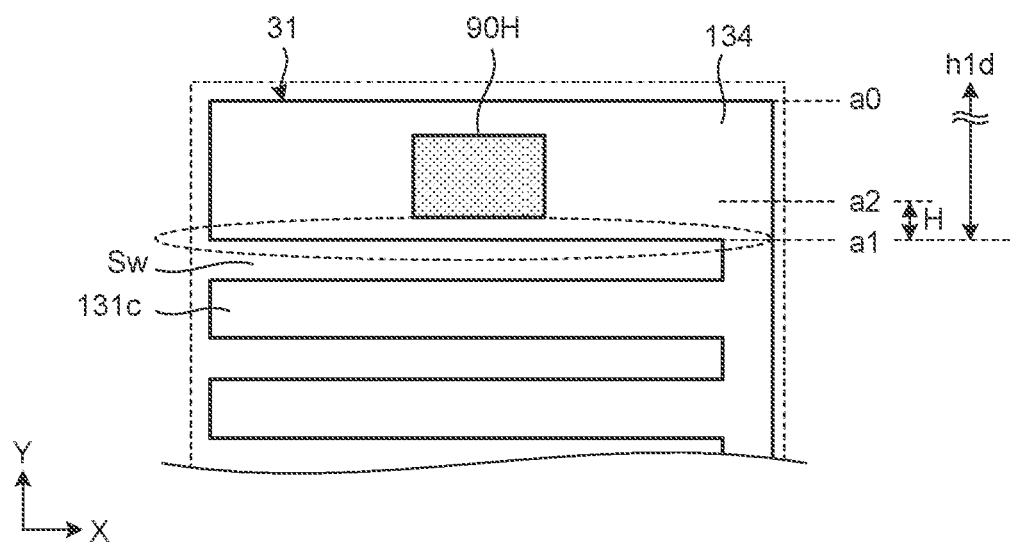
FIG. 22 is a schematic for explaining the relation between the shape of the first electrode and a shaded position according to the fourth modification of the second embodiment.
Figure 23:
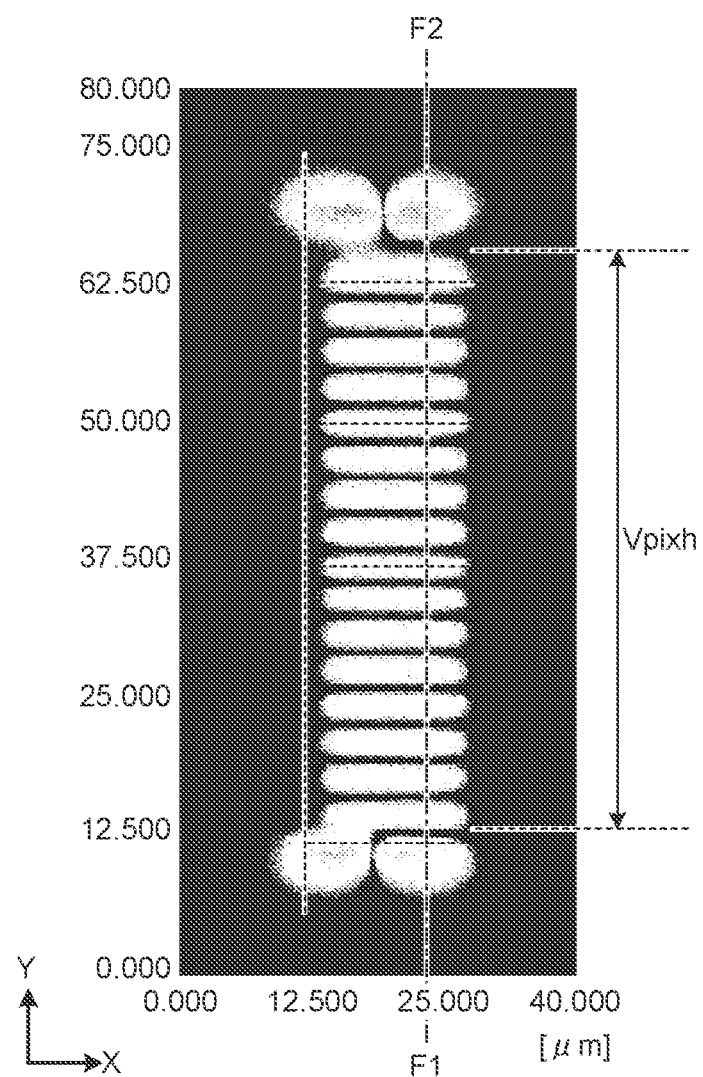
FIG. 23 is a view for explaining an example of in-plane luminance distribution in FIG. 22.

FIG. 22 is a schematic for explaining the relation between the shape of the first electrode and a shaded position according to the second modification of the second embodiment. The black matrix 76a simply needs to shade the comb tooth portion 134 to a position a1 of a width h1d illustrated in FIG. 22, thereby hiding the contact 90H. An electric field is applied to the endmost slit Sw between the comb tooth portion 134 coupled to the contact 90H and closest to the edge of the aperture 76b and the comb tooth portion 131c. The electric field has different distribution from that of an electric field applied to the slit S between adjacent comb tooth portions 131c. If the black matrix 76a shades the comb tooth portion 134 to the position of the width 76h1b illustrated in FIG. 6 to hide the entire comb tooth portion 134, the rate of change in the transmittance of the endmost slit Sw can be made closer to that of the slit S. If the black matrix 76a shades the comb tooth portion 134 from a peripheral end a0 to a position a2 of the contact 90H to hide the contact 90H, at least reduction or disturbance in the brilliance can be reduced. This structure can make the luminance in the aperture 76b uniform. FIG. 23 is a view for explaining an example of in-plane luminance distribution in FIG. 22.

As illustrated in FIG. 23, the portion corresponding to the slits S has high luminance. According to the first evaluation example, distribution of high luminance is highly uniform, and disorder in the luminance is small in an area Vpixh in the Y-direction of the pixel Vpix except for the ends. Although the area outside of the area Vpixh has low uniformity, the black matrix 76a shading the area can reduce an influence on the area Vpixh.

Figure 24:
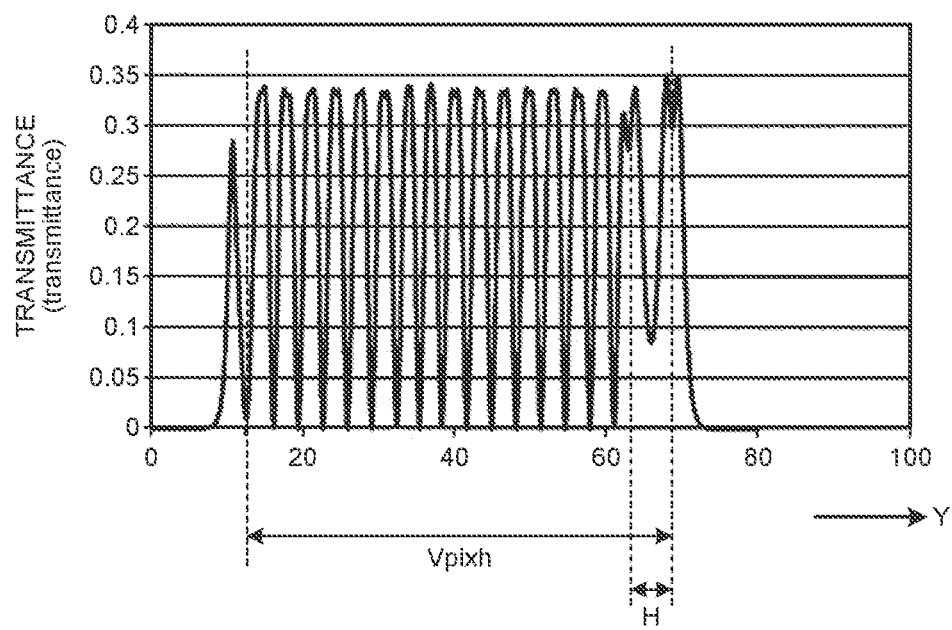
FIG. 24 is a diagram for explaining brilliance distribution of a section along line F1-F2 in FIG. 23.

FIG. 24 is a diagram for explaining brilliance distribution of a section along line F1-F2 in FIG. 23. The brilliance (transmittance) decreases at the position of the comb tooth portion 134 illustrated in FIG. 22, for example. From the first evaluation example, in the display device according to the second modification of the second embodiment, it is preferable that a distance H between the position a1 and the position a2 illustrated in FIG. 22 is larger than a range in which the brilliance (transmittance) decreases illustrated in FIG. 24. The brilliance (transmittance) illustrated in FIG. 24 is transmittance where the incident light is 1 and the polarizing plate efficiency is 0.5.

Figure 25:
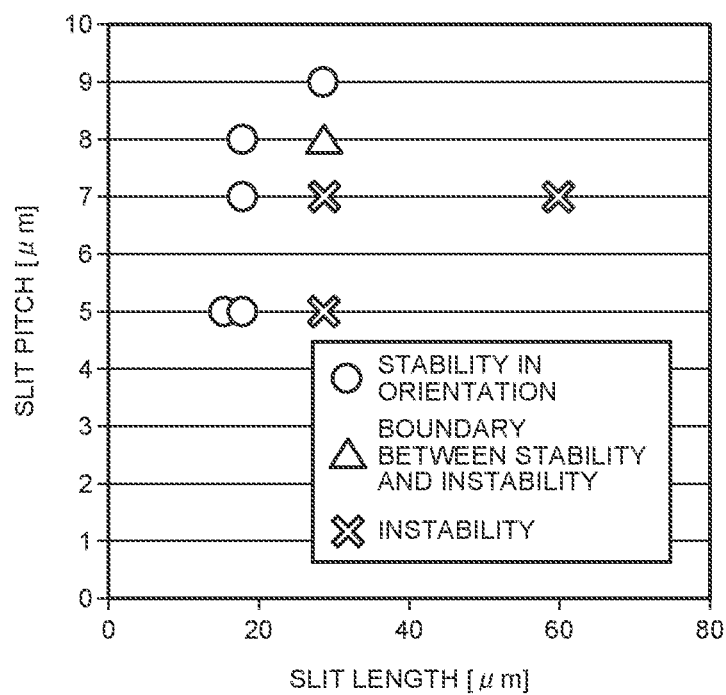
FIG. 25 is a diagram for explaining the relation between a protrusion length of a comb tooth portion and an array pitch (a slit pitch) in a case where an inclination angle θ of a long side of the comb tooth portion is 0 degrees.
Figure 26:
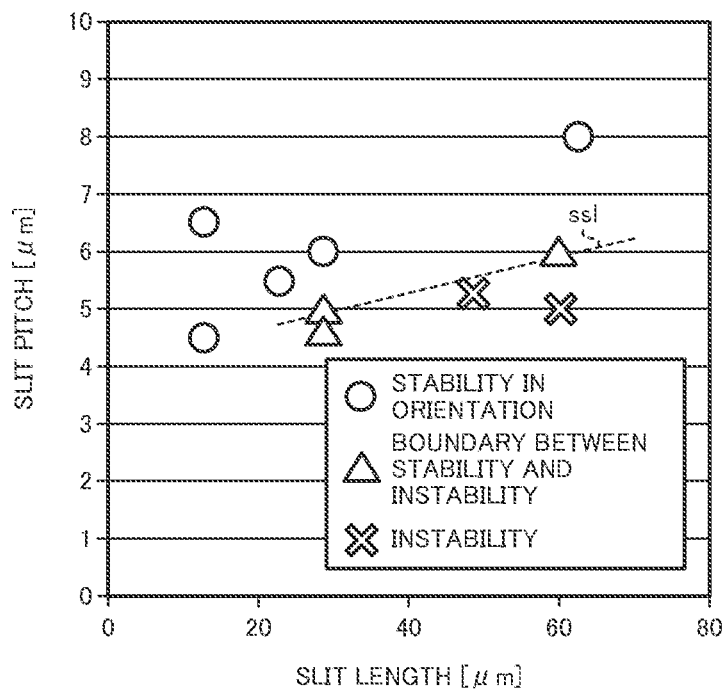
FIG. 26 is a diagram for explaining the relation between the protrusion length of the comb tooth portion and the array pitch (slit pitch) in a case where the inclination angle θ of the long side of the comb tooth portion is 0.5 degrees.
Figure 27:
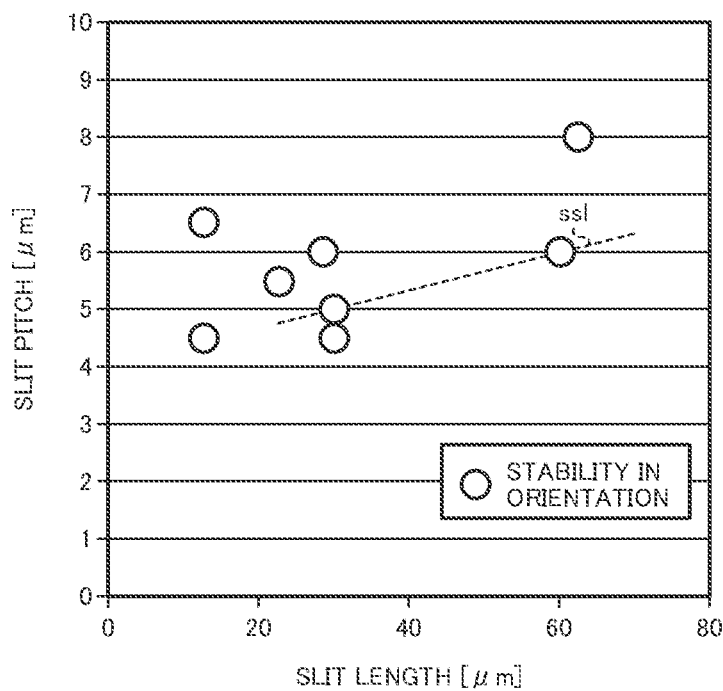
FIG. 27 is a diagram for explaining the relation between the protrusion length of the comb tooth portion and the array pitch (slit pitch) in a case where the inclination angle θ of the long side of the comb tooth portion is 1 degree.

FIG. 25 is a diagram for explaining the relation between the protrusion length of the comb tooth portion and the array pitch (a slit pitch) in a case where the inclination angle θ of the long side of the comb tooth portion is 0 degrees. FIG. 26 is a diagram for explaining the relation between the protrusion length of the comb tooth portion and the array pitch (slit pitch) in a case where the inclination angle θ of the long side of the comb tooth portion is 0.5 degrees. FIG. 27 is a diagram for explaining the relation between the protrusion length of the comb tooth portion and the array pitch (slit pitch) in a case where the inclination angle θ of the long side of the comb tooth portion is 1 degree. In the evaluation results illustrated in FIGS. 25 to 27, a point indicated by a circle represents an evaluation of stability of the orientation. A point indicated by a triangle represents a boundary between stability and instability of the orientation. A point indicated by a cross represents an evaluation of instability.

As illustrated in FIG. 25, setting the angle θ to 0 degrees can secure the area of the slits even if the array pitch is reduced. An increase in the slit length (comb tooth protrusion length described above), however, makes the orientation of the liquid crystals unstable. Because the slit length (comb tooth protrusion length) fails to be increased, the transmittance is hard to improve. As illustrated in FIG. 26, by setting the angle θ larger, the orientation of the liquid crystals stabilize. However, if the array pitch (slit pitch) is smaller than a virtual line ssl connecting a combination of an array pitch (slit pitch) of 5 μm and a slit length of 30 μm and a combination of an array pitch (slit pitch) of 6 μm and a slit length of 60 μm, the orientation of the liquid crystals becomes unstable. As illustrated in FIG. 27, setting the angle θ to 1 degree can stabilize the orientation of the liquid crystals even if the array pitch (slit pitch) is smaller than the virtual line ssl connecting the combination of an array pitch (slit pitch) of 6 μm and a slit length of 60 μm. In a case where the angle θ is 1 degree as illustrated in FIG. 27, however, it is difficult to secure the area of the slits. To address this, the angle α formed by the long side 134c/1 of the comb tooth portion 134 closest to the boundary between the pixels with respect to the reference direction is set to 1 degree, and the angle β formed by the long side 131c/1 of the comb tooth portions 131c in the pixel with respect to the reference direction is set to 0.5 degrees. Because the angle α (1 degree) is larger than the angle β (0.5 degrees) formed by the long side 131c/1 of the comb tooth portions 131b, the orientation stability of the liquid crystals near the comb tooth portion 134 improves. As a result, it is possible to suppress an influence of the liquid-crystal orientation around the comb tooth portion 134 closest to the boundary between the pixels Vpix on the liquid-crystal orientation of the comb tooth portion 131c adjacent to the comb tooth portion 134 in the pixel Vpix and to improve in-plane display quality. Setting the angle β (0.5 degrees) smaller than the angle α (1 degree) facilitates securing the area of the slits S with a smaller array pitch p.

As illustrated in FIGS. 25 to 27, for example, in a case where the slit length is 30 μm, the comb tooth portions 131c in the pixel is formed such that the angle β formed by the long side 131c/1 with respect to the reference direction is 0.5 degrees and such that the array pitch (slit pitch) is smaller than the virtual line ssl, specifically, the array pitch is 4.5 μm. By contrast, the comb tooth portion 134 closest to the boundary between the pixels is formed such that the angle α formed by the long side 134c/1 with respect to the reference direction is 1 degree and such that the array pitch (slit pitch) is larger than the virtual line ssl, specifically, the array pitch is 8 μm or 9 μm. This structure can improve the orientation stability in the entire pixel Vpix. Because the array pitch (slit pitch) of the comb tooth portions 131c in the pixel occupies a large part of the entire pixel, this structure can reduce the pitch p as a whole, thereby increasing the response speed.

In the comb tooth portions 131c in the pixel and the comb tooth portion 134 closest to the boundary between the pixels, the angle α may be larger than the angle β. In addition, the array pitch (slit pitch) and the slit length (comb tooth protrusion length) may be different between the comb tooth portions 131c in the pixel and the comb tooth portion 134 closest to the boundary between the pixels. For example, the comb tooth portions 131c in the pixel may have the following configuration: the angle β formed by the long side 131c/1 with respect to the reference direction is 0.5 degrees; the array pitch (slit pitch) is an array pitch (slit pitch) equal to or smaller than the virtual line ssl illustrated in FIG. 26; and the slit length (comb tooth protrusion length) is a slit length (comb tooth protrusion length) equal to or larger than the virtual line ssl. The comb tooth portion 134 closest to the boundary between the pixels may have the following configuration: the angle α formed by the long side 134c1 with respect to the reference direction is 1 degree; the array pitch (slit pitch) is an array pitch (slit pitch) equal to or larger than the virtual line ssl illustrated in FIG. 27; the slit length (comb tooth protrusion length) is a slit length (comb tooth protrusion length) equal to or larger than the virtual line ssl, and at least one of the array pitch (slit pitch) and the slit length (comb tooth protrusion length) is different from that of the comb tooth portions 131c in the pixel. This structure can improve the orientation stability in the entire pixel Vpix. Because the array pitch (slit pitch) of the comb tooth portions 131c in the pixel occupies a large part of the entire pixel, this structure can reduce the pitch p as a whole, thereby increasing the response speed.

Second Evaluation Example

Figures 28, 29:
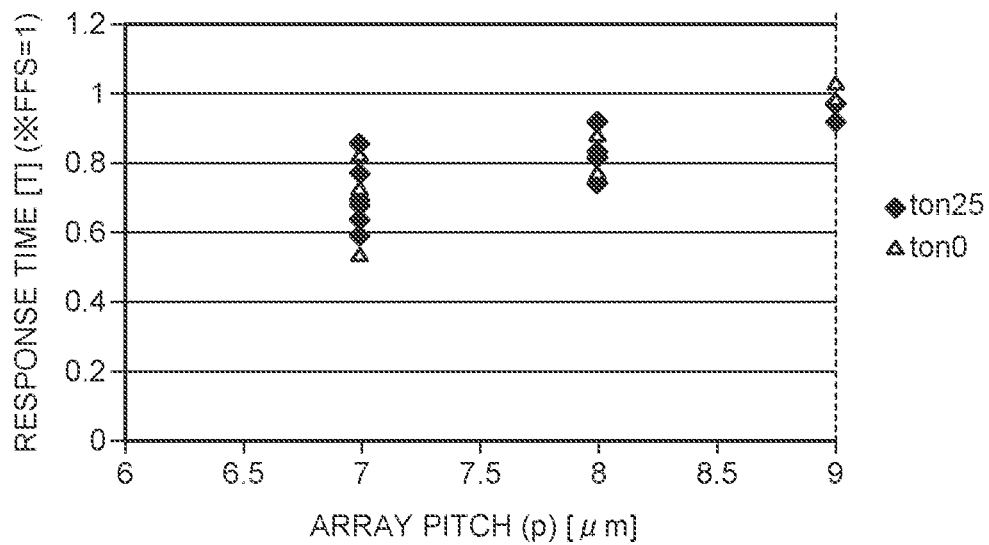
FIG. 28 is a diagram for explaining the relation between the array pitch (slit pitch) and a response time.
FIG. 29 is a diagram for explaining the relation between the inclination angle θ of the long side of the comb tooth portion and the protrusion length of the comb tooth portion.

FIG. 28 is a diagram for explaining the relation between the array pitch (slit pitch) and a response time. In the second evaluation example illustrated in FIG. 28, the display device 1 according to the first embodiment operates at temperatures of 25 degrees C. and 0 degrees C. In FIG. 28, a point indicated by a lozenge (ton25) represents an evaluation result obtained by plotting a response time (second) at a temperature of 25 degrees C. and when the voltage is ON (from the OFF state to the ON state) for each array pitch. In FIG. 28, a point indicated by a triangle (ton0) represents an evaluation result obtained by plotting a response time (second) at a temperature of 0 degrees C. and when the voltage is ON (from the OFF state to the ON state) for each array pitch. An increase in the slit pitch (p) decreases the response speed. Assuming a response time (T) of the conventional FFS system disclosed in JP-A-2008-52161 is defined as 1, setting the array pitch p smaller than 9 μm can make the response time smaller than 1 in the operation at both temperatures of 25 degrees C. and 0 degrees C.

Third Evaluation Example

FIG. 29 is a diagram for explaining the relation between the inclination angle θ of the long side of the comb tooth portion and the protrusion length of the comb tooth portion. The third evaluation example illustrated in FIG. 29 was obtained by evaluating the pixel Vpix while varying the comb tooth protrusion length L2 and the angle θ illustrated in FIG. 11 in the display device 1 according to the first embodiment. The orientation stability was determined as the evaluation criterion. To determine the orientation stability, the quality (e.g., uniformity) of luminance distribution on display (in a plan view) was checked. The determination was made as follows: a double circle represents a case where the liquid-crystal molecules stably rotate in an in-plane direction clockwise in the neighboring area of one of the long sides of the comb tooth portions facing in the width direction of the slit and counterclockwise in the neighboring area of the other of the long sides; a cross represents a case where the rotation direction is biased toward the clockwise direction or the counterclockwise direction; and a triangle represents a case where the rotation direction is unstable and varies in the neighboring area of one of the long sides of the comb tooth portions facing in the width direction of the slit or the neighboring area of the other of the long sides.

According to the evaluation result illustrated in FIG. 29, a case where the comb tooth protrusion length L2 is 15 μm and the angle θ is 0 degrees was evaluated to be a double circle. According to the evaluation result illustrated in FIG. 29, a case where the comb tooth protrusion length L2 is 15 μm and the angle θ is 0.55 degrees was evaluated to be a double circle.

According to the evaluation result illustrated in FIG. 29, a case where the comb tooth protrusion length L2 is 30 μm and the angle θ is 0.00 degrees was evaluated to be a cross. A case where the comb tooth protrusion length L2 is 30 μm and the angle θ is 0.22 degrees was evaluated to be a cross. A case where the comb tooth protrusion length L2 is 30 μm and the angle θ is 0.55 degrees was evaluated to be a triangle. A case where the comb tooth protrusion length L2 is 30 μm and the angle θ is 0.62 degrees was evaluated to be a double circle. A case where the comb tooth protrusion length L2 is 30 μm and the angle θ is 0.70 degrees was evaluated to be a triangle. A case where the comb tooth protrusion length L2 is 30 μm and the angle θ is 1.01 degrees was evaluated to be a double circle.

According to the evaluation result illustrated in FIG. 29, a case where the comb tooth protrusion length L2 is 62.5 μm and the angle θ is 0.00 degrees was evaluated to be a cross. A case where the comb tooth protrusion length L2 is 62.5 μm and the angle θ is 0.69 degrees was evaluated to be a double circle.

As described above, setting the angle θ larger than 0.5 degrees can facilitate alignment of the liquid-crystal rotation directions LCQ in which the liquid-crystal molecules Lcm rotate regardless of the comb tooth protrusion length L2, thereby stabilizing the behavior of the liquid-crystal molecules Lcm. In a case where the angle θ is larger than 0.5 degrees, the display device 1 according to the first embodiment can allow a deviation in the angle θ even if the orientation direction (ORI) is a little deviated from the X-direction (0 degrees) by manufacturing errors. Thus, the display device 1 can maintain the orientation stability.

Fourth Evaluation Example

Figure 30:
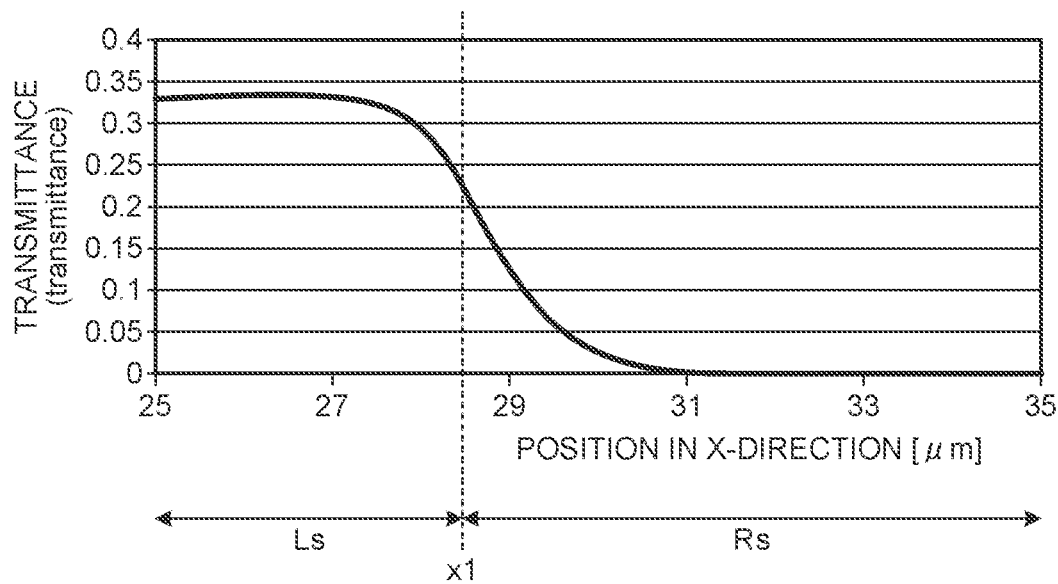
FIG. 30 is a diagram for explaining transmittance at a position of a tip of the comb tooth portion.

FIG. 30 is a diagram for explaining transmittance at a position of a tip of the comb tooth portion. The brilliance (transmittance) illustrated in FIG. 30 is transmittance where the incident light is 1 and the polarizing plate efficiency is 0.5. The fourth evaluation example illustrated in FIG. 30 was obtained by evaluating the transmittance of the section along line C1-C2 in FIG. 9 in the display device 1 according to the first embodiment. The position x1 illustrated in FIG. 30 corresponds to a position of the tip 131af of the comb tooth portions 131a. As illustrated in FIG. 30, the brilliance (transmittance) starts to approach 0 (black) from the vicinity of x1 in the slit area Ls. As illustrated in FIG. 30, for example, the brilliance (transmittance) is substantially 0 at a position equal to or larger than 3.5 μm beyond the position x1 in the silt area Rs. Because an increase in the communicating aperture decreases the brilliance (transmittance), it is preferable that the width W illustrated in FIG. 11 is a smaller value. As illustrated in the fourth evaluation example, it is preferable that the width W illustrated in FIG. 11 is 7 μm or smaller. Specifically, in a case where the width W illustrated in FIG. 11 is 4 μm or smaller, the brilliance (transmittance) is less likely to be reduced.

Figure 31:
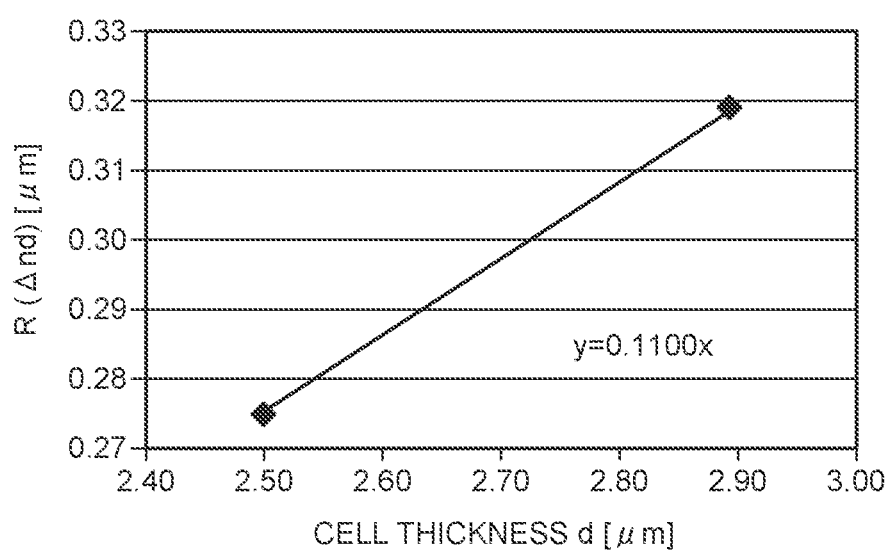
FIG. 31 is a diagram for explaining the relation between retardation and a cell thickness.
Figure 32:
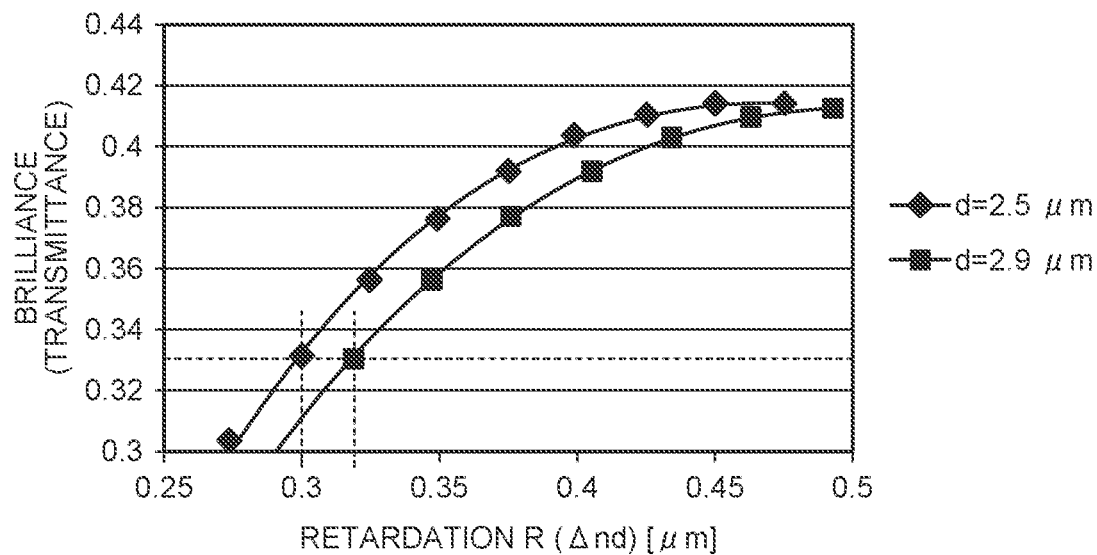
FIG. 32 is a diagram for explaining the relation between retardation and brilliance (transmittance)

FIG. 31 is a diagram for explaining the relation between retardation and a cell thickness. FIG. 32 is a diagram for explaining the relation between retardation and brilliance (transmittance). The brilliance (transmittance) illustrated in FIG. 32 is transmittance where the incident light is 1 and the polarizing plate efficiency is 0.5. The following describes characteristics of Δnd (retardation R=Δn×d) in the liquid-crystal layer 70C with reference to FIGS. 31 and 32. A cell thickness d is a thickness in the Z-direction of the liquid-crystal layer 70C illustrated in FIG. 4. A refractive index difference of the liquid crystals in the liquid-crystal layer 70C is n, and Δn=(ne−no) is satisfied. In a refractive index (ne,no) of nematic liquid crystals, ne denotes an extraordinary light refractive index (a refractive index parallel to the long-axis direction of the liquid-crystal molecules), whereas no denotes an ordinary light refractive index (a refractive index vertical to the long-axis direction of the liquid-crystal molecules). Assuming the refractive index difference of the liquid-crystal layer 70C is Δn, the retardation R corresponds to a phase difference generated when light passes through the liquid-crystal layer 70C having birefringence (also referred to as refractive index anisotropy). The retardation R can be expressed by R=Δn×d. The intensity of the transmitted light in the liquid-crystal layer 70C reaches the maximum when R (Δnd)=mλ (m is an integer, and λ is a light wavelength) is satisfied.

As illustrated in FIG. 31, the display device 1 according to the first embodiment has the optimum R (Δnd) varying depending on the cell thickness d of the liquid-crystal layer 70C. According to the fourth evaluation example illustrated in FIG. 31, a function of y=0.11x is obtained by plotting the cell thickness d on the x-axis and R (Δnd) on the y-axis.

In FIG. 32, the brilliance is plotted on the y-axis, whereas the retardation R is plotted on the x-axis. In FIG. 32, a point indicated by a square represents an evaluation result obtained by plotting the brilliance and the retardation R in a case where d is 2.9 μm. A point indicated by a lozenge represents an evaluation result obtained by plotting the brilliance and the retardation R in a case where d is 2.5 μm. Here, Δnd has wavelength dependence as follows: an increase in the wavelength tends to decrease Δnd, whereas a decrease in the wavelength tends to increase Δnd. The relation between Δnd and the brilliance is proportional to a value obtained by dividing Δnd by the wavelength. As illustrated in FIG. 32, higher brilliance tends to make the color of the pixel yellow, whereas lower brilliance tends to make the color of the pixel blue. Therefore, the liquid-crystal layer 70c preferably has R (Δnd) lower than the maximum transmittance of each color of the pixel (color filters 76R, 76G, and 76B), for example. R (Δnd) is preferably set to a value equal to or larger than the dotted line in FIG. 32 at brilliance (transmittance) of approximately 80%. In other words, a preferable condition for R (Δnd) is R (Δnd)≥0.11× d. For example, in the case of d being 2.5 μm, R≥0.275 μm is satisfied. In the case of d being 2.9 μm, R≥0.319 μm is satisfied. Based on the condition of R, Δn and the cell thickness d of the liquid crystals in the liquid-crystal layer 70C are determined.

Fifth Evaluation Example

Figure 33:
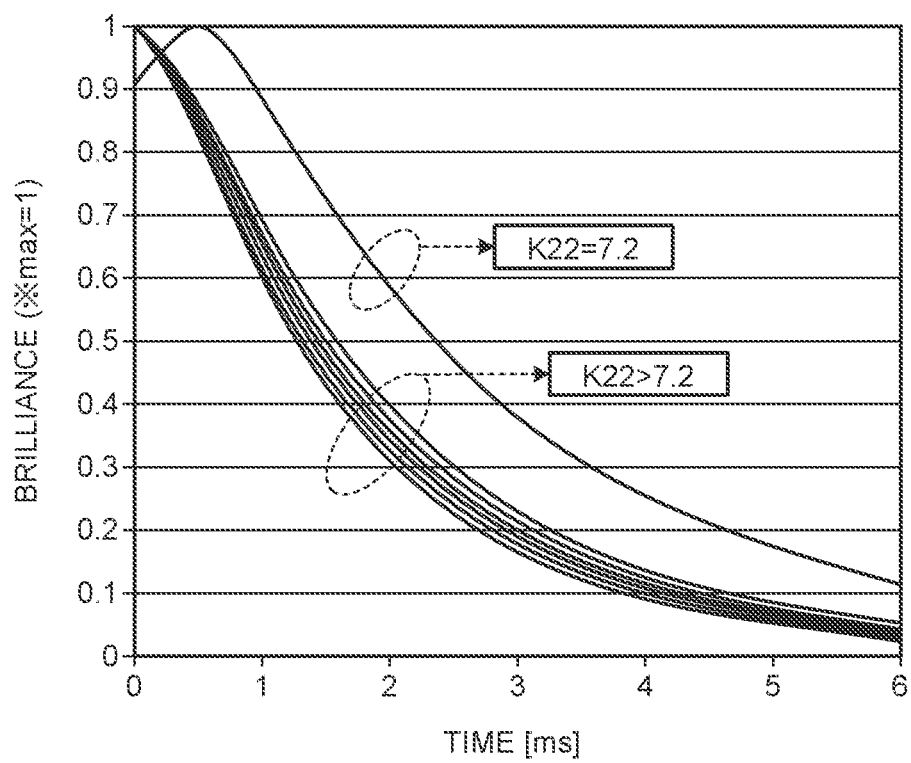
FIG. 33 is a diagram for explaining an elastic property of the liquid crystals.

FIG. 33 is a diagram for explaining an elastic property of the liquid crystals. The evaluation result illustrated in FIG. 33 indicates the relation between a time (ms) and brilliance depending on an elastic constant (specifically, K22) of the liquid crystals in the liquid-crystal layer 70C. An elastic constant K of the liquid-crystal molecules (nematic liquid crystals) in the liquid-crystal layer 70C is assumed to be a twist elastic constant K22. The twist elastic constant K22 corresponds to an elastic constant of the liquid-crystal molecules rotating (twisting) in the X-Y plane.

FIG. 33 illustrates a graph of the relation between a time (ms) and brilliance depending on each value of the elastic constant K22. The time is a response time required to shift the brilliance (transmittance) from the voltage-OFF state to the voltage-ON state, that is, a time required for rotation of the liquid-crystal molecules. The maximum brilliance is defined as 1. In FIG. 33, a group of curves in a case where the elastic constant K22 is larger than 7.2 and a curve in a case where the elastic constant K22 is 7.2 are plotted.

As described above, the display device 1 according to the first and the second embodiments increases the response speed by actively using the elastic energy of the liquid crystals. The display device 1 according to the first and the second embodiments uses rotation of the liquid-crystal molecules Lcm illustrated in FIG. 9. Therefore, it is preferable that the elastic constant K (specifically, K22) is as large as possible. In a case where K22 is too small, for example, where K22 is 7.2, the response speed decreases compared with the case where K22 is larger than 7.2 as illustrated in FIG. 33.

Sixth Evaluation Embodiment

Figure 34:
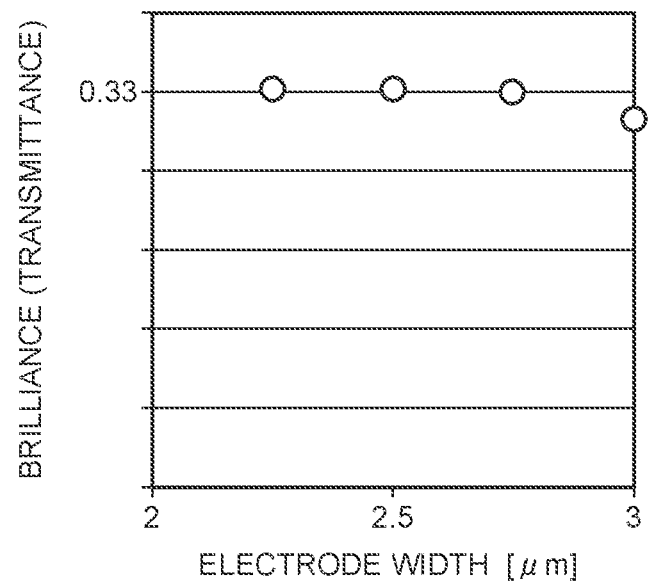
FIG. 34 is a diagram for explaining the relation between the width of the comb tooth portion and the maximum transmittance.

FIG. 34 is a diagram for explaining the relation between the width of the comb tooth portion and the maximum transmittance. The evaluation result in FIG. 34 illustrates the relation between the width w2 illustrated in FIG. 11 and the maximum transmittance (%) in the display device 1 according to the first embodiment. The sixth evaluation example is obtained by evaluating the brilliance (transmittance) with respect to the electrode width (width of the comb tooth portion) in a case where d is 2.5 μm and R (Δnd) is 0.3 illustrated in FIG. 32. The maximum transmittance is compared in cases where the array pitch (slit pitch) p illustrated in FIG. 11 is 5.5 μm and where the width w2 is 2.25 μm, 2.5 μm, 2.75 μm, and 3 μm. As illustrated in FIG. 34, the maximum transmittance is less likely to vary in the cases where the width w2 illustrated in FIG. 11 is 2.25 μm, 2.5 μm, and 2.75 μm. By setting the width w2 to 2.75 μm or smaller with respect to the array pitch (slit pitch) p, it is possible to reduce an influence of manufacturing variation. In the comb tooth portions 131a or the comb tooth portions 131b according to the first embodiment, the width w2 in the Y-direction at the protrusion start position x0 in the electrode base portion 132 is smaller than a value obtained by multiplying the array pitch p of adjacent comb tooth portions 131a or adjacent comb tooth portions 131b by 0.5. In a case where the width w2 in the Y-direction at the protrusion start position x0 in the electrode base portion 132 is smaller than a value obtained by multiplying the array pitch p of adjacent comb tooth portions 13a or adjacent comb tooth portions 131b by 0.5 in the comb tooth portions 131a or the comb tooth portions 131b according to the first embodiment, for example, variation in the maximum transmittance can be reduced.

Figure 35:
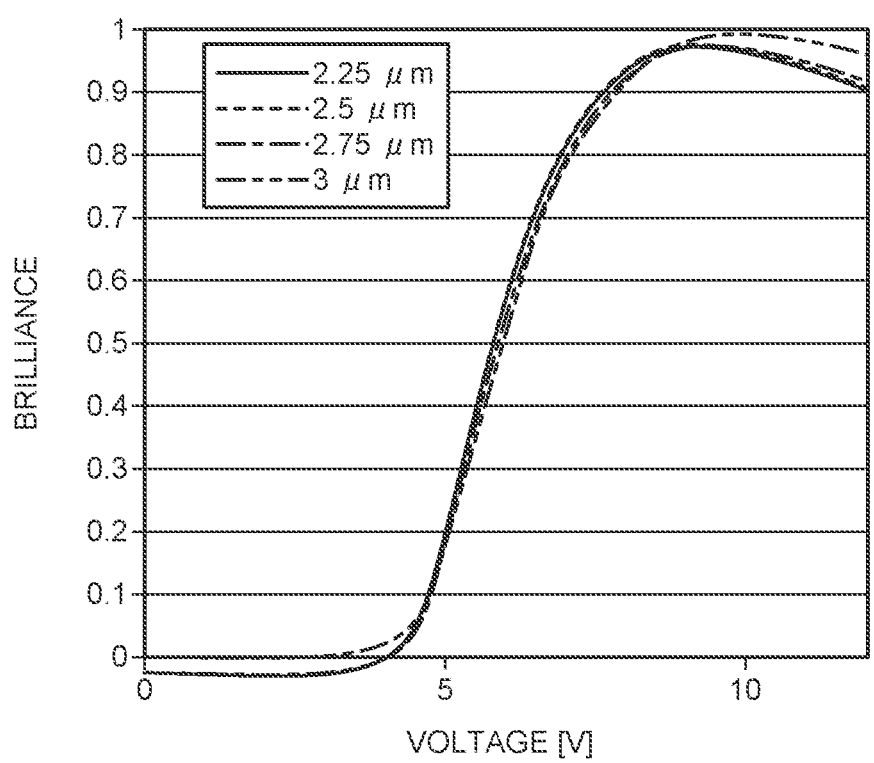
FIG. 35 is a diagram for explaining the relation between a plurality of widths of the comb tooth portion and a voltage assuming the transmittance in the case where the width of the comb tooth portion being 3 μm is defined as brilliance of 1.
Figure 36:
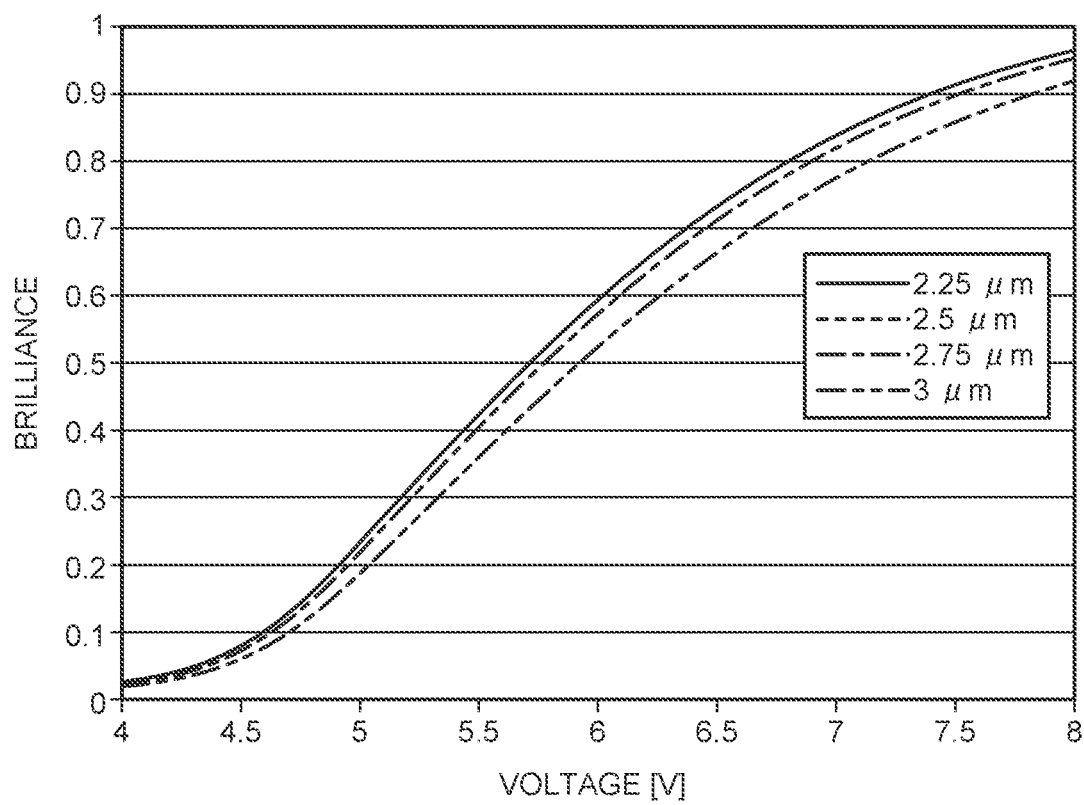
FIG. 36 is a partially enlarged view of FIG. 35.

FIG. 35 is a diagram for explaining the relation between a plurality of widths of the comb tooth portion and a voltage assuming the transmittance in the case of the width of the comb tooth portion being 3 μm is defined as brilliance of 1. FIG. 36 is a partially enlarged view of FIG. 35. Based on the evaluation result of the sixth evaluation example, an evaluation was made on the relation between the applied voltage and each of the cases where the width w2 illustrated in FIG. 11 is 2.25 μm, 2.5 μm, and 2.75 μm. In the cases where the width w2 illustrated in FIG. 11 is 2.25 μm and 2.5 μm, the shift amount of the voltage was small. As illustrated in FIG. 36, the graphs of the cases where the width w2 illustrated in FIG. 11 is 2.25 μm and 2.5 μm substantially overlap with each other. According to the evaluation result of the sixth evaluation example, it is preferable that the width w2 in the Y-direction at the protrusion start position x0 in the electrode base portion 132 is smaller than a value obtained by multiplying the array pitch p of adjacent comb tooth portions 131a or adjacent comb tooth portions 131b by 0.45 in the comb tooth portions 131a or the comb tooth portions 131b according to the first embodiment. This structure can reduce variation in the transmittance to the voltage applied to the comb tooth portions 131a or the comb tooth portions 131b. As a result, it is possible to decrease reduction in the maximum transmittance of light passing through the pixel Vpix even in a case where the width w2 in the Y-direction varies with respect to the comb tooth portions 131a or the comb tooth portions 131b to which the same voltage is applied.

2. Application Examples

The following describes application examples of the display device 1 explained in the first and the second embodiments and the modifications thereof with reference to FIG. 37 to FIG. 45. The first and the second embodiments and the modifications thereof are hereinafter referred to as the present embodiment. FIG. 37 to FIG. 45 are schematics of examples of an electronic apparatus to which the liquid-crystal display device according to the present embodiment is applied. The display device 1 according to the present embodiment is applicable to electronic apparatuses of all fields, such as portable electronic apparatuses including mobile phones and smartphones, television apparatuses, digital cameras, notebook personal computers, video cameras, and meters provided to a vehicle. In other words, the display device 1 according to the present embodiment is applicable to electronic apparatuses of all fields that display video signals received from the outside or video signals generated inside thereof as an image or video. The electronic apparatus includes a controller that supplies video signals to the display device 1 and controls the operation of the display device 1.

First Application Example

Figure 37:
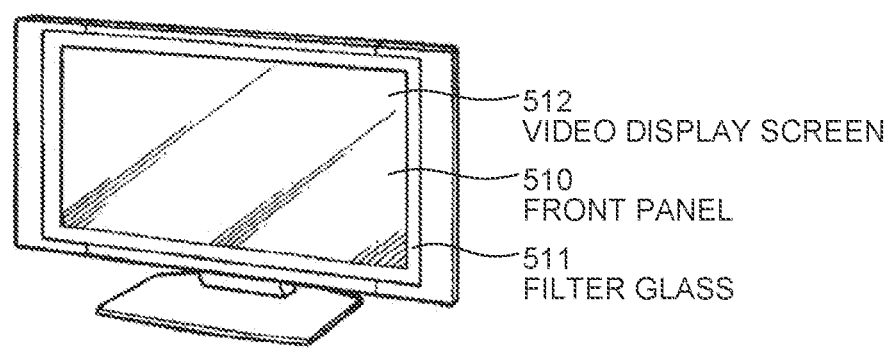
FIG. 37 is a schematic of an example of an electronic apparatus to which the liquid-crystal display device according to the first and the second embodiments and the modifications thereof (the embodiments and the modifications are collectively referred to as the present embodiment) is applied.

An electronic apparatus illustrated in FIG. 37 is a television apparatus to which the display device 1 according to the present embodiment is applied. The television apparatus has a video display screen 510 including a front panel 511 and a filter glass 512, for example. The video display screen 510 corresponds to the display device 1 according to the present embodiment.

Second Application Example

Figure 38:
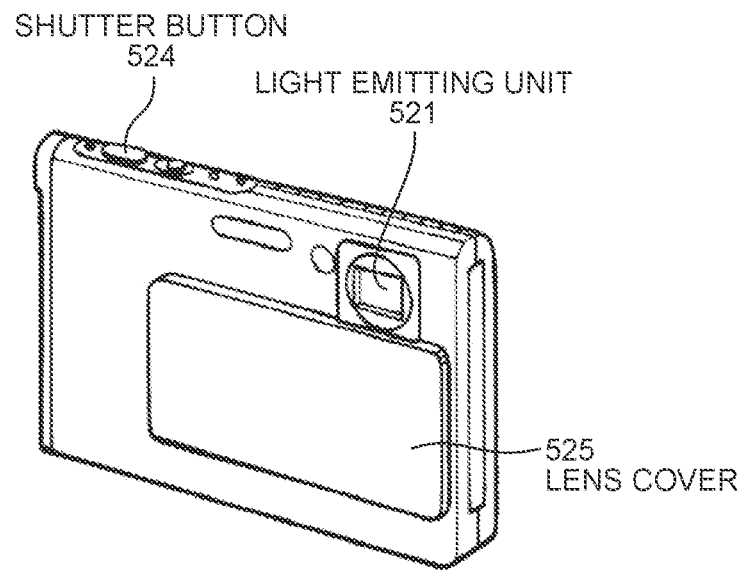
FIG. 38 is a schematic of an example of an electronic apparatus to which the liquid-crystal display device according to the present embodiment is applied.
Figure 39:
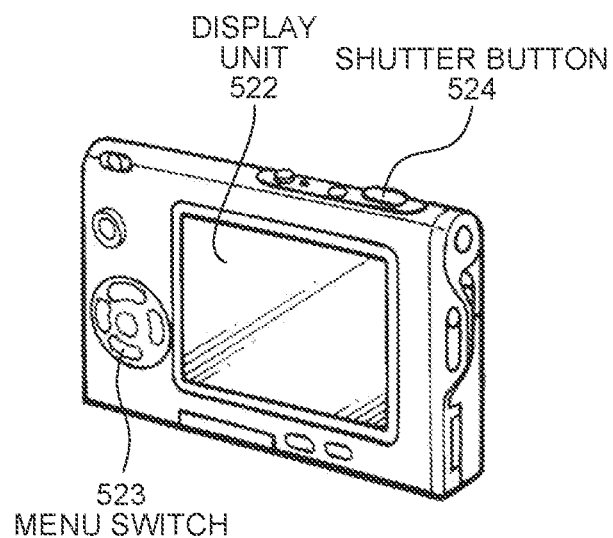
FIG. 39 is a schematic of an example of an electronic apparatus to which the liquid-crystal display device according to the present embodiment is applied.

An electronic apparatus illustrated in FIGS. 38 and 39 is a digital camera to which the display device 1 according to the present embodiment is applied. The digital camera includes a light emitting unit 521 for flash, a display unit 522, a menu switch 523, and a shutter button 524, for example. The display unit 522 corresponds to the display device 1 according to the present embodiment. As illustrated in FIG. 38, the digital camera includes a lens cover 525. Sliding the lens cover 525 exposes a photographing lens. The digital camera captures light entering through the photographing lens, thereby taking a digital picture.

Third Application Example

Figure 40:
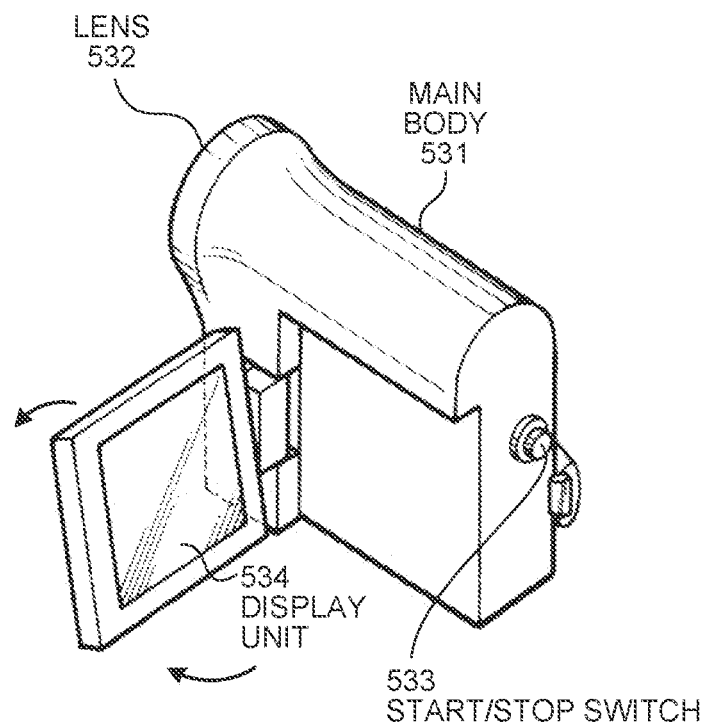
FIG. 40 is a schematic of an example of an electronic apparatus to which the liquid-crystal display device according to the present embodiment is applied.

An electronic apparatus illustrated in FIG. 40 is a video camera to which the display device 1 according to the present embodiment is applied. The video camera includes a main body 531, a lens 532 provided to the front side surface of the main body 531 and used for photographing a subject, a start/stop switch 533 used in photographing, and a display unit 534, for example. The display unit 534 corresponds to the display device 1 according to the present embodiment.

Fourth Application Example

Figure 41:
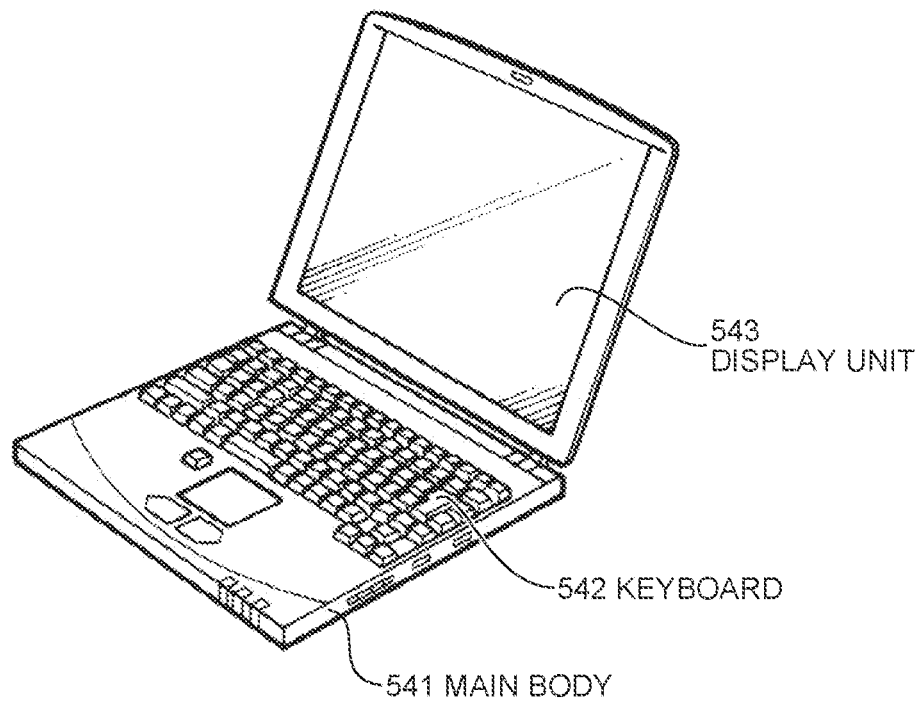
FIG. 41 is a schematic of an example of an electronic apparatus to which the liquid-crystal display device according to the present embodiment is applied.

An electronic apparatus illustrated in FIG. 41 is a notebook personal computer to which the display device 1 according to the present embodiment is applied. The notebook personal computer includes a main body 541, a keyboard 542 used for input of characters and the like, and a display unit 543 that displays an image, for example. The display unit 543 corresponds to the display device 1 according to the present embodiment.

Fifth Application Example

Figure 42:
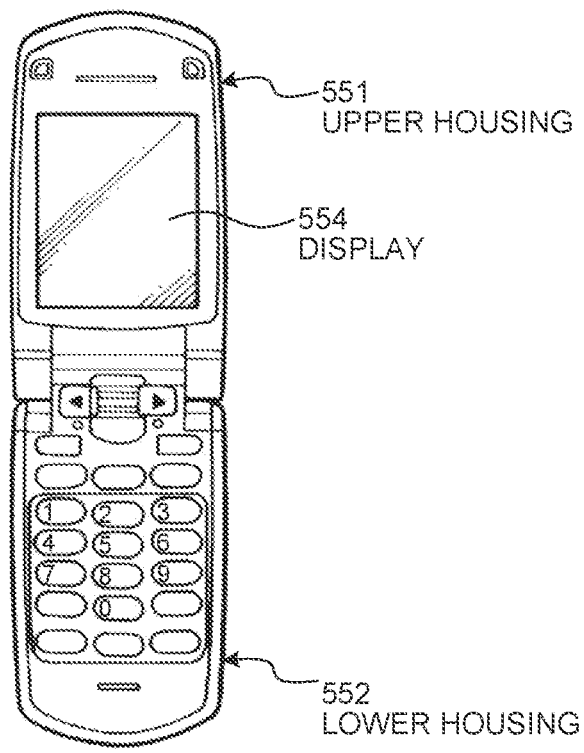
FIG. 42 is a schematic of an example of an electronic apparatus to which the liquid-crystal display device according to the present embodiment is applied.
Figure 43:
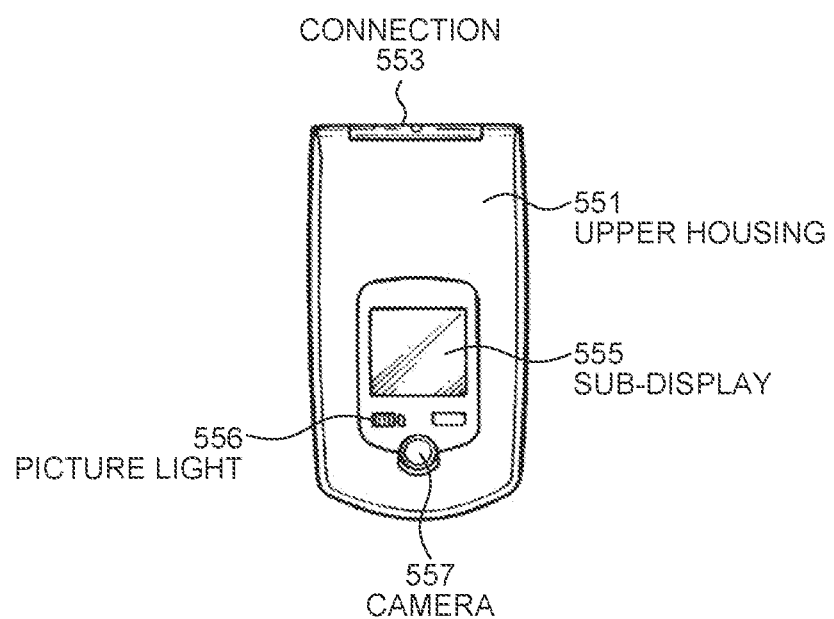
FIG. 43 is a schematic of an example of an electronic apparatus to which the liquid-crystal display device according to the present embodiment is applied.

An electronic apparatus illustrated in FIGS. 42 and 43 is a mobile phone to which the display device 1 is applied. FIG. 42 is a front view of the mobile phone in an unfolded state. FIG. 43 is a front view of the mobile phone in a folded state. The mobile phone includes an upper housing 551 and a lower housing 552 connected by a connection (hinge) 553, for example. The mobile phone further includes a display 554, a sub-display 555, a picture light 556, and a camera 557. The display 554 is provided with the display device 1. The display 554 of the mobile phone may also have a function to detect a touch besides a function to display an image.

Sixth Application Example

Figure 44:
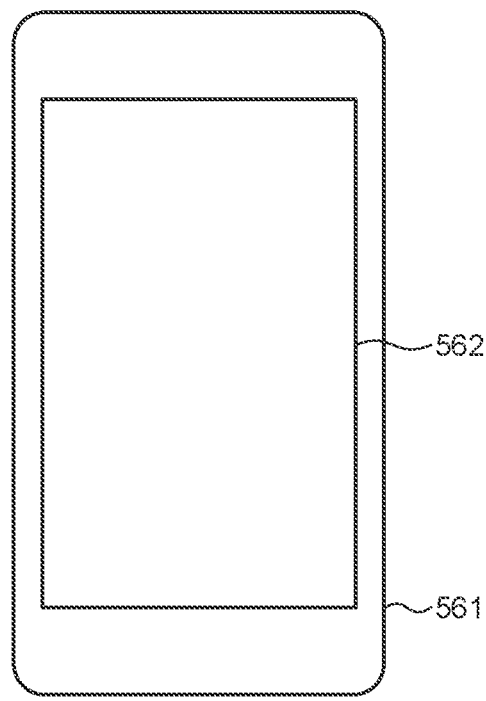
FIG. 44 is a schematic of an example of an electronic apparatus to which the liquid-crystal display device according to the present embodiment is applied.

An electronic apparatus illustrated in FIG. 44 operates as a mobile computer, a multifunctional mobile phone, a mobile computer capable of making a voice call, or a mobile computer capable of performing communications. The electronic apparatus is a portable information terminal, which may be called a smartphone or a tablet terminal. The portable information terminal includes a display unit 562 on the surface of a housing 561, for example. The display unit 562 corresponds to the display device 1 according to the present embodiment.

Seventh Application Example

Figure 45:
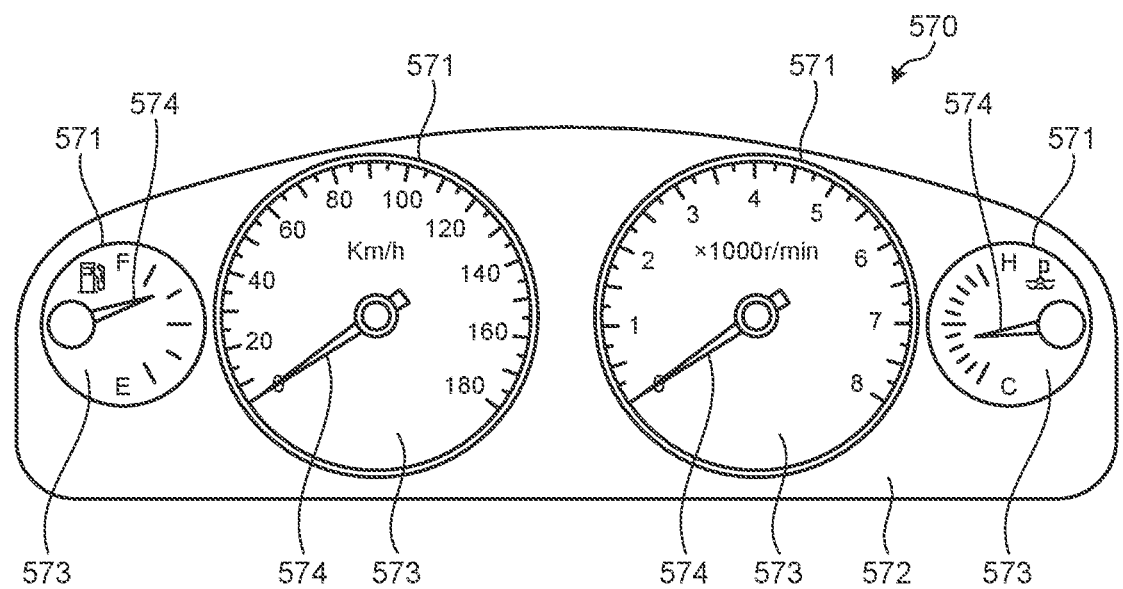
FIG. 45 is a schematic of an example of an electronic apparatus to which the liquid-crystal display device according to the present embodiment is applied.

FIG. 45 is a schematic of a configuration of a meter unit according to the present embodiment. An electronic apparatus illustrated in FIG. 45 is a meter unit mounted on a vehicle. A meter unit (electronic apparatus) 570 illustrated in FIG. 45 includes a plurality of display devices 1 according to the present embodiment, such as a fuel gauge, a water temperature gauge, a speed meter, and a tachometer, as liquid-crystal display devices 571. The liquid-crystal display devices 571 are covered with an exterior panel 572.

The liquid-crystal display devices 571 illustrated in FIG. 45 each include a combination of a liquid-crystal panel 573 serving as a liquid-crystal display unit and a movement mechanism serving as an analog display unit. The movement mechanism includes a motor serving as a drive unit and an indicator 574 rotated by the motor. As illustrated in FIG. 45, the liquid-crystal display device 571 can display a gauge, a warning, and the like on the display surface of the liquid-crystal panel 573. The liquid-crystal display device 571 can also rotate the indicator 574 of the movement mechanism on the display surface of the liquid-crystal panel 573.

While the liquid-crystal display devices 571 are provided on the exterior panel 572 in FIG. 45, the embodiment is not limited thereto. One liquid-crystal display device 571 may be provided on an area covered with the exterior panel 572 and display a fuel gauge, a water temperature gauge, a speed meter, and a tachometer, for example.

Aspects of the Array Pitch

FIGS. 46 and 47 are schematics for explaining a case where an array pitch of a comb tooth portion closest to the boundary between pixels is different from an array pitch of a comb tooth portion in a pixel according to the present embodiment. As described above, the array pitch PL of the comb tooth portion closest to the boundary between the pixels Vpix may be different from the array pitch ps of the comb tooth portion in the pixel Vpix. As illustrated in FIG. 46, the array pitch PL of the comb tooth portion closest to the boundary between the pixels Vpix includes a width Pa1 of the comb tooth portions closest to the boundary between the pixels Vpix and a distance Pb1 between the comb tooth portion closest to the boundary and the comb tooth portion that is adjacent to the comb tooth portion closest to the boundary. The array pitch ps of the comb tooth portion in the pixel Vpix includes a width pa1 of the comb tooth portions in the pixel Vpix and a distance pb1 between the comb tooth portions. To make the array pitch PL of the comb tooth portion closest to the boundary between the pixels Vpix different from the array pitch ps of the comb tooth portion in the pixel Vpix, the width Pa1 may be larger than the width pa1, and the distance Pb1 may be equal to the distance pb1 as illustrated in FIG. 46. Alternatively, to make the array pitch PL of the first comb tooth portion closest to the boundary between the pixels Vpix different from the array pitch ps of the second comb tooth portion in the pixel Vpix, the width Pa1 may be equal to the width pa1, and the distance Pb1 may be larger than the distance pb1 as illustrated in FIG. 47.

Various types of changes and modifications can be made by those skilled in the art without departing from the spirit of the present invention. These changes and modifications are assumed to be included in the scope of the invention. Modifications, for example, include adding or removing a component, changing the design, adding or omitting a process, and changing the conditions in the embodiments above made by those skilled in the art as appropriate. These modifications are included in the scope of the invention as long as they do not depart from the spirit of the invention. In terms of other advantageous effects achieved by the aspects according to the present embodiment, effects naturally understandable from the present specification or effects appropriately conceivable by those skilled in the art are assumed to be obviously achieved by the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A liquid-crystal display device comprising:
a substrate including a first electrode and a second electrode;
a liquid-crystal layer above the first and second electrodes, wherein
the first electrode has a slit that has a base portion, a first protruding portion protruding from the base portion, and a second protruding portion protruding from the base portion,
the first protruding portion runs in a first direction,
the base portion runs in a second direction different from the first direction,
the first protruding portion has a first width at a first region and a second width at a second region that is located between the first region and the base portion,
the second width is wider than the first width,
the first protruding portion has a side protruding from the base portion,
the side has a bend portion,
the second protruding portion has a third width at a third region and a fourth width at a fourth region that is located between the third region and the base portion,
the fourth width is wider than the third width,
the slit has first protruding portions including the first protruding portion, and second protruding portions including the second protruding portion,
the first protruding portions protrude from the base portion to a first side, and
the second protruding portions protrude from the base portion to a second side opposite to the first side.

2. The liquid-crystal display device according to claim 1, wherein the side is an outer most side of the slit in the second direction.

3. The liquid-crystal display device according to claim 1, wherein the slit is a closed region.

4. The liquid-crystal display device according to claim 1, wherein a direction of the first and second width intersects the first direction.

5. The liquid-crystal display device according to claim 1, further comprising pixels, wherein
the second electrode is located between the substrate and the first electrode
the pixels have a common electrode,
each of the pixels has a pixel electrode,
the first electrode is a first one of the pixel electrode and the common electrode, and
the second electrode is a second one of the pixel electrode and the common electrode.

6. The liquid-crystal display device according to claim 1, wherein a direction of the third and fourth width intersects the first direction.

7. The liquid-crystal display device according to claim 1, wherein the first and second protruding portions are arranged one by one alternately.

8. The liquid-crystal display device according to claim 1, wherein
each of the first and second protruding portions has an edge region and a center region located between the edge region and the base portion, and
a width of the center region is wider than a width of the edge region.

9. The liquid-crystal display device according to claim 1, wherein the first and second protruding portions include at least one outermost protruding portion located outermost in the second direction among the first and second protruding portions, the outermost protruding portion has a first long side located outermost in the second direction among sides of the slit, and the first long side has the bend portion.

10. The liquid-crystal display device according to claim 9, wherein one of the first and second protruding portions other than the outermost protruding portion has a second long side protruding from the base portion, and the second long side does not have a bend portion.

11. The liquid-crystal display device according to claim 9, wherein all of the first and second protruding portions other than the outermost protruding portion have second long sides protruding from the base portion respectively, and each of the second long sides does not have a bend portion.

12. The liquid-crystal display device according to claim 9, wherein one of the first and second protruding portions other than the outermost protruding portion has a second long side protruding from the base portion, a direction of the first long side forms a first angle with a third direction orthogonal to the second direction, a direction of the second long side forms a second angle with the third direction, and the first angle is larger than the second angle.

13. The liquid-crystal display device according to claim 9, wherein the at least one outermost protruding portion includes two outermost protruding portions located at both sides of the base portion respectively.

14. A liquid-crystal display device comprising:

a substrate including an electrode; and a liquid-crystal layer above the electrode, wherein the electrode has a slit that has a base portion, a protruding portion protruding from the base portion, and a second protruding portion protruding from the base portion, the protruding portion runs in a first direction, the base portion runs in a second direction different from the first direction, the protruding portion has a side protruding from the base portion, the side has a bend portion, the second protruding portion has a third width at a third region and a fourth width at a fourth region that is located between the third region and the base portion, the fourth width is wider than the third width, the slit has protruding portions including the protruding portion, and second protruding portions including the second protruding portion, the protruding portions protrude from the base portion to a first side, and the second protruding portions protrude from the base portion to a second side opposite to the first side.

15. The liquid-crystal display device according to claim 14, wherein the side is an outer most side of the slit in the second direction.

16. The liquid-crystal display device according to claim 14, wherein the protruding portion has a first width at a first portion and a second width at a second portion, the first portion is located between the bend portion and an end of the protruding portion, the bend portion being located between the base portion and the end, the second portion is located between the base portion and the bend portion, and the second width is wider than the first width.

17. The liquid-crystal display device according to claim 14, wherein the protruding portion and the second protruding portion are arranged one by one alternately.

18. The liquid-crystal display device according to claim 14, wherein the protruding portions and the second protruding portions include at least one outermost protruding portion located outermost in the second direction among the protruding portions and the second protruding portions, the outermost protruding portion has a first long side located outermost in the second direction among sides of the slit, and the first long side has the bend portion.

19. The liquid-crystal display device according to claim 18, wherein one of the protruding portions and second protruding portions other than the outermost protruding portion has a second long side protruding from the base portion, and the second long side does not have a bend portion.

20. The liquid-crystal display device according to claim 18, wherein one of the protruding portions and second protruding portions other than the outermost protruding portion has a second long side protruding from the base portion, a direction of the first long side forms a first angle with a third direction orthogonal to the second direction, a direction of the second long side forms a second angle with the third direction, and the first angle is larger than the second angle.

* * * * *